US011950607B2

(12) United States Patent
Smith et al.

(10) Patent No.: US 11,950,607 B2
(45) Date of Patent: *Apr. 9, 2024

(54) MYCELIATED VEGETABLE PROTEIN AND FOOD COMPOSITIONS COMPRISING SAME

(71) Applicant: MycoTechnology, Inc., Aurora, CO (US)

(72) Inventors: Lisa Smith, Aurora, CO (US); Todd McDonald, Aurora, CO (US); Savita Jensen, Aurora, CO (US); Joseph George Akamittath, Aurora, CO (US); Alan D. Hahn, Aurora, CO (US); Anthony J. Clark, Aurora, CO (US); Bhupendra Kumar Soni, Aurora, CO (US); James Patrick Langan, Aurora, CO (US); Brooks John Kelly, Aurora, CO (US); Huntington Davis, Aurora, CO (US)

(73) Assignee: MYCOTECHNOLOGY, INC., Aurora, CO (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/501,736

(22) Filed: Oct. 14, 2021

(65) Prior Publication Data

US 2022/0030911 A1 Feb. 3, 2022

Related U.S. Application Data

(63) Continuation of application No. 16/666,936, filed on Oct. 29, 2019, now Pat. No. 11,166,477, which is a continuation-in-part of application No. 16/025,365, filed on Jul. 2, 2018, now Pat. No. 10,806,101, which is a continuation-in-part of application No. 15/488,183, filed on Apr. 14, 2017, now Pat. No. 10,010,103.

(60) Provisional application No. 62/857,642, filed on Jun. 5, 2019, provisional application No. 62/793,111, filed on Jan. 16, 2019, provisional application No. 62/752,158, filed on Oct. 29, 2018, provisional application No. 62/322,726, filed on Apr. 14, 2016.

(51) Int. Cl.

| | |
|---|---|
| A23L 31/00 | (2016.01) |
| A23C 11/10 | (2021.01) |
| A23J 1/14 | (2006.01) |
| A23J 3/14 | (2006.01) |
| A23J 3/22 | (2006.01) |
| A23J 3/26 | (2006.01) |
| A23L 5/10 | (2016.01) |
| A23L 7/104 | (2016.01) |
| A23L 11/50 | (2021.01) |

(52) U.S. Cl.
CPC ............... *A23J 3/227* (2013.01); *A23C 11/10* (2013.01); *A23J 1/14* (2013.01); *A23J 3/14* (2013.01); *A23J 3/26* (2013.01); *A23L 5/10* (2016.08); *A23L 7/104* (2016.08); *A23L 11/50* (2021.01); *A23L 31/00* (2016.08); *A23V 2002/00* (2013.01)

(58) Field of Classification Search
CPC ...... A23J 3/227; A23J 1/14; A23J 3/14; A23J 3/26; A23L 7/104; A23L 5/10; A23L 3/00; A23L 11/50; A23C 11/10; A23V 2002/00
USPC .......................................................... 426/61
See application file for complete search history.

(56) References Cited

U.S. PATENT DOCUMENTS

| | | | |
|---|---|---|---|
| 1,822,227 | A | 9/1931 | Lendrick et al. |
| 2,419,515 | A | 4/1947 | Wolk |
| 2,451,567 | A | 10/1948 | Elmer et al. |
| 2,505,811 | A | 5/1950 | Szuecs |
| 2,693,664 | A | 11/1954 | Szuecs |
| 2,693,665 | A | 11/1954 | Humfeld |
| 2,761,246 | A | 9/1956 | Szuecs |
| 2,928,210 | A | 3/1960 | Cirillo |
| 3,086,320 | A | 4/1963 | Heinemann |
| 3,701,714 | A | 10/1972 | Okada et al. |
| 3,749,584 | A | 7/1973 | Kurtzmann et al. |
| 3,810,997 | A | 5/1974 | Chien |
| 3,885,048 | A | 5/1975 | Liggett |

(Continued)

FOREIGN PATENT DOCUMENTS

| | | |
|---|---|---|
| CN | 102860541 | 1/2013 |
| CN | 104082037 A | 10/2014 |

(Continued)

OTHER PUBLICATIONS

JP-2005-065643—MachineTranslation (Year: 2005).*

(Continued)

*Primary Examiner* — Hamid R Badr
(74) *Attorney, Agent, or Firm* — Leydig, Voit & Mayer, Ltd.

(57) ABSTRACT

Provided is a food composition which include a myceliated high-protein food product and methods to make such compositions, which are mixtures of myceliated high-protein food products and other edible materials. A food composition includes dairy alternative products, ready to mix beverages and beverage bases; extruded and extruded/puffed products; sheeted baked goods; meat analogs and extenders; baked goods and baking mixes; granola; and soups/soup bases. Food compositions also include texturized plant protein which can be used for making meat-structured plant protein meat analog or meat extender products. The food compositions have reduced undesirable flavors and reduced undesirable aromas due to use of myceliated high-protein food products as compared to use of similar high-protein material that is not myceliated.

19 Claims, No Drawings

(56) References Cited

U.S. PATENT DOCUMENTS

| | | |
|---|---|---|
| 4,071,973 A | 2/1978 | Izuka |
| 4,590,160 A | 5/1986 | Nishihashi et al. |
| 4,891,220 A | 1/1990 | Donzis et al. |
| 5,026,721 A | 6/1991 | Dudrick et al. |
| 5,934,012 A | 8/1999 | Holtz et al. |
| 6,045,834 A | 4/2000 | Howes et al. |
| 6,277,396 B1 | 8/2001 | Dente |
| 6,476,003 B1 | 11/2002 | Jordan et al. |
| 6,490,824 B1 | 12/2002 | Maekawa et al. |
| 6,558,943 B1 | 5/2003 | Li et al. |
| 6,569,475 B2 | 5/2003 | Song et al. |
| 8,153,174 B2 | 4/2012 | Hansen |
| 8,535,907 B2 | 1/2013 | Tang |
| 8,486,675 B2 | 7/2013 | Tang |
| 8,529,981 B2 | 9/2013 | Tang |
| 8,623,445 B2 | 1/2014 | Tang |
| 8,685,475 B2 | 4/2014 | Kwack |
| 8,821,955 B2 | 9/2014 | Tang |
| 9,034,402 B2 | 5/2015 | Wong |
| 9,068,171 B2 | 6/2015 | Kelly et al. |
| 9,301,539 B2 | 4/2016 | Appel et al. |
| 9,427,008 B2 | 8/2016 | Kelly et al. |
| 9,480,274 B2 | 11/2016 | Tang |
| 9,572,363 B2 | 2/2017 | Langan et al. |
| 9,572,364 B2 | 2/2017 | Langan et al. |
| 10,010,103 B2 | 7/2018 | Soni et al. |
| 10,231,469 B2 | 3/2019 | Kelly et al. |
| 10,709,157 B2 | 7/2020 | Langan et al. |
| 10,806,101 B2 | 10/2020 | Soni et al. |
| 10,980,257 B2 | 4/2021 | Langan et al. |
| 11,166,477 B2 | 11/2021 | Schmidt et al. |
| 11,297,861 B2 | 4/2022 | Nadal et al. |
| 11,343,978 B2 | 5/2022 | Soni et al. |
| 2002/0082418 A1 | 6/2002 | Ikewaki et al. |
| 2002/0137155 A1 | 9/2002 | Wasser et al. |
| 2003/0208796 A1 | 11/2003 | Song et al. |
| 2004/0009143 A1 | 1/2004 | Golz-Berner et al. |
| 2004/0035047 A1 | 2/2004 | Hwang et al. |
| 2004/0211721 A1 | 10/2004 | Stamets |
| 2005/0064079 A1 | 3/2005 | Allen et al. |
| 2005/0180989 A1 | 8/2005 | Matsunaga |
| 2005/0255126 A1 | 11/2005 | Tsubaki et al. |
| 2005/0273875 A1 | 12/2005 | Elias |
| 2006/0014267 A1 | 1/2006 | Cleaver et al. |
| 2006/0134294 A1 | 6/2006 | McKee et al. |
| 2006/0280753 A1 | 12/2006 | McNeary |
| 2007/0160726 A1 | 7/2007 | Fujii et al. |
| 2008/0031892 A1 | 2/2008 | Kristiansen |
| 2008/0057162 A1 | 3/2008 | Brucker et al. |
| 2008/0107783 A1 | 5/2008 | Anijs et al. |
| 2008/0171104 A1 | 7/2008 | Zhu et al. |
| 2008/0193595 A1 | 8/2008 | De Vuyst et al. |
| 2008/0264858 A1 | 10/2008 | Stamets |
| 2008/0274234 A1 | 11/2008 | Miller |
| 2008/0296223 A1 | 12/2008 | Hiromoto |
| 2008/0299645 A1 | 12/2008 | Cleaver et al. |
| 2008/0305212 A1 | 12/2008 | Wong et al. |
| 2009/0018196 A1 | 1/2009 | Bjork et al. |
| 2009/0047236 A1 | 2/2009 | Stamets |
| 2009/0047237 A1 | 2/2009 | Stamets |
| 2009/0053363 A1 | 2/2009 | An |
| 2009/0472364 | 2/2009 | Stamets |
| 2009/0098244 A1 | 4/2009 | Schatzma Yr et al. |
| 2009/0104310 A1 | 4/2009 | Nakajima et al. |
| 2009/0130138 A1 | 5/2009 | Stamets |
| 2009/0220645 A1 | 9/2009 | Martinez et al. |
| 2009/0280212 A1 | 11/2009 | Sugimoto et al. |
| 2009/0291188 A1 | 11/2009 | Milne et al. |
| 2010/0005524 A1 | 1/2010 | Blythe et al. |
| 2010/0055241 A1 | 3/2010 | Nakano et al. |
| 2010/0183765 A1 | 7/2010 | Laan Van Der et al. |
| 2010/0203189 A1 | 8/2010 | Holliday |
| 2010/0203194 A1 | 8/2010 | Salminen et al. |
| 2010/0221385 A1 | 9/2010 | Matsui et al. |
| 2010/0239711 A1 | 9/2010 | Li et al. |
| 2010/0266726 A1 | 10/2010 | Ogura et al. |
| 2010/0316763 A1 | 12/2010 | Choi et al. |
| 2011/0008384 A1 | 1/2011 | Stamets |
| 2011/0052758 A1 | 3/2011 | Greiner-Stoeffele et al. |
| 2011/0070332 A1 | 3/2011 | Bernaert et al. |
| 2011/0081448 A1 | 4/2011 | Dunphy et al. |
| 2011/0091579 A1 | 4/2011 | Hausman |
| 2011/0123675 A1 | 5/2011 | Bernaert et al. |
| 2011/0189220 A1 | 8/2011 | Yang et al. |
| 2011/0200551 A1 | 8/2011 | Stamets |
| 2011/0206721 A1 | 8/2011 | Nair |
| 2011/0229616 A1 | 9/2011 | Anijs et al. |
| 2011/0250339 A1 | 10/2011 | Onishi et al. |
| 2011/0262593 A1 | 10/2011 | Binggeli et al. |
| 2011/0268980 A1 | 11/2011 | Kalisz et al. |
| 2012/0017781 A1 | 1/2012 | Ceccarelli |
| 2012/0027889 A1 | 2/2012 | Portella |
| 2012/0028345 A1 | 2/2012 | Ibrahim et al. |
| 2012/0034339 A1 | 2/2012 | Guiliani et al. |
| 2012/0034344 A1 | 2/2012 | Menon et al. |
| 2012/0082754 A1 | 4/2012 | Holliday |
| 2012/0100249 A1 | 4/2012 | Laan Van Der et al. |
| 2012/0128823 A1 | 5/2012 | Camu et al. |
| 2012/0171308 A1 | 7/2012 | Moreira et al. |
| 2012/0177781 A1 | 7/2012 | Hayashi |
| 2012/0190093 A1 | 7/2012 | Fukuda |
| 2012/0209609 A1 | 8/2012 | Moreno et al. |
| 2012/0231114 A1 | 9/2012 | Oliveira et al. |
| 2012/0244254 A1 | 9/2012 | Takahashi et al. |
| 2012/0258236 A1 | 10/2012 | Cruz Serna et al. |
| 2012/0321744 A1 | 12/2012 | Chhun et al. |
| 2013/0209608 A1 | 8/2013 | Berends et al. |
| 2013/0337114 A1 | 12/2013 | Binggeli et al. |
| 2014/0065131 A1 | 3/2014 | Kelly et al. |
| 2014/0065263 A1 | 3/2014 | Kelly et al. |
| 2014/0105928 A1 | 4/2014 | Stamets |
| 2014/0170264 A1 | 6/2014 | Kelly et al. |
| 2014/0302560 A1 | 10/2014 | Kelly |
| 2014/0342036 A1 | 11/2014 | Appel et al. |
| 2015/0044356 A1 | 2/2015 | Bootsma |
| 2015/0080296 A1 | 3/2015 | Silver et al. |
| 2015/0216918 A1 | 8/2015 | Nair |
| 2015/0257405 A1 | 9/2015 | Kelly et al. |
| 2015/0257406 A1 | 9/2015 | Kelly et al. |
| 2015/0272155 A1 | 10/2015 | Kelly et al. |
| 2016/0058049 A1 | 3/2016 | Langan et al. |
| 2016/0120201 A9 | 5/2016 | Kelly et al. |
| 2016/0249660 A1 | 9/2016 | Langan et al. |
| 2016/0286831 A1 | 10/2016 | Bourgeois et al. |
| 2017/0156383 A1 | 6/2017 | Langan et al. |
| 2017/0245508 A1 | 8/2017 | Yang et al. |
| 2017/0295837 A1 | 10/2017 | Soni et al. |
| 2018/0064148 A1 | 3/2018 | Langan et al. |
| 2018/0303044 A1 | 10/2018 | Soni et al. |
| 2019/0254305 A1 | 8/2019 | Kelly et al. |
| 2019/0364921 A1 | 12/2019 | Kelly et al. |
| 2020/0060310 A1 | 2/2020 | Schmidt et al. |
| 2020/0245640 A1 | 8/2020 | Clark et al. |
| 2020/0268011 A1 | 8/2020 | Kelly et al. |
| 2021/0030044 A1 | 2/2021 | Langan et al. |
| 2021/0045298 A1 | 2/2021 | Soni et al. |
| 2021/0251271 A1 | 8/2021 | Soni et al. |
| 2021/0267143 A1 | 9/2021 | Soni et al. |
| 2021/0274818 A1 | 9/2021 | Langan et al. |
| 2021/0401013 A1 | 12/2021 | Nadal |
| 2022/0053789 A1 | 2/2022 | Kelly et al. |
| 2022/0095646 A1 | 3/2022 | Soni et al. |
| 2022/0104523 A1 | 4/2022 | Clark et al. |
| 2022/0183333 A1 | 6/2022 | Nadal et al. |
| 2022/0193162 A1 | 6/2022 | Clark et al. |
| 2022/0225653 A1 | 7/2022 | Soni et al. |
| 2022/0232854 A1 | 7/2022 | Nadal et al. |
| 2022/0322617 A1 | 10/2022 | Soni et al. |

(56) References Cited

U.S. PATENT DOCUMENTS

| | | |
|---|---|---|
| 2022/0339225 A1 | 10/2022 | Langan et al. |
| 2023/0210154 A1 | 7/2023 | Nadal et al. |

FOREIGN PATENT DOCUMENTS

| | | |
|---|---|---|
| CN | 106174475 A | 12/2016 |
| DE | 4341316 | 6/1995 |
| EP | 1173544 | 1/2002 |
| EP | 946106 | 5/2002 |
| EP | 1428440 | 8/2006 |
| EP | 1695631 | 8/2006 |
| EP | 1534088 | 11/2011 |
| EP | 2474221 | 7/2012 |
| EP | 2166879 B1 | 10/2014 |
| EP | 1205114 A1 | 5/2015 |
| EP | 2591683 | 1/2017 |
| GB | 2059243 | 4/1981 |
| JP | S59-135840 | 8/1984 |
| JP | S61-219340 | 9/1986 |
| JP | S62-091161 | 4/1987 |
| JP | H11-346657 | 12/1999 |
| JP | 2005-027540 | 2/2005 |
| JP | 2005-065643 A | 3/2005 |
| JP | 2007-037527 A | 2/2007 |
| JP | 4126037 | 7/2008 |
| JP | 2011-103901 | 6/2011 |
| JP | 5037742 | 10/2012 |
| JP | 2015-505673 A | 2/2015 |
| KR | 10-2003-0040681 A | 5/2003 |
| KR | 10-2003-0082859 A | 10/2003 |
| KR | 10-2004-0071926 A | 8/2004 |
| KR | 10-2005-0097662 A | 10/2005 |
| KR | 10-1487724 | 2/2015 |
| NL | 7322 C | 4/1921 |
| WO | WO 2001032830 | 5/2001 |
| WO | WO 2006107208 | 10/2006 |
| WO | WO 2007031186 | 3/2007 |
| WO | WO 2010038867 | 4/2010 |
| WO | WO 2011012680 | 2/2011 |
| WO | WO 2011032244 | 3/2011 |
| WO | WO 2011151831 | 12/2011 |
| WO | WO 2013082574 A2 | 6/2013 |
| WO | WO 2013171194 | 11/2013 |
| WO | WO 2014055035 A1 | 4/2014 |
| WO | WO 2014145256 | 9/2014 |
| WO | WO 2014145265 | 9/2014 |
| WO | WO 2016033241 | 3/2016 |
| WO | WO 2016138476 | 9/2016 |
| WO | WO 2020/232347 A | 11/2020 |

OTHER PUBLICATIONS

Brazil Office Action and Search Report issued in BR 112018070148-3.and published Jan. 18, 2022.

Israel Official Action corresponding to IL 285008, dated Feb. 20, 2022.

Mexico Official Action issued in MX/a/2018/012324 dated Jan. 24, 2022.

Singapore Supplementary Examination Report issued In SG 11201808284 dated Jan. 27, 2022.

Ali, "Production of pyrazine flavours by mycelial fungi", *Doctoral Dissertation*, University of Pretoria (2010).

Australian Examination Report dated Sep. 4, 2019 in AU 2017248805.

Berovic et al., "Submerged cultivation of Ganoderma lucidum biomass and immunostimulatory effects of fungal polysaccharides", *J. Biotechnol.*, 103(1):77-86 (2003).

Beuchat, "13 Indigenous Fermented Foods", *Biotechnology*, 505-559 (2001).

Bok et al., "Antitumor sterols from the mycelia of Cordyceps sinensis", *Phytochemistry*, 51:891-898 (1999).

Buffo et al., "Coffee flavour: an overview", *Flavour and Fragrance Journal*, 19:99-104 (2004).

Canadian first Office Action dated Mar. 12, 2020 in 3018423.

Chang et al., "Gandoderma lucidum Extract Promotes Immune Responses in Normal BALB/c Mice in Vivo", *In Vivo*, 23:755-760 (2009).

Chang et al., "Bioactive Polysaccharides from Traditional Chinese Medicine Herbs as Anticancer Adjuvants", *The Journal of Alternative and Complementary Medicine*, 8(5): 559-565 (2002).

Chinese Office Action and Search Report dated Jul. 12, 2021 in Chinese Patent Application No. CN2017800235418.

Chinese Second Office Action and Search Report dated Nov. 29, 2021 in Chinese Patent Application No. CN2017800235418.

Crafack et al., "Influencing cocoa flavour using Pichia Kluyveri and Kluyveromyces marxianus in a defined mixed starter culture for cocoa fermentation", *International Journal of Food Microbiology*, 167:103-116 (2013).

De Melo et al., "Influence of Flammulina velutipes mycelia culture conditions on antimicrobial metabolite production", *Mycoscience*, 50(1):78-81 (2009).

Diekman, "Sweeteners Facts and Fallacies: Learn the Truth about the Different Types of Sweeteners to Better Counsel Patients", *Today's Dietitian*, 14(9):42-45 (2012).

Emden, (2015) "Decaffeination 101: Four Ways to Decaffeinate Coffee", Coffee Connection. Available on the Internet at URL: http://www.coffeeconfidential.org1health/decaffeination/ [last accessed Jan. 29, 2015].

Encyclopedia Britannica (2014) Louis Pasteur, Datasheet. Available on the Internet at URL: http://www.britannica.com/Ebchecked/topic/445964/Louis-Pasteur [last accessed Feb. 6, 2014].

Endo et al. "Effect of Heat Treatment on the Lipid Peroxide Content and Aokusami (Beany Flavor) of Soymilk", Food Sci. Technol Res. 10 (3), 328(3): 328-333 (2004).

European Examination Report dated Mar. 18, 2020 in EP 17783294.6.

European Examination Report dated Jul. 16, 2020 in EP 17783294.6.

European Examination Report dated Sep. 22, 2020 in EP 17783294.6.

European Search Report corresponding to European Patent Application No. 14765389.3, dated Nov. 17, 2016.

European Search Report corresponding to European Patent Application No. 14763975.1, dated Sep. 14, 2016.

European Search Report dated Oct. 4, 2019 in EP 17783294.6.

Fan et al., "Use of various coffee industry residues for the cultivation of Pleurotus ostreatus in solid state fermentation", *Acat Biotechnol.*, 20(1):41-52 (2000).

Firenzuoli et al., "The Medicinal Mushroom Agaricus blazei Murrill: Review of Literature and Pharmaco-Toxicological Problems", *Evid. Based Complement Alternat. Med.*, 5(1):3-15 (2008).

Foster, (2014) "What is Mycelium?" Conjecture Corporation. Available on the Internet at URL: http://www.wisegeek.org/what-is-mycelium.htm [last accessed Jul. 28, 2014].

Hadar et al., "Chemical Composition of the Edible Mushroom *Pleurotus ostreatus* Produced by Fermentation", *Appl. Environ. Microbiol. Technol.*, 51(6):1352-1354 (1986).

Han, "Solid-state fermentation of cornmeal with the basidiomycete Ganoderma lucidum for degrading starch and upgrading nutritional value", *J. Appl. Micro.*, 99:910-915 (2005).

Hashim, "Effect of Processing on Flavour Precursors, Pyrazines and Flavour Quality of Malaysian Cocoa Beans", PhD Thesis, Universiti Putra Malaysia (1997).

He et al., "Patented Techniques for Detoxification of Mycotoxins in Feeds and Food Matrices", *Recent Patents on Food, Nutrition & Agriculture*, 2:96-104 (2010).

Ikrawan, "Influence of Carboxypeptidases on Cocoa Specific Aroma Precursors and Methylpyrazines in Under-Fermented Cocoa Beans", PhD Thesis, Universiti Putra Malaysia (2003).

Ikrang et al, "Effects of Temperature and Steeping Time on the Proximate Compositions and Selected Physical Properties of Soybean Flour", Nigerian Journal of Technological Development, 17:1 (Mar. 2020).

International Preliminary Report on Patentability corresponding to International Patent Application No. PCT/US2014/029989, dated Sep. 15, 2015.

(56) References Cited

OTHER PUBLICATIONS

International Preliminary Report on Patentability corresponding to International Patent Application No. PCT/US2014/029998, dated Sep. 15, 2015.
International Preliminary Report on Patentability corresponding to International Patent Application No. PCT/US2017/027731, dated Oct. 25, 2018.
International Search Report and the Written Opinion corresponding to International Patent Application No. PCT/US14/29989, dated Aug. 12, 2014.
International Search Report and the Written Opinion corresponding to International Patent Application No. PCT/US14/29998, dated Sep. 11, 2014.
International Search Report and the Written Opinion corresponding to International Patent Application No. PCT/US2015/047036 dated Jan. 29, 2016.
International Search Report and the Written Opinion corresponding to International Patent Application No. PCT/US2016/019929, dated May 19, 2016.
International Search Report and the Written Opinion corresponding to International Patent Application No. PCT/US2017/027731, dated Jul. 19, 2017.
International Search Report and the Written Opinion corresponding to International Patent Application No. PCT/US2019/058470, dated Jan. 14, 2020.
International Search Report and the Written Opinion corresponding to International Patent Application No. PCT/US2020/015010, dated Apr. 23, 2020.
International Preliminary Report on Patentability corresponding to International Patent Application No. PCT/US2020/015010, dated Aug. 5, 2021.
International Preliminary Report on Patentability corresponding to International Patent Application PCT/US2019/058470 dated Apr. 27, 2021.
Ishikawa et al., "Antimicrobial Cuparene-Type Sesquiterpenes, Enokipodins C and D, from a Mycelial Culture of Flammulina velutipes", *J. Nat. Prod.*, 64(7):932-934 (2001).
Japanese Office Action corresponding to Japanese Patent Application No. 2016503300, dated Sep. 21, 2016.
Japanese Office Action corresponding to Japanese Patent Application No. 2016503304, dated Sep. 30, 2016.
Japanese Office Action corresponding to Japanese Patent Application No. 2018-554367, dated Nov. 18, 2019.
Japanese Office Action corresponding to Japanese Patent Application No. 2018-55436, dated Sep. 2, 2020.
Jonathan et al., "Evaluation of Ten Wild Nigerian Mushrooms for Amylase and Cellulase Activities", Mycobiol. 39(20:103-108 (2011).
Kamimura, "Removal of Mycotoxins during Food Processing", *Tokyo Metropolitan Research Laboratory of Public Health*, 88-94 (1989).
Kang, "Studies on chemical constituents in the mycelia from fermented culture of Flarnmulina velutipes", *Zhongguo Zhong Yao Za Zhi.*, 30(30):193-195. [Abstract] (2005).
Kang, "Studies on chemical constituents of the mycelia from fermented culture of Flammulina velutipes", *Zhongguo Zhong Yao Za Zhi.*,28(11):1038-1040. [Abstract] (2003).
Konno et al., "Anticancer and hypoglycemic effects of polysaccharides in edible and medicinal Maitake mushroom [Grifola frondosa (Dicks.: Fr.) SF Gray]", *International Journal of Medicinal Mushrooms*, 4(3):10-21 (2002).
Korean Office Action dated Aug. 26, 2020 in Korean Patent Application No. 10-2018-7032846.
Korean Decision of Rejection dated Feb. 22, 2021 in Korean Patent Application No. 10-2018-7032846.
Korean Decision of Rejection dated May 31, 2021 in Korean Patent Application No. 10-2018-7032846.
Korean Decision of Rejection dated Nov. 25, 2021 in Korean Patent Application No. 10-2021-7027364.
Kuo et al., "Cordyceps sinensis as an Immunomodulatory Agent," *Am. J. Chin. Med.*, 24:111-125 (1996).

Lakshmi et al., "Antiperoxidative, anti-inflammatory, and antimutagenic activities of ethanol extract of the mycelium of Ganoderma lucidum occurring in South India", *Teratog. Carcinog. Mutagen.*, 1:85-97. [Abstract] (2003).
Lee et al., "Biological activities of the polysaccharides produced from submerged culture of the edible Basidiomycete Grifolafrondosa", *Enzyme and Microbial Technology*, 32(5):574-581 (2003).
Lefeber et al., "On-farm implementation of a starter culture for improved cocoa bean fermentation and its influence on the flavour of chocolates produced thereof", *Food Microbiology*, 30:379-392 (2012).
Lelik et al., Production of the Mycelium of Shitake (*Lentinus edodes*) Mushroom and Investigation of its Bioactive Compounds: *Acta Alimentaria*26(3):271-277 (1997).
Liu et al., "Improving the Fermentation Production of the Individual Key Triterpene Ganoderic Acid Me by the Medicinal Fungus Ganodenna lucidum in Submerged Culture", *Molecules*, 17:12575-12586 (2012).
McMahon (2014) "How Can I Make Tempeh?" Conjecture Corporation. Available on the Internet at URL: http://www.wisegeek.com/how-can-i-make-tempeh.htm [last accessed Jul. 28, 2014].
MedlinePlus (2014) "Medical Dictionary Datasheet: Autoclave," Merriam-Webster, Inc. Available on the Internet at URL: http://www.merriam-webster.com/medlineplus/autoclave [last accessed Feb. 7, 2014].
MicrobiologyBytes (2009) "Introduction to Mycology", Microbiology Notes Datasheet. Available on the Internet at URL: http://www.microbiologybytes.com/introduction/myc1.html [last accessed Feb. 6, 2014].
Mind Media (2014) "Eating mycelium to trip", Shroomery. Available on the Internet at URL: https://www.shroomery.org/forums/showflat.php/Number/1197948 [last accessed Jul. 28, 2014].
Mind Media (Oct. 12, 2006) "Liquid Culture Basics", Shroomery. Available on the Internet at URL: https://www.shroomery.org/9145 [last accessed Jun. 12, 20171.
Morris et al., "Immunomodulating Effects of Hot-Water Extract From Pleurotus Ostreatus Mycelium on Cyclophosphamide Treated Mice", *Micologia Aplicada Internacional.*, 15(1):7-13. [Abstract] (2003).
Mycotopia (2014) "Eat Mycelium cakes?" Mycotopia Community Software. Available on the Internet at URL: https://mycotopia.net/topic/9526-eat-mycelium-cakes/ [last accessed Jul. 28, 2014].
Nagai et al., "Characterization of honey from different floral sources. Its functional properties and effects of honey species on storage of meat", *Food Chemistry*, 97: 256-262.
NameBright "Technique Sheet: Culture Media for Fungi," Available on the Internet at URL: www.centralpamushroomclub.org/sites/default/files/culture.pdf 141966 [last accessed Feb. 12, 2015].
Non-Final Rejection corresponding to U.S. Appl. No. 13/844,685, dated Feb. 19, 2014.
Nowrousian et al., "The novel ER membrane protein PR041 is essential for sexual development in the filamentous fungus Sordaria macrospora", *Molecular Microbiology*, 64(4):923-937 (2007).
Ogundero, "Thermophilic fungi and fermenting cacao beans in Nigeria", *Mycopathologia*, 82:159-165 (1983).
Osen, Raffael Josef Johannes (Apr. 25, 2017) Doctoral Dissertation, "Texturization of pea protein isolates using high moisture extrusion cooking", Technical University of Munich.
Paterson, "Ganoderma—A therapeutic fungal biofactory", *Phytochemistry*, 67:1985-2001 (2006).
Roland et al, (2017) "Flavor Aspects of Pulse Ingredients," Cereal Chem. 94(1):58-65.
Schindler et al., "Improvement of the Aroma of Pea (*Pisum sativum*) Protein Extracts by Lactic Acid Fermentation", *Food Biotechnology*, 26(1): 58-74 (Abstract) (2012).
Schwan, "Cocoa Fermentations Conducted with a Defined Microbial Cocktail Inoculum", *Applied and Environmental Microbiology*, 64(4)1477-1483 (1998).
Schwan, "The Microbiology of Cocoa Fermentation and its Role in Chocolate Quality", *Critical Reviews in Food Science and Nutrition*, 44:205-221 (2004).

(56) References Cited

OTHER PUBLICATIONS

Shao et al., "Determination of nucleosides in natural Cordyceps sinensis and cultured Cordyceps mycelia by capillary electrophoresis", *Electrophoresis*, 22(1):144-150 (2001).
Simple Machines (2014) "Eat Mycelium?" FungiFun. Available on the Internet at URL: http://www.fungifun.org/forum/index.php?topic=913.0 [last accessed Jul. 28, 2014].
Singapore Search Report and Written Opinion dated Dec. 31, 2019 in SG 11201808284A.
Soderberg, Johanna (2013), "Functional properties of legume proteins compared to egg proteins and their potential egg replacers in vegan food" Independent Project in Food Science, Course EX0425, Swedish University of Agricultural Sciences; Department of Food Science; Pub No. 378, http://stud.epsilon.slu.se.
Sone et al., "Structures and Antitumor Activities of the Polysaccharides Isolated from Fruiting Body and the Growing Culture of Mycelium of Ganoderma lucidum", *Agric. Biol. Chem.*, 49(9):2641-2653 (1985).
Song et al., "Antioxidant properties of Antrodia camphorata in submerged culture", *Journal of Agricultural Food Chemistry*, 50:3322-3327 (2002).
Stamets, "Culturing Mushroom Mycelium on Agar Media", *Growing Gourmet and Medicinal Mushrooms*, 89-92 (2003).
Tang et al., "Fed-batch fermentation of Ganoderma lucidum for hyperproduction of polysaccharide and ganoderic acid", *Enzyme and Microbial. Technol.*, 31(1-2):20-28 (2002).
Taylor, "Measuring Fungal Growth", *Microorganisms and Biotechnology*, Chapter 3.8, p. 44 (2011).
Thammawat et al., "Isolation, Preliminary Enzyme Characterization and Optimization of Culture OParameters for Production of Naringinase Isolated from Aspergillus nigerBCC 25166", *Kasetsart J.Nat. Sci*, 42:61-72 (2008).
Tsubouchi et al., "Effect of roasting on ochratoxin A level in green coffee beans inoculated with Aspergillus ochraceus", *Mycopathologia*, 97:111-115 (1987).
Ulziijargal et al., "Nutrient Compositions of Culinary-Medicinal Mushroom Fruiting Bodies and Mycelia", *Int. J. Med. Mushrooms*, 13(4):343-349 (2011).
Wallace et al. (2016) The Nutritional Value and Health Benefits of Chickpeas and Hummus, Nutrients 8:766; doi:10.3390/nu8120766.
Wasser, "Medicinal mushrooms as a source of antitumor and immunomodulating polysaccharides," *Appl. Microbial. Biotechnol.*, 60:258-274 (2002).
Web Search History, Feb. 19, 2021.
WikiAnswers (2014) "Can You Eat Mycelium?" Answers. Available on the Internet at URL: http://www.answers.com/Q/Can_you_eat_mycelium [last accessed Jul. 28, 2014].
Willis et al., "Effect of Dietary Fungus Myceliated Grain on Broiler Performance and Enteric Colonization with Bifidobacteria and Salmonella", *International Journal of Poultry Science*, 9(1):48-52 (2010).
WiseGEEK (2014) "Eating Mycelium," Conjecture Corporation. Available on the Internet at URL: http://topics.wisegeek.org/topics.htm?eating-mycelium# [last accessed Jul. 28, 2014].
Wu et al., "Ling Zhi-8 mediates p53-dependent growth arrest of lung cancer cells proliferation via the ribosomal protein S7-MDM2-p53 pathway", *Carcinogenesis*, 32(12):1890-1896 (2011).
Yang et al. "Sensory quality of soymilk and tofu from soybeans lacking lipoxygenases", Food Science & Nutrition 4(2):207-215 (2016).
Yin et al., "Purification, Characterization and Immuno-Modulating Properties of Polysaccharides Isolated from Flammulina velutipes Mycelium", *Am. J. Chin. Med.* 38(1):191-204 (2010).
Zhang et al., "Induction ofHL-60 apoptosis by ethyl acetate of Cordyceps sinensis fungal mycelium", *Life Sciences*, 75:2911-2919 (2004).
Zhang et al., "Mycelial growth and polysaccharide content of Polyporus umbellatus", *Journal of Medicinal Plants Research*, 4(18):1847-1852 (2010).
Zhong et al., "Submerged Cultivation of Medicinal Mushrooms for Production of Valuable Bioactive Metabolites", *Adv. Biochem. Engin. Biotechnol.*, 87:25-59 (2004).
Zhou et al., "Cordyceps fungi: natural products, pharmacological functions and developmental products", *Journal of Pharmacy and Pharmacology*, 61:279-291 (2009).
Zoklet "Eating Mycelium?" (2014) Jelsoft Enterprises Ltd. Available on the Internet at URL: http://www.zoklet.net/bbs/showthread.php?t=141966 [last accessed Jul. 28, 2014].
U.S. Appl. No. 13/844,685 / 2014-0302560A1 / U.S. Pat. No. 9,068,171, filed Mar. 15, 2013 /Oct. 9, 2014 / Jun. 30, 2015, Brooks John Kelly.
U.S. Appl. No. 13/859,719 / 2014-0065263A1 / U.S. Pat. No. 9,427,008, filed Apr. 9, 2013 / Mar. 6, 2014 / Aug. 30, 2016, Brooks John Kelly.
U.S. Appl. No. 13/874,832 / 2014/0065131A1, filed May 1, 2013 / Mar. 6, 2014, Brooks John Kelly.
U.S. Appl. No. 14/020,512 / 2014-0170264A1, filed Sep. 6, 2013 / Jun. 19, 2014, Brooks John Kelly.
U.S. Appl. No. 14/020,781, filed Sep. 6, 2013, Brooks John Kelly.
U.S. Appl. No. 14/659,057 / 2015-0257405A1, filed Mar. 16, 2015 / Sep. 17, 2015, Brooks John Kelly.
U.S. Appl. No. 14/659,595 / 2015/0257406A1 / U.S. Pat. No. 10,231,469, filed Mar. 16, 2015 / Sep. 17, 2015 / Mar. 19, 2019, Brooks John Kelly.
U.S. Appl. No. 14/734,943 / 2015-0272155A1, filed Jun. 9, 2015 / Oct. 1, 2015, Brooks John Kelly.
U.S. Appl. No. 14/836,830 / 2016-0058049A1 / U.S. Pat. No. 9,572,363, filed Aug. 26, 2015 / Mar. 3, 2016 / Feb. 21, 2017, James Patrick Langan.
U.S. Appl. No. 15/144,164 / 2016/0249660A1 / U.S. Pat. No. 9,572,364, filed May 2, 2016 / Sep. 1, 2016 / Feb. 21, 2017, James Patrick Langan.
U.S. Appl. No. 15/438,576 / 2017-0156383A1 U.S. Pat. No. 10,709,157, filed Feb. 21, 2017 / Jun. 8, 2017 / Jul. 14, 2020, James Patrick Langan.
U.S. Appl. No. 15/551,894 / 2018-064148A1 / U.S. Pat. No. 10,980,257, filed Feb. 26, 2016 / Mar. 8, 2018 / Apr. 20, 2021, James Patrick Langan.
U.S. Appl. No. 15/488,183 / 2017-02958387A1 / U.S. Pat. No. 10,010,103, filed Apr. 14, 2017 / Oct. 19, 2017 / Jul. 3, 2018, Bhupendra Kumar Soni.
U.S. Appl. No. 16/025,365 / 2018-0303044-A1 U.S. Pat. No. 10,806,101, filed Jul. 2, 2018 / Oct. 25, 2018 / Oct. 20, 2020, Bhupendra Kumar Soni.
U.S. Appl. No. 16/261,018 / 2019-0254305-A1, filed Jan. 29, 2019 / Aug. 22, 2019, Brooks John Kelly.
U.S. Appl. No. 16/544,756 / 2019/0364921 A1, filed Sep. 19, 2019 / Dec. 5, 2019, Brooks John Kelly.
U.S. Appl. No. 16/666,936 / 2020/0060310-A1 / U.S. Pat. No. 11,166,477, filed Oct. 29, 2019 / Feb. 27, 2020 / Nov. 9, 2021, Lisa Schmidt.
U.S. Appl. No. 16/716,097, filed Dec. 16, 2019, Huntington Davis.
U.S. Appl. No. 16/780,404 US 2020/0245640, filed Feb. 3, 2020 Aug. 6, 2020, Anthony J. Clark.
U.S. Appl. No. 16/806,527 US 2020/0268011, filed Mar. 2, 2020 Aug. 27, 2020, Brooks John Kelly.
U.S. Appl. No. 16/927,837 US 2021/0030044 A1, filed Jul. 13, 2020 Feb. 4, 2021, James Patrick Langan.
U.S. Appl. No. 17/074,630 US 2021/0045298 A1, filed Oct. 20, 2020 Feb. 18, 2021, Bhupendra Kumar Soni.
U.S. Appl. No. 17/055,870 2021/025127 1A1, filed Nov. 16, 2020 Aug. 19, 2021, Bhupendra Kumar Soni.
U.S. Appl. No. 17/233,656 2021/0274818 A1, filed Apr. 19, 2021 Sep. 9, 2021, James Patrick Langan.
U.S. Appl. No. 17/360,524, filed Jun. 28, 2021, Brooks John Kelly.
U.S. Appl. No. 17/359,048 2021/0401013 A1, filed Jun. 25, 2021, Marina Nadal.
U.S. Appl. No. 17/421,612, filed Jul. 8, 2021, Anthony J. Clark.
U.S. Appl. No. 17/424,402, filed Jul. 20, 2021, Bhupendra Kumar Soni.
U.S. Appl. No. 17/608,581, filed Nov. 3, 2021, Bhupendra Kumar Soni.

(56) References Cited

OTHER PUBLICATIONS

U.S. Appl. No. 17/608,383, filed Nov. 2, 2021, Marina Nadal.
U.S. Appl. No. 16/666,936, filed Oct. 29, 2019.
European Search Report corresponding to European Patent Application No. 21186497.0, dated Mar. 11, 2022.
International Preliminary Report on Patentability corresponding to International Patent Application PCT/US2020/033106 dated Nov. 16, 2021.
International Search Report and the Written Opinion corresponding to International Patent Application No. PCT/US2020/033106, dated Aug. 12, 2020.
Brazil Office Action dated May 25, 2022 in Brazil Patent Application No. BR 112018070148-3.
Chinese Decision of Rejection dated May 7, 2022 in Chinese Patent Application No. CN2017800235418.

* cited by examiner

MYCELIATED VEGETABLE PROTEIN AND FOOD COMPOSITIONS COMPRISING SAME

CROSS-REFERENCE TO RELATED APPLICATIONS

This patent application is a continuation of U.S. patent application Ser. No. 16/666,936, filed Oct. 29, 2019, which is a "continuation-in-part" of U.S. patent application Ser. No. 16/025,365, filed Jul. 2, 2018, entitled "Methods for the Production and Use of Myceliated High Protein Food Compositions,", now U.S. Pat. No. 10,806,101, which is a "continuation-in-part" of U.S. patent application Ser. No. 15/488,183, filed Apr. 14, 2017, entitled "Methods for the Production and Use of Myceliated High Protein Food Compositions," now U.S. Pat. No. 10,010,103, which claims the benefit of U.S. Provisional Application No. 62/322,726, filed Apr. 14, 2016, entitled "Methods for the Production and Use of Myceliated High Protein Food Compositions". U.S. patent application Ser. No. 16/666,936 also claims the benefit of U.S. Provisional Patent Application No. 62/752,158, filed Oct. 29, 2018, entitled "Myceliated Vegetable Protein and Food Compositions Comprising Same," U.S. Provisional Patent Application No. 62/857,642, filed Jun. 5, 2019, entitled "Methods for Making Texturized Vegetable Protein and Food Compositions Comprising Same," and U.S. Provisional Patent Application No. 62/793,111, filed Jan. 16, 2019, entitled "Reaction Flavor Systems for Fermented Vegetable Proteins," all of which are incorporated by reference in their entireties.

BACKGROUND OF THE INVENTION

There is a growing need for efficient, high quality and low-cost plant-based high-protein food sources with acceptable taste, flavor and/or aroma profiles. However, it has proven difficult to achieve such products, particularly with low cost vegetarian protein sources.

The present inventors have previously disclosed a method to prepare a myceliated high-protein food product, which includes culturing a filamentous fungus in an aqueous media which has a high level of protein, for example at least 20% protein by dry weight (w/w) and at least 50 g/L protein. The fungi can include *Pleurotus ostreatus, Pleurotus eryngii, Lepista nuda, Hericium erinaceus, Lentinula edodes, Agaricus blazeii, Laetiporus sulfureus* and combinations thereof.

There is also a need for processes for creating vegetarian and vegan products such as, alternative dairy alternative products, such as ice cream, yogurt, milk, pudding, cheese; ready to mix beverages and beverage bases for protein shakes and smoothies, dietary and nutritional beverages; extruded and extruded/puffed products, such as pasta noodles, crisps, and scoops, including breakfast cereals, sheeted baked goods such as tortillas, crackers, pizza crust; meat analogs and extenders, baked goods and baking mixes for breads, cookies, muffins, pancakes, waffles, donuts, brownies; bars, bars, such as breakfast bars, protein bars, and the like; granola products; soups and soup bases, and the like, which include plant proteins, as well as mixtures thereof that include a higher level of plant proteins, and do not impart undesirable odors or tastes due to the presence of these plant proteins.

There is also a need to create process flavors, also known as reaction flavors, which include plant proteins, as well as mixtures thereof that include a higher level of plant proteins, and do not impart undesirable odors or tastes due to the presence of these plant proteins. A reaction flavor is a flavor composition that can be used to impart, modify, or improve the flavor of a number of different foods and beverages. A process flavor is composed of a mixture of starting materials which are generally heated to yield a desired profile.

There is a need for meat-structured plant protein-derived meat extenders and meat analogs. This is best accomplished with textured versions of plant proteins, which have the protein fiber/alignment properties to best imitate the structure of meat. The art teaches textured soy protein or pea protein concentrate or isolate, processed using an extruder in the shape of rods or tubes. Textured soy or pea protein isolate is extruded into various shapes (chunks, flakes, nuggets, grains, and strips) and sizes, exiting the nozzle while still hot and expanding as it does so. The thermoplastic proteins are heated to 150-200° C., which denatures them into a fibrous, insoluble, porous network that can soak up as much as three times its weight in liquids. As the pressurized molten protein mixture exits the extruder, the sudden drop in pressure causes rapid expansion into a puffy solid that is then dried. As much as 50% protein when dry, textured plant protein can be rehydrated at a 2:1 ratio, which drops the percentage of protein to an approximation of ground meat at 16%.

However, in recent years, additional information has shown that there are certain nutritional problems with consuming raw, cooked, or processed soybeans. The raw soybean is known to contain numerous anti-nutrients. Pea protein provides foods with a beany and/or bitter taste and a beany, pea aroma.

There is therefore a need for efficient, high quality and low cost high-protein food sources with acceptable taste, flavor and/or aroma profiles, and for processes for creating improved vegetarian and vegan products such as, extruded and extruded/puffed products, meat analogs and extenders, all with improved odors and/or tastes due to the presence of these plant proteins, but contain alternatives to soy protein.

BRIEF SUMMARY OF THE INVENTION

The invention provides a method to prepare a food composition or compositions which comprise or include a myceliated high-protein food product. In one step, the method includes providing a myceliated high protein food product of the invention, e.g., a myceliated high-protein food product, wherein the myceliated high-protein food product is at least 50% (w/w) protein on a dry weight basis, wherein the myceliated high-protein is myceliated by an aqueous fungal culture, in a media comprising at least 50% protein in liquid culture; then, in another step, providing an edible material, and mixing the myceliated high protein food product of the invention and the edible material to form the food composition. In embodiments, the fungal culture comprises *Lentinula edodes, Agaricus* spp., *Pleurotus* spp., *Boletus* spp., or *Laetiporus* spp.; and the myceliated high-protein food product is derived from a plant source and has reduced undesirable flavors and reduced undesirable aromas compared to the high-protein material that is not myceliated. In embodiments, the food composition is a texturized plant protein which can be used in making, for example, meat-structured plant protein meat analog or meat extender products.

The present invention also includes food compositions made by the invention, and food compositions that comprise a myceliated high-protein food product, wherein the myceliated high-protein food product is at least 50% (w/w) protein on a dry weight basis, wherein the myceliated high-protein is myceliated by an aqueous fungal culture, in a media comprising at least 50% protein in liquid culture; and an edible material.

Alternatively, the method for preparing food compositions which comprise or include a myceliated high-protein food product, wherein the step of providing a myceliated high protein food product can include the following steps. In one embodiment, the myceliated high protein food product is produced by culturing a fungus in an aqueous media which includes a high-protein material, with amounts of protein of at least 50% (w/w) protein on a dry weight basis, and wherein the media comprises at least 50 g/L protein, inoculating with a fungal culture, and culturing the medium to produce the myceliated high protein food products whereby the flavor or taste of the myceliated high-protein food product is modulated compared to the high-protein material; providing an edible material; and mixing the myceliated high protein food product and the edible material to form the food composition. In embodiments, the fungal culture comprises *Lentinula edodes, Agaricus* spp., *Pleurotus* spp., *Boletus* spp., or *Laetiporus* spp.; and the myceliated high-protein food product is derived from a plant source and has reduced undesirable flavors and reduced undesirable aromas compared to the high-protein material that is not myceliated. In embodiments, the food composition is a texturized plant protein which can be used in making, for example, meat-structured plant protein meat analog or meat extender products. The present invention also includes food compositions made by the invention.

The present invention also discloses a texturized plant protein product comprising an extruded mixture comprising (a) a myceliated high-protein food product, wherein the myceliated high-protein food product is at least 50% (w/w) protein on a dry weight basis, wherein the myceliated high-protein food product is derived from pea and/or rice, wherein the myceliated high-protein product is myceliated by an aqueous fungal culture comprising *Lentinula edodes, Agaricus* spp., *Pleurotus* spp., *Boletus* spp., or *Laetiporus* spp., in a media comprising at least 50 g/L protein in liquid culture, and wherein the myceliated high-protein food product has reduced undesirable flavor and reduced undesirable aroma compared with a non-myceliated food product; and (b) an additional high-protein material comprising at least 50% protein on a dry weight basis, wherein the myceliated high-protein food product is present at between about 5% to 90% on a dry weight basis compared with the additional high-protein material. The present invention also includes texturized plant protein products made by the invention.

The food compositions of the invention comprise, without limitation, reaction flavors, dairy alternative products, ready to mix beverages and beverage bases; extruded and extruded/puffed products; sheeted baked goods; texturized plant-based protein products; baked goods and baking mixes; granola; and soups/soup bases.

DETAILED DESCRIPTION OF THE INVENTION

The inventors have previously disclosed culturing a filamentous fungus in a high protein media to provide a protein product, and also found that such treatment can also alter the taste, flavor or aroma of high protein food compositions in unexpected ways. The processes of the invention enable the production of food compositions, protein concentrates, isolates and high protein foodstuffs that have been imbued with mycelial material, thereby altering aspects of the media used in the production of products according to the methods of the present invention. The invention also presents the ability to stack protein sources to optimize amino acid profiles of products made according to the methods of the invention.

The invention includes methods to prepare a food composition or compositions which comprise or include a myceliated high-protein food product. In one step, the method includes providing a myceliated high protein food product of the invention, e.g., a myceliated high-protein food product, wherein the myceliated high-protein food product is at least 50% (w/w) protein on a dry weight basis, wherein the myceliated high-protein is myceliated by an aqueous fungal culture, in a media comprising at least 50% protein in liquid culture; then, in another step, providing an edible material, and mixing the myceliated high protein food product of the invention and the edible material to form the food composition. In embodiments, the fungal culture comprises *Lentinula edodes, Agaricus* spp., *Pleurotus* spp., *Boletus* spp., or *Laetiporus* spp.; and the myceliated high-protein food product is derived from a plant source and has reduced undesirable flavors and reduced undesirable aromas compared to the high-protein material that is not myceliated. In embodiments, the food composition is a texturized plant protein which can be used in making, for example, meat-structured plant protein meat analog or meat extender products.

The present invention also includes food compositions made by the invention, and food compositions that comprise a myceliated high-protein food product, wherein the myceliated high-protein food product is at least 50% (w/w) protein on a dry weight basis, wherein the myceliated high-protein is myceliated by an aqueous fungal culture, in a media comprising at least 50% protein in liquid culture; and an edible material.

Alternatively, the method for preparing food compositions which comprise or include a myceliated high-protein food product, wherein the step of providing a myceliated high protein food product can include the following steps. In one embodiment, the myceliated high protein food product is produced by culturing a fungus in an aqueous media which includes a high-protein material, with amounts of protein of at least 50% (w/w) protein on a dry weight basis, and wherein the media comprises at least 50 g/L protein, inoculating with a fungal culture, and culturing the medium to produce the myceliated high protein food products whereby the flavor or taste of the myceliated high-protein food product is modulated compared to the high-protein material; providing an edible material; and mixing the myceliated high protein food product and the edible material to form the food composition. In embodiments, the fungal culture comprises *Lentinula edodes, Agaricus* spp., *Pleurotus* spp., *Boletus* spp., or *Laetiporus* spp.; and the myceliated high-protein food product is derived from a plant source and has reduced undesirable flavors and reduced undesirable aromas compared to the high-protein material that is not myceliated. In embodiments, the food composition is a texturized plant protein which can be used in making, for example, meat-structured plant protein meat analog or meat extender products. The present invention also includes food compositions made by the invention.

The present invention also discloses a texturized plant protein product comprising an extruded mixture comprising (a) a myceliated high-protein food product, wherein the myceliated high-protein food product is at least 50% (w/w) protein on a dry weight basis, wherein the myceliated high-protein food product is derived from pea and/or rice, wherein the myceliated high-protein product is myceliated by an aqueous fungal culture comprising *Lentinula edodes, Agaricus* spp., *Pleurotus* spp., *Boletus* spp., or *Laetiporus* spp., in a media comprising at least 50 g/L protein in liquid culture, and wherein the myceliated high-protein food product has reduced undesirable flavor and reduced undesirable aroma compared with a non-myceliated food product; and (b) an additional high-protein material comprising at least 50% protein on a dry weight basis, wherein the myceliated high-protein food product is present at between about 5% to 90% on a dry weight basis compared with the additional high-protein material. The present invention also includes texturized plant protein products made by the invention.

In one embodiment, methods to make the textured plant-based protein product includes a method step to prepare or provide a myceliated high-protein food product. In order to prepare or provide a myceliated high-protein food product, the method may optionally include the steps of providing an aqueous media comprising a high-protein material. The aqueous media may comprise, consist of, or consist essentially of at least 50% (w/w) protein, on a dry weight basis and may also comprise at least 50 g/L protein. The media may also comprise, consist of or consist essentially of optional additional excipients as identified herein below. The aqueous media may be inoculated with a fungal culture, optionally comprising *Lentinula edodes, Agaricus* spp., *Pleurotus* spp., *Boletus* spp., or *Laetiporus* spp. The inoculated media may then be cultured to produce a myceliated high-protein food product, and the myceliated high-protein food product's taste, flavor, and/or aroma may be modulated compared to the high-protein material in the absence of the culturing step. Alternatively, the method step to provide a myceliated high-protein food product comprises providing a food product that is at least 50% (w/w) protein on a dry weight basis, wherein the myceliated high-protein food product is derived from pea and/or rice, wherein the myceliated high-protein product is myceliated by an aqueous fungal culture comprising *Lentinula edodes, Agaricus* spp., *Pleurotus* spp., *Boletus* spp., or *Laetiporus* spp., in a media comprising at least 50 g/L protein in liquid culture, and wherein the myceliated high-protein food product has reduced undesirable flavor and reduced undesirable aroma compared with a non-myceliated food product. The method steps to ferment and/or myceliate high protein materials to form a myceliated high protein material are described in more detail elsewhere herein.

In an embodiment, the present invention also includes a method to prepare a textured plant-based protein product useful for products such as meat-structured meat analogs or meat extenders. This textured plant-based meat analog or meat extender, in one embodiment, has texture associated with meat. The method optionally provides a "meat structured protein product" which can be made from the "texturized protein product" as disclosed herein. Integral to a meat structured protein product is a texturized protein product which refers to a product comprising protein fiber networks and/or aligned protein fibers that produce meat-like textures. It can be obtained from a dough after application of e.g., mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous and/or aligned structure (e.g., by rapid temperature and/or pressure change, rapid dehydration, chemical fixation, redox), and optional post-processing after the fibrous and/or aligned structure is generated and fixed (e.g., hydrating, marinating, drying, coloring). Methods for determining the degree of protein fiber network formation and/or protein fiber alignment are known in the art and include visual determination based upon photographs and micrographic images, as exemplified in U.S. Utility application Ser. No. 14/687,803 filed Apr. 15, 2015. In some embodiments, at least about 55%, at least about 65%, at least about 75%, at least about 85%, or at least about 95% of the protein fibers are substantially aligned. Protein fiber networks and/or protein fiber alignments may impart cohesion and firmness whereas open spaces in the protein fiber networks and/or protein fiber alignments may tenderize the meat structured protein products and provide pockets for capturing water, carbohydrates, salts, lipids, flavorings, and other materials that are slowly released during chewing to lubricate the shearing process and to impart other meat-like sensory characteristics.

In one embodiment, the method to make a textured plant-based protein product includes the step of providing a myceliated high-protein food product and at least one additional high-protein material. In one embodiment, the myceliated high-protein food product is at least 50% (w/w) protein on a dry weight basis, and the myceliated high-protein food product is derived from pea and/or rice. Additionally, the myceliated high-protein product is a myceliated high-protein product that has been myceliated by an aqueous fungal culture, in a media comprising at least 50 g/L protein in liquid culture. Further, the myceliated high-protein food product has reduced undesirable flavor and reduced undesirable aroma compared with a non-myceliated food product. In this method, the additional high-protein material comprises at least 50% protein on a dry weight basis.

The step of providing a textured plant-based protein product can include steps of preparing the myceliated high-protein food product by the following steps. In one embodiment, the myceliated high-protein food product is produced by culturing a fungus in an aqueous media which includes a high-protein material, with amounts of protein of at least 50% (w/w) protein, in a media comprising at least 50 g/L protein in liquid culture, resulting in a myceliated high-protein food product, whereby the flavor or taste of the myceliated high-protein food product is modulated compared to the high-protein material; providing an additional high-protein material; and mixing the myceliated high-protein food product and the additional high-protein material to form a mixture; optionally preconditioning the mixture, e.g., by adding steam and/or water to the mixture, and extruding the mixture under heat and pressure under conditions capable of forming a textured plant-based protein product useful for products such as meat-structured meat analogs or meat extenders that contain no animal products.

In the method to provide a textured plant-based protein product, the method may also include the steps of mixing the myceliated high-protein food product and an additional high-protein material, wherein the myceliated high-protein food product is present at between about 5% and 90% on a dry weight basis compared with the additional high-protein material. The method may also include the steps of extruding the mixture. The extrusion step(s) may include the step of adding steam and/or water to the mixture and extruding the mixture under heat and/or pressure to form the textured plant-based protein product.

The method to prepare a textured plant-based protein product may also include the step of providing at least one additional high-protein food product. The additional high-protein food product can comprise, consist of, or consist essentially of at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%, protein.

This additional high-protein food product, in an embodiment of the method to make a textured plant-based protein product, has the purpose of providing gelating or other properties to supplement the formation of texturized protein from the myceliated high-protein food product, which in some embodiments has lower gelling properties. In an embodiment, the additional food protein comprises a gel-forming protein. Meat is considered the highest quality protein source, in part because meat proteins impart specific functionalities. The overall properties of meat and meat products, including appearance, texture, and mouthfeel, are dependent on protein functionality. The principal protein functionalities in processed meats are gelation and related properties (for example, meat particle binding and adhesion), emulsification, and water-holding. Gel network formation is important to the generation of texture within foods, providing structural matrices for holding moisture, flavors, sugars, and other food ingredients, and stabilizes the dispersed phase. Gelation involves protein-protein and protein-solvent interactions usually initiated by the unfolding of the protein's native structure to fully extend the polypeptide chains followed by intermolecular interaction to form a three-dimensional network.

In gel-forming proteins, the protein is converted to a high viscosity progel by heat, which sets to a gel of higher viscosity upon cooling. The initial heating causes irreversible dissociation of globulin polypeptides and subsequent heating and cooling results in a gel.

In one embodiment, in the method to make a textured plant-based protein product, the present invention includes as an additional high-protein material, a gel-forming vegetarian protein. Suitable gel-forming proteins include any gel-forming protein known in the art. For the purposes of the present invention, the additional high-protein material is preferably a plant protein material. Suitable additional high-protein materials include, without limitation, cereal proteins, including vital wheat gluten; legume (pulse) proteins, including, without limitation, pea protein, soy protein, peanut protein, and bean proteins. Suitable gel-forming proteins may also include mycoproteins. The additional high-protein material can include vegetarian sources (e.g., plant sources) as well as non-vegetarian sources, and can include a protein concentrate and/or isolate. Vegetarian sources include meal, protein concentrates and isolates prepared from a vegetarian source such as legumes or grains, such as, including pea, rice, chickpea, soy, cyanobacteria, hemp, chia, corn gluten meal and other sources, or a combination thereof.

In an embodiment, in the method to form a textured plant-based protein product, the ratio of the myceliated high-protein food product to the additional high-protein material is between about 1% myceliated high-protein food product to about 99% additional high-protein material, to about 99% myceliated high-protein food product to about 1% additional high-protein material. Other ratios include about 5% myceliated high-protein food product to about 95% additional high-protein material. Other ratios include about 10% to about 90%; about 15% to about 85%; about 20% to about 80%; about 25% to about 75%; about 30% to about 70%; about 35% to about 65%; about 40% to about 60%; about 45% to about 55%; about 50% to about 50%; about 55% to about 45%; about 60% to about 40%; about 65% to about 35%; about 70% to about 30%; about 75% to about 25%; about 80% to about 20%; about 85% to about 15%; about 90% to about 10%, respectively, myceliated high-protein food product to additional high-protein material, w/w. In other embodiments, the amount of myceliated high-protein food product, relative to the additional high-protein material, can vary between about 1% and 99%, between about 5% and 95%, between about 10% and 90%, between about 15% and 85%, between about 20% and 80%, between about 25% and 75%, between about 30% and 70%, between about 35% and 65%, between about 40% and 60%, between about 45% and 55%, or about 48% to about 52%, or, about 40% and 85%, between about 45% and 80%, between about 50% and 75%.

The method to prepare a textured plant-based protein product may also include the step of providing an optional carbohydrate component. The carbohydrate ingredients are typically classified as a starch, a flour, or an edible fiber and the carbohydrate component may comprise one or more types of starch, flour, edible fiber, and combinations thereof.

Starch is the primary carbohydrate source used to help the formation of the product texture in textured plant-based protein products. Typical starches used include rice starch, wheat starch, oat starch, corn starch, potato starch, cassava starch, and tapioca starch, although starch from any source is contemplated. Overall, the swelling ability of starch, solubility, amount of amylose leaching out during gelatinization, and the ability to produce a viscous paste, have an effect on the textured plant-based protein product. Chemical alterations occur due to structural changes of the macromolecules in the feed blend, such as starch gelatinization and protein denaturation, as well as incorporation of water into the molecular matrix, all of which convert the raw feed particles into a viscoelastic dough under a pressurized environment. Physical changes, on the other hand, are related to product expansion due to a drastic pressure drop and water evaporation during die exit.

Alternatively, the textured plant-based protein product can contain starch or flour from at least one cereal grain. Examples of flour include wheat flour, rice flour, barley flour white corn flour, oat flour, sorghum flour, rye flour, amaranth flour, *quinoa* flour, and combinations thereof.

In one embodiment, the textured plant-based protein product includes an edible fiber. Examples of suitable edible fiber include but not limited to bamboo fiber, barley bran, carrot fiber, citrus fiber, corn bran, soluble dietary fiber, insoluble dietary fiber, oat bran, pea fiber, soy fiber, soy polysaccharide, wheat bran, wood pulp cellulose, modified cellulose, seed husks, oat hulls, citrus fiber, carrot fiber, corn bran, soy polysaccharide, barley bran, and rice bran. The fiber may be present in the dry pre-mix from about 0.1% to about 10% by weight. In one embodiment, the fiber is about 2% to about 8% by weight of the dry ingredients. In another embodiment the fiber is about 5% by weight of the dry ingredients. Particularly desirable types of fiber are those that effectively bind water when the mixture of non-animal protein and fiber is extruded.

In some embodiments, a textured plant-based protein product comprises where at least some of the carbohydrate is derived from pea. In some embodiments, the mixture comprises between about 0.1% and about 25%, between about 3% and about 20%, between about 5% and about 15%, between about 5% and about 10%, between about 4% and about 7%, or between about 3% and about 35% by weight of carbohydrate, such as pea fiber.

Without being bound by theory, in the present invention comprising a textured plant-based protein product, it was found that the addition of fiber, including the addition of pea fiber, to the mixture, provided unique properties to the textured plant-based protein product, as detailed in the Examples. In embodiments, the textured plant-based protein product includes a textured plant-based protein product formed from a mixture that comprises about 45% pea protein, 5% pea fiber, and about 50% myceliated high-protein material, w/w, or a mixture that comprises about 70% myceliated high-protein material, about 25% pea protein, about 5% pea fiber, w/w.

In embodiments, the moisture of the textured plant-based protein product is between about 20% and 40% by weight, and may be dried to approximately between 3% and 5% moisture to allow for rehydration by finished food manufacturers. In an embodiment, the dried textured plant-based protein product rehydrates to between 0.5 and 3 times its weight in water within a period of time after water addition, for example, 10 minutes. In an embodiment, the textured plant protein has a reduced undesirable flavor, such as, for example, a pea flavor or a bitterness flavor, and a reduced undesirable aroma, such as, for example, a beany aroma or a rice aroma.

Other ingredients in the mixture to form the textured plant-based protein product may include pH modifiers. Modifying pH above 8.0 also may result in the production of harmful lysinoalanines; and lowering the pH has the opposite effect and will decrease protein solubility, making the protein more difficult to process. In an embodiment, pH is considered between pH 6.5 and 7.5. Other ingredients may include processing aids such as calcium salts, such as calcium chloride, which can increase the textural integrity of extruded vegetable proteins and aid in smoothing its surface. Dosing levels for $CaCl_2$) range between 0.5 and 2.0%. Sulfur compounds are useful for their ability to aid in the cleavage of disulfide bonding, which assists the unraveling of long twisted protein molecules. This reaction with the protein molecules causes increased expansion, smooth product surface and adds stability to the extrusion process, however, off flavors and aromas can arise from their use. Appropriate sulfur compounds to use in the present invention includes sodium metabisulfite, sodium bisulfite, as well as cystine, can be used with effects similar to those from using sulfur. The normal dosing levels for sulfur or sulfur derivatives—are in the 0.1 to 0.2% range. Cystine is used at approximately 0.5 to 1% level.

The present invention also includes products such as meat-structured plant-based meat analogs or meat extenders, for example, a plant-based meat analog patty, a plant-based meat analog sausage, a plant-based meat analog frankfurter, and a plant-based meat analog meat extended patty, sausage, or frankfurter comprising the textured plant-based protein product of the present invention.

In one embodiment, transglutaminase can be used as a processing aid in the present invention to improve textural attributes, water-holding capacity and appearance of the textured plant-based protein product. In particular, transglutaminase may improve the firmness, viscoelasticity water binding and gelling capacity of the compositions or food products. Transglutaminase is an enzyme that catalyzes the formation of cross-links both within a protein molecule and between molecules of different proteins. Microbial transglutaminase (MTG or MTGase) catalyzes covalent cross-link formation between primary amines (such as c amino group of lysine) and the amide group of glutamine residues to form high molecular weight polymers, resulting in improvement of mechanical properties.

MTGase is used as a texturizing agent in several meat products, such as sausages, burgers and restructured meats. In addition to the positive impact on the texture of the final product, transglutaminase inclusion facilitates strong cohesion of meat blocks or multi-meat compositions without the need for thermal processing or addition of salt or phosphates. Use of transglutaminase in meat processing can significantly improve the texture of the final product, which results in, for example, an increase in its hardness. Moreover, it strengthens the texture of homogenized sausages made of pork, beef or poultry meat. The application of transglutaminase mediated textured plant-based protein product has the potential to offer new technological opportunities for producing restructured meats, fine and coarse-minced sausages, fresh and frozen hamburgers, hot dogs and similar products. Transglutaminase may be used in the textured plant-based protein products of the present invention to improve gelation through the formation of covalent intramolecular and intermolecular bonds. For example, transglutaminase may increase hardness, springiness, chewiness, and cutting-force of the textured plant-based meat analog of the present invention. Transglutaminase may be used at amounts known in the art, generally up to about 0.75%.

Microbial transglutaminase (M-TG) are active over a broad range of pH 4.5 to 8.0 and temperatures 0° C. to 45° C. and require calcium. The myceliated high-protein product and/or additional high-protein material, either as is or in combination with other protein matrices (such as the additional high-protein material) can be mixed with transglutaminase in the range of 0.1% to 0.7% to promote crosslinking and form a solid matrix/restructured form that can be further processed at elevated temperatures (>75° C. for 5 mins) to inactivate the enzyme.

Therefore, the methods of the invention further include a method to make a restructured textured plant-based protein product comprising the steps of providing a proteinaceous material, e.g., a myceliated high-protein food product, and mixing with transglutaminase to form the restructured textured plant-based protein product. In embodiments, the proteinaceous material includes an additional high-protein food product and other ingredients, excipients or additives as disclosed herein. The invention further includes a restructured textured plant-based protein product meat analog product or extender.

Seasonings can be added before or after the extruding and/or cooking and/or puffing steps. Seasonings include, but are not limited to, minerals such as salt, grain-based seasonings (such as, but not limited to, whole, cracked or ground wheat, corn, oats, rye, flax, barley, spelt and rice), plant-derived seasonings (such as, but not limited to, onion, garlic, pepper, capsicum pepper, herbs, spices, nuts, olives, fruits, vegetables, etc.), and other flavorings (such as, but not limited to, vanilla, sugar, cheese, yeast extract, whey), and combinations thereof. Vitamins can also be included such as, but not limited to, niacin, iron, zinc, thiamine mononitrate (vitamin B1), riboflavin (vitamin B2), folic acid, tocopherol(s) (vitamin E), vitamin C, vitamin B6, vitamin B12, vitamin A, vitamin D, pantothenic acid and copper. Edible oil and fat can also be included. Oils such as, but not limited to, soy, corn, canola, sesame, safflower, olive, sunflower, rapeseed, cottonseed, peanut, copra, palm kernel, palm, linseed, lupin, and combinations thereof can be used. Other fats such as butter or lecithin and their mixtures can also be used. Other ingredients can be included such as emulsifiers (such as, but not limited to, lecithin, soy lecithin), leavening (such as, but not limited to, baking soda, calcium phosphate, yeast), natural and artificial sweeteners, preservatives (such as, but not limited to, BHT, BHA, and tocopherol), fiber (such as, but not limited to, insoluble fiber, soluble fiber (e.g., Fibersol®)), and any combinations of such ingredients.

The term "dry ingredients" includes all the ingredients in the mixture to form the textured plant-based protein product except for added water and ingredients added with the added water (i.e., the "wet ingredients"). Thus, the dry ingredients can include the myceliated high-protein food product component, the additional high-protein material component, such as wheat gluten; the carbohydrate (e.g., fiber) component, and other processing aids as discussed herein.

In addition to the foregoing, the ingredients utilized to make the textured plant-based protein product may include an edible lipid component that comprises one or more edible lipids. In accordance with the present disclosure, nearly any edible lipid material may be employed, including natural and synthetic oils, for example, rapeseed, canola, soybean, coconut, cottonseed, peanut, palm and corn oils and in either non-hydrogenated or hydrogenated form. In one embodiment, the edible lipid material is an edible vegetable oil, such as canola oil, coconut oil, cottonseed oil, peanut oil, and olive oil. In one embodiment, the total edible lipid content is no more than about 5% of the weight of the dry ingredients utilized the make the meat analog product. As such, in one embodiment, the total edible lipid content is an amount of about 0.1% to about 1% by weight of the dry ingredients. In another embodiment, the total edible lipid content is an amount of about 0.2% to about 0.5% by weight of the dry ingredients.

In addition to the foregoing, the textured plant-based protein product can optionally include water at a relatively high amount. In one embodiment, the total moisture level of the mixture extruded to make the textured plant-based protein product is controlled such that the textured plant-based protein product has a moisture content that is at least about 50% by weight. To achieve such a high moisture content, water is typically added to the ingredients. Although, a relatively high moisture content is desirable, it may not be desirable for the textured plant-based protein product to have a moisture content much greater than about 65%. As such, in one embodiment the amount of water added to the ingredients and the extrusion process parameters are controlled such that the textured plant-based protein product (following extrusion) has a moisture content that is from about 40% to about 65% by weight. The textured plant-based protein product may be optionally dried to form the final commercial product, which is then rehydrated by the finished food product manufacturer.

In an exemplary embodiment, a texturized plant protein product can include between about 1-99%, preferably 85% to 95%, of a combination of a myceliated high-protein food product and an additional high-protein material; in a vegan sausage type product; using a twin screw extruder, the mixture can be further blended with starch or fiber of 5-15% (all percentages w/w dry ingredients).

Such textured plant-based protein products can be used to create a number of new food compositions, including, without limitation meat analogs and extenders, which contain a myceliated high-protein food product. The methods to prepare a food composition can include the additional, optional steps of cooking, extruding, and puffing the food composition according to methods known in the art to form the food compositions comprising the textured plant-based protein products of the invention.

Extrusion is a technology to produce texturized proteins, a unique product which can be produced from a wide range of raw ingredient specifications, while controlling the functional properties such as density, rate and time of rehydration, shape, product appearance and mouthfeel.

The general procedure is as follows. The flour mix is prepared and typically the dry ingredients are blended together in the premixture stage. In the optional preconditioning step (in a section of an extruder device known as preconditioner) the steam and water are usually added at this stage to wet/moisten and warm the flour mix. In the extruder, the majority of the work happens. Generally, the starch and protein are plasticized using heat, pressure and/or mechanical shear, then realigned and expanded as the mixture exits the extruder. The material coming from the extruder moisture ranges from 25% to 30%. Optionally, this extruded material can be dried to about 3%-5% moisture or less in the dryer portion. Cooling then optionally occurs to lower the temperature of the dried product to ambient conditions followed by an optional packaging step.

Texturization of plant proteins have been a significant development in the food processing industry. Substitution of textured plant protein (TPP) for traditional meat has several advantages in terms of cost, energy efficiency, increased protein food supply, and sustainable when compared to conventional animal production and slaughter.

Generally, two types of textured meat-like products are derived from texturization processes. First is a meat extender that has been commonly produced by processing plant proteins through high pressure/extrusion step. Resulting texturized product shows distinct fiber formation and highly expanded. On rehydration the TPP can be used to extend ground meat or meat products. Second type are meat analogs which are used in place of meat. The TPP based meat analogs are dense, have a layered-fiber conformations and maintains meat-like character after extensive cooking or retorting. High moisture extrusion processes have been used to produce meat analogs.

A typical extruder can be made up of the following parts. The Flour Mix Feeder—the bin/feeder provides a means of uniformly metering the raw materials (granular or floury in nature) into a preconditioner or mixing cylinder and subsequently into the extruder itself. Also controls the product rate or throughput of the entire system. Preconditioner—here steam and water are metered and injected into the raw material to control raw material temperature and moisture. Preconditioning promotes moisture and heat penetration of the individual particles, resulting in uniform moisture application and elevated raw material temperature. In the absence of a preconditioner, a longer extruder barrel with adequate mixing and hydration zones may serve the purpose of a preconditioner. Typical moisture content of the raw material exiting the preconditioner range from 10% to 25% and temperatures in the range of 110° F. to 120° F.

The extruder portion itself is described as follows. Extruders are popularly classified as either being a single or twin-screw design. In both designs, the impact on final product texture is affected by screw and barrel profile, screw speed, processing conditions such as temperature, moisture, pressure, raw material characteristics and die selection. The initial section of the extruder barrel is designed to act as a feeding or metering zone and simply conveys the raw or preconditioned vegetable protein away from the inlet portion of the barrel and into the extruder. Product then enters a processing zone where the amorphous, free-flowing vegetable protein is worked into a colloidal dough. The compression ratio of the screw profile is increased in this stage to assist in blending water or steam with the raw material. The temperature of this moist, proteinaceous dough is rapidly elevated in the last 2-5 seconds of dwell time within the extruder barrel. Screw profile can be altered by the pitch, flight height and angle, and steamlock diameter, which affects the conveying of this plasticized food material down the screw channel. The net flow patterns of the product within the screw are quite complicated and difficult to understand and describe.

Hydration and heating cause unravelling of the long, twisted protein molecules in vegetable proteins. In the extrusion process, these molecules align themselves along the streamline flows of the screws and dies. The increase in shear temperature and retention time causes cross-linking to occur, yielding a textured product that is layered, and the resulting denaturation or cross-linking can be considered an irreversible endothermic chemical reaction. The extent of cross-linking is a function of the time, temperature and moisture history and can be related to changes in apparent viscosity of the extrudate. The proper exposure to shearing action, as the protein molecules align themselves for cross-linking during the extrusion process.

A food composition of the invention can also include a texturized protein, such as a texturized plant protein. Texturized plant protein comprising the myceliated high-protein product of the present invention include meat analog products and methods for making meat analog products comprising the myceliated high-protein product as disclosed within. The meat analog products can be produced with high moisture content and provide a product that simulates the fibrous structure of animal meat and has a desirable meat-like moisture, texture, mouthfeel, flavor and color. Meat analog products having qualities (for example, texture, moisture, mouthfeel, flavor, and color) similar to that of whole muscle animal meat may be produced using non-animal proteins formed using extrusion under conditions of relatively high moisture. In one embodiment, meat analog products may include myceliated high-protein products of the invention, an additional high-protein material, one or more of flour, starch, an edible lipid material and optionally a flavor modifier.

Due to its versatility, high productivity, energy efficiency and low cost, extrusion processing is widely used in the modern food industry. Extrusion processing is a multi-step and multifunctional operation, which leads to mixing, hydration, shear, homogenization, compression, deaeration, pasteurization or sterilization, stream alignment, shaping, expansion and/or fiber formation. Ultimately, the non-animal protein, typically introduced to the extruder in the form of a dry blend, is processed to form a fibrous material.

It is known in the art for texturized plant protein materials, to utilize twin screw extruders under high moisture (40-80%) conditions for texturizing non-animal proteins into fibrous meat alternatives. In the high moisture twin screw process, also known as "wet extrusion", the raw materials, predominantly non-animal proteins such the myceliated high-protein products of the invention, are mixed and fed into a twin-screw extruder, here a proper amount of water is dosed in and all ingredients are further blended and then melted by the thermo-mechanical action of the screws. The realignment of large protein molecules, the laminar flow, and the strong tendency of stratification within the extruder's long slit cooling die contribute to the formation of a fibrous structure. The resulting wet-extruded products tend to exhibit improved whole muscle meat-like visual appearance and improved palatability. Therefore, this extrusion technology shows promise for texturizing non-animal proteins to meet increasing consumer demands for healthy and tasty foods.

Texturization of protein is the development of a texture or a structure via a process involving heat, and/or shear and the addition of water. The texture or structure will be formed by protein fibers that will provide a meat-like appearance and perception when consumed. The mechanism of texturization of proteins starts with the hydration and unfolding of a given protein by breaking intramolecular binding forces by heat and/or shear. The unfolded proteins molecules are aligned and bound by shear, forming the characteristic fibers of a meat-like product. To make non-animal proteins palatable, texturization into fibrous meat analogs, for example, through extrusion processing has been an accepted approach.

In more detail, extrusion processes are well known in the art and appropriate techniques can be determined by one of skill. "Extrusion" is a process used to create objects of a fixed cross-sectional profile. A material is pushed or pulled through a die of the desired cross-section. High-moisture extrusion is known as wet extrusion. Extruders typically comprise an extruder barrel within which rotates a close-fitting screw. The screw is made up of screw elements, some of which are helical screw threads to move material through the extruder barrel. Material is introduced into the extruder barrel toward one end, moved along the extruder barrel by the action of the screw and is forced out of the extruder barrel through a nozzle or die at the other end. The rotating screw mixes and works the material in the barrel and compresses it to force it through the die or nozzle. The degree of mixing and work to which the material is subjected, the speed of movement of the material through the extruder barrel and thus the residence time in the extruder barrel and the pressure developed in the extruder barrel can be controlled by the pitch of the screw thread elements, the speed of rotation of the screw and the rate of introduction of material into the extruder barrel. The extruder barrel comprises multiple extruder barrel sections which are joined end to end. Multiple extruder barrel sections are required to carry out different processes involved in extrusion such as conveying, kneading, mixing, devolatilizing, metering and the like. Each extruder barrel section comprises a liner which is press fit into an extruder barrel casing, and heating and cooling elements are provided to regulate temperature of extruder barrel section within permissible range. The total length of an extrusion process can be defined by its modular extrusion barrel length. An extruder barrel is described by its unit of diameter. A "cooling die" is cooling the extruded product to a desired temperature. Hot extrusion is used to thermomechanically transform raw materials in short time and high temperature conditions under pressure.

Steam-induced expansion, means melt expansion at the die exit due to water flashing off, hence leading to highly expanded products. Subsequent processing then determines the textural attributes of extruded products such as crispness, crunchiness, hardness, etc. The extruding can include, for example, melting and/or plasticization of the ingredients, gelatinization of starch and denaturation of proteins. The heat can be applied either through, for example, steam injection, external heating of the barrel, or mechanical energy. The material can be pumped, shaped and expanded, which forms the porous and fibrous texture, and partially dehydrates the product. The shape and size of the final product can be varied by using different die configurations. Extruders can be used to make products with little expansion (such as pasta), moderate expansion (shaped breakfast cereal, meat substitutes, breading substitutes, modified starches, pet foods (soft, moist and dry)), or a great deal of expansion (puffed snacks, puffed curls and balls, etc.).

In some extruders, the material may be extruded by means of a ram or a piston. Other extruders use one or more screws. Variable pitch single screw extruders produce high product consistency by combining the ingredients to produce a homogeneous mixture and pushing it out of the machine at a rate that is highly controllable. Twin screw extruders contain two screws that are either co-current (the screws rotate in the same direction) or are counter-current (the screws rotate in opposite directions). Twin screw extruders can handle material with a wide range of moisture content and have greater control over the residence time and the amount of shear to which the material is exposed.

The ingredients may be fed into the extruder via a feeder, such as, but not limited to, a gravimetric or volumetric feeder. The type of feeder used depends on the type of ingredient, and different feeders are used for batch versus continuous feed. The feeder also can direct the ingredients into a preconditioner, if desired. The feed section of the screw may have deep flights to accept the ingredients and move the ingredients forward. The ingredients move into the compression section of the screw, which is heated, and has either shallower or more frequent flights, which compresses the ingredients and works them into continuous dough. The cooking section of the screw applies maximum heat, pressure and shear to the mixture in the barrel prior to the die. Within the screw barrel, the mixture is heated and pressurized. When the mixture emerges through the die, the reduction in pressure to atmospheric pressure generally causes the mixture to expand. If the moist dough within the barrel is heated over 100° C., the sudden reduction in pressure to atmospheric pressure causes the moisture to convert to steam. The combination of sudden expansion and associated cooling yields a puffed, crisp product.

One suitable extrusion device is a double-barrel, twin screw extruder as described, for example, in U.S. Pat. No. 4,600,311. Examples of commercially available double-barrel, twin screw extrusion apparatus include a CLEXTRAL Model BC-72 extruder manufactured by Clextral, Inc. (Tampa, Fla.); a WENGER Model TX-57 extruder manufactured by Wenger (Sabetha, Kans.); and a WENGER Model TX-52 extruder manufactured by Wenger (Sabetha, Kans.). Other conventional extruders suitable for use in this disclosure are described, for example, in U.S. Pat. Nos. 4,763,569, 4,118,164, and 3,117,006, which are hereby incorporated by reference herein.

The screws of a twin-screw extruder can rotate within the barrel in the same (co-rotating) or opposite directions (counter-rotating). Rotation of the screws in the same direction is referred to as single flow whereas rotation of the screws in opposite directions is referred to as double flow (counter-rotating). Typically, co-rotating twin screw extruders are used in the manufacturing of puffed snack products. The speed of the screw or screws of the extruder may vary depending on the particular apparatus. However, the screw speed is typically from about 200 to about 600 revolutions per minute (rpm). Generally, as the screw speed increases, the density of the extrudates decreases. Particularly, the screw speed of the twin screw extruder may effect residence time of the dough in the extruder, the amount of shear generated, and the degree of cooking of the dough; as the screw speed increases, residence time decreases, and the amount of shear increases.

Among other things, conventional extruder systems generally act as an ingredient mixer (e.g., to form the dough), mixture cooker, and composition (extrudate) former. Each of these functions can be accomplished in the same cooking extruder. In some instances, however, it may be desirable to have at least two extruders arranged in a series. The extrusion apparatus also can include one or more heating zones through which the dough is conveyed under mechanical pressure prior to exiting the extrusion apparatus through an extrusion die. The pressure within the extruder barrel is not narrowly critical. Typically, the extrusion mass is subjected to a pressure of at least about 400 psi (about 28 bar). The barrel pressure is dependent on numerous factors including, for example, the extruder screw speed, feed rate of the mixture to the barrel, feed rate of water to the barrel, and the viscosity of the dough within the barrel. Water can also be injected into the extruder barrel to further hydrate the dough. As an aid in forming the dough the water may also act as a plasticizing agent. Water may be introduced to the extruder barrel via one or more injection jets in communication with a heating zone. Typically, water is injected at a rate of from about 2 kg/hr to about 7 kg/hr. The mixture in the barrel typically contains from about 15% to about 30% (by weight) water. The rate of introduction of water to any of the heating zones is generally controlled to promote production of an extrudate having desired characteristics. It has been observed that as the rate of introduction of water to the barrel decreases, the density of the extrudate decreases. The dough in the extrusion apparatus is extruded through a die to produce an extrudate.

Extrusion conditions are generally such that the extrudate emerging from the extruder barrel typically has a moisture content of from about 5% to about 20% (by weight extrudate). In one embodiment, the moisture content of the extrudate is from about 5% (by weight extrudate) to about 15% (by weight extrudate). In another embodiment, the moisture content of the extrudate is about 10% (by weight extrudate). The moisture content is derived from water present in the mixture introduced to the extruder, moisture added during preconditioning and/or any water injected into the extruder barrel during processing. In an embodiment, high moisture extrusion e.g., extrusion at higher moisture contents (>40%), also known as wet extrusion, can be used to create a fresh (non-dried) product. Generally, wet extrusion applications utilize twin screw extruders due to their efficient conveying capabilities.

Upon release of pressure, the dough exits the extruder barrel through the die, superheated water present in the mass flashes off as steam, causing simultaneous expansion (i.e., puffing) of the material. The level of expansion of the extrudate upon exiting of the mixture from the extruder in terms of the ratio of the cross-sectional area of extrudate to the cross-sectional area of die openings is generally less than about 50:1. Typically, the ratio of the cross-sectional area of extrudate to the cross-sectional area of die openings is from about 2:1 to about 50:1. The extrudate may be cut after exiting the die. Suitable apparatus for cutting the extrudate include flexible knives manufactured by Wenger (Sabetha, Kans.) and Clextral (Tampa, Fla.). Various die orifice designs will cause different expansions and geometric shapes of the extrudate. For example, depending on the geometric shape of the extrudate, the sliced or cut extrudate may be in the shape of a sheet, disc, pellet, rod, string, bar, and the like, or some other shape.

Other food compositions made using textured plant-based protein products as disclosed herein include a burger, a patty, a sausage, a meatball, taco meat, or a frankfurter.

Such compositions of the invention (e.g., mixtures with myceliated high-protein products and edible materials), using art-known methods, can be used to create a number of new food compositions, including, without limitation, dairy alternative products, ready to mix beverages and beverage bases; extruded and extruded/puffed products; sheeted baked goods; meat analogs and extenders; bar products and granola products; baked goods and baking mixes; granola; and soups/soup bases. The methods to prepare a food composition can include the additional, optional steps of cooking, extruding, and/or puffing the food composition according to methods known in the art to form the food compositions comprising the myceliated high protein food product of the invention.

The edible material can be, without limitation, a starch, a flour, a grain, a lipid, a colorant, a flavorant, an emulsifier, a sweetener, a vitamin, a mineral, a spice, a fiber, a protein isolate/concentrate or powder thereof, nutraceuticals, sterols, isoflavones, lignans, glucosamine, an herbal extract, xanthan, a gum, a hydrocolloid, a starch, a preservative, a legume product, a food particulate, and combinations thereof. A food particulate can include cereal grains, cereal flakes, crisped rice, puffed rice, oats, crisped oats, granola, wheat cereals, protein nuggets, texturized plant protein ingredients, flavored nuggets, cookie pieces, cracker pieces, pretzel pieces, crisps, soy grits, nuts, fruit pieces, corn cereals, seeds, popcorn, yogurt pieces, and combinations of any thereof.

The edible materials can be added to the myceliated high protein products of the invention using conventional processes to form the inventive food compositions, as described in more detail herein below.

In one embodiment, the food composition can include an alternative dairy product comprising a myceliated high protein food product according to the invention. An alternative dairy product according to the invention includes, without limitation, products such as analog skimmed milk, analog whole milk, analog cream, analog fermented milk product, analog cheese, analog yogurt, analog butter, analog dairy spread, analog butter milk, analog acidified milk drink, analog sour cream, analog ice cream, analog flavored milk drink, or an analog dessert product based on milk components such as custard. Methods for producing alternative dairy products using alternative proteins, such as plant-based proteins as disclosed herein including nuts (almond, cashew), seeds (hemp), legumes (pea), rice, and soy are known in the art. These known methods for producing alternative dairy products using a plant-based protein can be adapted to use with a myceliated high protein food product using art-known techniques.

An alternative dairy product according to the invention may additionally comprise non-milk components, such as oil, protein, carbohydrates, and mixtures thereof. Dairy products may also comprise further additives such as enzymes, flavoring agents, microbial cultures, salts, thickeners, sweeteners, sugars, acids, fruit, fruit juices, any other component known in the art as a component of, or additive to a dairy product, and mixtures thereof.

Milks. A myceliated high protein food product according to the invention may be used to create a myceliated high protein-based "milk" beverage produced by using the myceliated high protein food product, optionally, by combining the product as a powder with oils and carbohydrates to form an emulsion, preferably a stable emulsion. Methods for creating vegan protein milks using soybeans as the protein source are known in the art and protein source may simply be substituted with myceliated high protein food product protein. As a non-limiting example, a typical unsweetened "milk" drink includes, per 243 ml serving, a total of 4 g carbohydrates which can include 1 g of sugar, 4 g of fat or oil from any source, and myceliated high protein food product solids sufficient to provide between about 1-10 g of protein, the drink being in the form of a stable emulsion of oil, water, and protein. The ratio of myceliated high protein food product to the other ingredients can be varied depending on the desired protein level of the drink and the desired organoleptic properties. Typically, the amount will vary between about 0.1-10% g protein per mL beverage, or about 0.5 to 7%, 1% to 5% or about 1.1-1.3%. The resulting slurry or purée may optionally be brought to a boil in order to e.g., improve its flavor, and to sterilize the product. Heating at or near the boiling point is continued for a period of time, 15-20 minutes, followed by optional removal of insoluble residues by e.g., filtration.

In an example, the milk-based beverage can include 2.7 g myceliated high protein food product per 240 mL serv, 4 g carbohydrates which can include 1 g of sugar, 4 g of fat or oil from any source.

Yogurt: myceliated high protein food product may be used to create a myceliated high protein food product-based "yogurt" beverage produced by using myceliated high protein food product, optionally, by combining myceliated high protein food product with the other ingredients in powder form. Methods for creating vegan yogurt using soybeans as the protein source are known in the art and protein source may simply be substituted with myceliated high protein food product protein, for example, to create the yogurts of the invention. For example, myceliated high protein food product can be used as 1.1% to about 7% (e.g., 10.7 g) myceliated high protein food product solids sufficient to provide between about 1-10 g of protein per serving. Other ingredients in the yogurt can include, without limitation, as known in the art, nut milks (almond, cashew, for example), fats or oils (such as coconut cream, coconut oils), sugar, and thickening or gelling agents including, without limitation, agents such as locust bean gums, pectin, and the like. The composition, in some embodiments, will contain no less than 2.5% fat from a plant source, such as, without limitation, almond, cashew, and/or coconut and no less than 3.5% protein. Frozen yogurts will have similar compositions.

In an example, the yogurt can include 68.7% by weight of an almond milk, 21.9% of a cashew milk, 3.35% of coconut cream, 4.75% of myceliated high protein food product, 1.18% of dextrose, 0.05% of locust bean gum, 0.05% of pectin, and 0.02% of live bacterial cultures customary for yogurt preparations, such as mixtures of lactic acid producing bacteria *Lactobacillus bulgaricus* and *Streptococcus thermophilus*. For a frozen dessert, example amounts of myceliated high protein food product can include about 4 g myceliated high protein food product per 79 g serving (cashew) or 6.67 g myceliated high protein food product per 85 g serving.

Ice Cream: myceliated high protein food product may be used to create a myceliated high protein food product-based "ice cream" beverage produced by using myceliated high protein food product, optionally, by combining myceliated high protein food product with the other ingredients in powdered form. Methods for creating vegan ice cream using soybeans as the protein source are known in the art and protein source may simply be substituted with myceliated high protein food product protein, for example, to create the ice creams of the invention. For example, myceliated high protein food product can be used as 1.1% to 7% (10.7 g) myceliated high protein food product solids sufficient to provide between about 1-10 g of protein per serving. Other ingredients in the ice cream can include, without limitation, as known in the art, creams, fats or oils (such as coconut cream, coconut oil), sugar, and thickening or gelling agents including, without limitation, agents such as locust bean gum, pectin, emulsifiers such as lecithin, and the like. The composition, in some embodiments, will contain no less than 10% fat from a plant source, such as, without limitation, almond, cashew, and/or coconut and no less than 3.5% protein and no less than 35% total solids.

In an example, the ice cream can include 45.5% by weight of water, 32% of coconut cream (34.7% fat), 4.5% of myceliated high protein food product 17% of sugar, 0.6% of a gum, 0.2% of lecithin, 0.2% of sea salt.

The present invention can also include beverages and beverage bases comprising a myceliated high protein food product according to the invention which can be used as non-dairy-based meal replacement beverages. A myceliated high protein food product according to the invention may be used to prepare a meal replacement beverage that is optionally non-dairy-based. Methods for creating vegan meal replacement beverages using soybeans as the protein source are known in the art and protein source may simply be substituted with myceliated high protein food product protein of the invention, for example. For example, a typical meal replacement drink would include, per 243 ml serving, a total of 4 g carbohydrates which can include 1 g of sugar, 4 g of fat or oil from any source, and myceliated high protein food product solids sufficient to provide between about 2-30 g of protein. The ratio of myceliated high protein food product can be varied depending on the desired protein level of the drink and the desired organoleptic properties. Typically, the amount will vary between about 0.1-15% g protein per mL beverage, or about 0.5 to 7%, 1% to 5% or about 1.1-1.3%. The resulting slurry or purée may optionally be brought to a boil in order to e.g., improve its flavor, and to sterilize the product. Heating at or near the boiling point is continued for a period of time, 15-20 minutes, followed by optional removal of insoluble residues by e.g., filtration. A ready to mix beverage powder can include 32.7 g of myceliated high protein food product per 35 g serving. Examples of products include protein shakes and smoothies, and dietary and nutritional beverages including meal replacement beverages and smoothies.

In an exemplary formulation, a non-dairy-based meal replacement beverage can have about 20 g of the myceliated high protein food product per 243 g serving.

The present invention can also include extruded and/or puffed products and/or cooked products comprising a myceliated high protein food product of the invention. Extruded and/or puffed ready-to-eat breakfast cereals and snacks such as crisps or scoops and pasta noodles are known in the art. Extrusion processes are well known in the art and appropriate techniques can be determined by one of skill. "Extrusion" is a process used to create objects of a fixed cross-sectional profile. A material is pushed or pulled through a die of the desired cross-section. The two main advantages of this process over other manufacturing processes are its ability to create very complex cross-sections, and to prepare products that are brittle, because the material only encounters compressive and shear stresses. High-moisture extrusion is known as wet extrusion. Extruders typically comprise an extruder barrel within which rotates a close-fitting screw. The screw is made up of screw elements, some of which are helical screw threads to move material through the extruder barrel. Material is introduced into the extruder barrel toward one end, moved along the extruder barrel by the action of the screw and is forced out of the extruder barrel through a nozzle or die at the other end. The rotating screw mixes and works the material in the barrel and compresses it to force it through the die or nozzle. The degree of mixing and work to which the material is subjected, the speed of movement of the material through the extruder barrel and thus the residence time in the extruder barrel and the pressure developed in the extruder barrel can be controlled by the pitch of the screw thread elements, the speed of rotation of the screw and the rate of introduction of material into the extruder barrel. The extruder barrel comprises multiple extruder barrel sections which are joined end to end. Multiple extruder barrel sections are required to carry out different processes involved in extrusion such as conveying, kneading, mixing, devolatilizing, metering and the like. Each extruder barrel section comprises a liner which is press fit into an extruder barrel casing, and heating and cooling elements are provided to regulate temperature of extruder barrel section within permissible range. The total length of an extrusion process can be defined by its modular extrusion barrel length. An extruder barrel is described by its unit of diameter. A "cooling die" is cooling the extruded product to a desired temperature.

For example, cold extrusion is used to gently mix and shape dough, without direct heating or cooking within the extruder. In food processing, it is used mainly for producing pasta and dough. These products can then be subsequently processed: dried, baked, vacuum-packed, frozen, etc.

Hot extrusion is used to thermomechanically transform raw materials in short time and high temperature conditions under pressure. In food processing, it is used mainly to cook biopolymer-based raw materials to produce textured food and feed products, such as ready-to-eat breakfast cereals, snacks (savory and sweet), pet foods, feed pellets, etc. The extruding can include, for example, melting and/or plasticization of the ingredients, gelatinization of starch and denaturation of proteins. The heat can be applied either through, for example, steam injection, external heating of the barrel, or mechanical energy. The material can be pumped, shaped and expanded, which forms the porous and fibrous texture, and partially dehydrates the product. The shape and size of the final product can be varied by using different die configurations. Extruders can be used to make products with little expansion (such as pasta), moderate expansion (shaped breakfast cereal, meat substitutes, breading substitutes, modified starches, pet foods (soft, moist and dry)), or a great deal of expansion (puffed snacks, puffed curls and balls, etc.).

The myceliated high protein food product of the invention may be used in formulating foods made by extrusion and/or puffing and/or cooking processes, such as ready to eat breakfast cereals and snack foods. These materials are formulated primarily with cereal grains and may contain flours from one or more cereal grains. The cereal grains utilized, such as corn, wheat, rice, barley, and the like, have a high starch content but relatively little protein. A cereal having more protein content, therefore, is desirable from a nutritional standpoint. The composition of the present invention contain flour from at least one cereal grain, preferably selected from corn and/or rice, or alternatively, wheat, rye, oats, barley, and mixtures thereof. The cereal grains used in the present invention are commercially available, and may be whole grain cereals, but more preferably are processed from crops according to conventional processes for forming refined cereal grains. The term "refined cereal grain" as used herein also includes derivatives of cereal grains such as starches, modified starches, flours, other derivatives of cereal grains commonly used in the art to form cereals, and any combination of such materials with other cereal grains. A refined corn for example, is formed from U.S. No. 1 or No. 2 yellow dent corn by dry milling the corn to separate the endosperm from the germ and bran, and forming corn meal, corn grits, or corn flour from the endosperm. Refined wheat grain may be formed according to commercial milling practices from hard or soft wheat varieties, red or white wheat varieties, and may be a wheat flour containing little or no wheat bran, a wheat bran, or a milled wheat product containing flour, bran, and germ (whole wheat flour). Refined rye is preferably a rye flour which is formed according to commercial milling practices. Refined rice may be heads, second heads, or brewers rice which is formed by conventional practices for dehulling rough rice and pearling the dehulled rice, and preferably rough grinding the pearled and dehulled rice into a rice flour. Oats are refined by conventional practices into oat meal by dehulling and cleaning the oats to form oat groats and milling the oat groats to form oat meal or oat flour. The refined oats may also be defatted. Barley is refined according to conventional practices into barley flakes or barley grits by dehulling and cleaning the barley to form clean barley which is pearled and flaked or ground to form the barley flakes or barley grits.

The breakfast cereal and snack materials can obtain the desired flake structure by a process known as puffing. Basically, a cereal is puffed by causing trapped moisture in the flake to change very rapidly from the liquid state to the vapor phase. Rapid heating or a rapid decrease in pressure are the methods commonly used throughout the industry. Gun puffing is an example of the principle of a rapid decrease in pressure. In this process the cereal flakes are first heated under high pressure and then the pressure is rapidly released to achieve the puffing effect. The process disclosed in U.S. Pat. No. 3,253,533 is an example of a rapid heating puffing method.

To achieve the optimum puffing, care must be taken in regard to the initial moisture content of the unpuffed flake. The specific moisture content that is best is dependent on the particular type of puffing process being utilized. For instance, a moisture content of 12 to 14 percent is best for gun puffing while to 12 percent is best for puffing by a process that rapidly heats the flake. The optimum moisture content for any one puffing technique can routinely be determined experimentally. Additional processing steps can be utilized if it is so desired. For instance a toasting operation can be used after the puffing step if it is desired to change the color of the flake to a more desired rich golden brown. Frequently, a slight toasting step also brings out a pleasant toasted flavor note.

The food product produced using the methods described herein can be in the form of crunchy curls, puffs, chips, crisps, crackers, wafers, flat breads, biscuits, crisp breads, protein inclusions, cones, cookies, flaked products, fortune cookies, etc. The food product can also be in the form of pasta, such as dry pasta or a ready-to-eat pasta. The product can be used as or in a snack food, cereal, or can be used as an ingredient in other foods such as a nutritional bar, breakfast bar, breakfast cereal, or candy. In a pasta, the myceliated high protein food product may be, in a non-limiting example, be used in levels of about 10 g per 58 g serving (17%).

Baked goods.

Food compositions of the invention also include bakery products and baking mixes comprising myceliated high protein food products according to the invention according to known methods. The term "bakery product" includes, but is not limited to leavened or unleavened, traditionally flour-based products such as white pan and whole wheat breads (including sponge and dough bread), cakes, pretzels, muffins, donuts, brownies, cookies, pancakes, biscuits, rolls, crackers, pie crusts, pizza crusts, hamburger buns, pita bread, and tortillas.

In accordance with embodiments of the invention, leavening agents may be included in dough to produce products, which require a rising, such as crackers and breads. Exemplary leavening agents include yeast, baking powder, eggs, and other commercially available leavening agents. Preferably, leavening agents will comprise less than about 5%, by weight, of the dry ingredients.

Dough in accordance with embodiments of the invention may also include gums such as xanthum, guar, agar, and other commercially available hydrocolloids typically used for dough binding and conditioning. Additionally, food grade oils can be used to improve sheeting, texture, browning, and taste. Exemplary oils include soybean oil, canola oil, corn oil, and other commercially available oils. Lecithin may also be added to improve emulsification, water binding, and dough release.

In an embodiment, the amount of myceliated high protein food product in the bakery products or bakery mixes is in the range of at least 2 to 7 grams per 50 gram serving, or 5 or 6 grams per serving. A method of producing a food composition of the invention includes forming a cohesive dough by measuring and mixing the dry ingredients using standard mixing equipment.

Bread, rolls, bagels, and English muffins according to the invention may have between about 4.8% to about 7% (2.7 g) myceliated high protein food product of the invention per 40 g serving (adding 2 g protein for high protein bread formulation.)

Bars and Granolas

The present invention also includes food compositions such as granola cereals, and bar products, including such as granola bars, nutrition bars, energy bars, sheet and cut bars, extruded bars, baked bars, and combinations thereof.

The baked food compositions and bar compositions are generally formed dependent on the desired end product. The baked food compositions and bar compositions are produced according to standard industry recipes, substituting in a myceliated high-protein food product of the present invention for at least some of the called-for protein ingredients.

For the extruded compositions, protein fortification may be accomplished by supplementing the bar with edible proteins from at least one high protein content source, as known in the art, and including the myceliated food product of the present invention, either alone or as combinations with other proteins Based upon the weight of the extrudate, or core, a suitable amount of the at least one high protein content source is about 20% to about 30% by weight. The protein content should be at least about 15% by weight, based upon the weight of the final product.

In the present invention, a liquid sweet ingredient, such as corn syrup, preferably high fructose corn syrup, is used as a carbohydrate content source. In one embodiment, the liquid sweet ingredient provides a moist chewy texture to the bar, provides sweetness, and serves to distribute the dry ingredients. The liquid sweet ingredient can include, without limitation, corn syrup, high fructose corn syrup, honey, tapioca syrup, among others as known in the art. Additionally, the liquid sweet ingredient, in combination with other binders known in the art, can be useful to bind the other ingredients, such as the protein content and other carbohydrate content sources together. Suitable amounts of the liquid sweet ingredient are about 25% to about 30% by weight, based upon the weight of the extrudate. At least one other carbohydrate content source may be optionally included in the bar of the present invention. Exemplary of suitable carbohydrate content sources for providing a caloric distribution within the above ranges are sugars, such as fructose granules, brown sugar, sucrose, and mixtures thereof, and cereal grains such as rice, oats, corn, and mixtures thereof. Preferably, the snack contains at least one sugar and at least one carbohydrate. Based upon the weight of the core, suitable amounts of these ingredients are about 3% to about 10% by weight of at least one sugar, and about 12% to about 18% by weight of at least one cereal grain. The bar also optionally comprises a fat. Suitable sources of fats include those known in the art to be suitable for bar-type products and include milk, chocolate, and coconut oils, creams, and butters; nut butters such as peanut butter, and an oil such as vegetable oil. Also, a liquid wetting agent may be present in the composition, to facilitate mixing and binding of the dry ingredients to enhance moistness and chewiness of the snack. Exemplary of such wetting agents are molasses, honey, and vegetable oils, and mixtures thereof. A suitable amount of the at least one wetting agent is about 2% to 5% by weight. Suitable amounts of the flavoring ingredients range up to about 3% by weight. Also it is known in the art that carbohydrate content sources, useful in the present invention, may also be substantial sources of proteins and/or fats. For example, peanut flour, oats, and wheat germ each provide substantial amounts of proteins, carbohydrates, and fats. Dietary fiber can be included in the bar. Suitable amounts are about 3% to about 8%, preferably about 5% by weight fiber, based upon the weight of the final product. Suitable sources of dietary fiber are rolled oats and brans. The bar may be topped with conventional toppings, such as granola, crushed nuts, and the like, to enhance flavor and visual appeal. Suitable topping amounts are about 2% to 3% by weight of the final product.

In one embodiment, the nutritional snacks of the present invention are made by first mixing the liquid ingredients and the optional wetting agent. Next, the minor dry components are added to the mixed liquids. The minor dry components include ingredients such as, for example, minerals and vitamins, preferably premixed, and optional salt. The major dry ingredients can then admixed with the mixed liquids and minor dry ingredients to form a substantially homogeneous mixture. The major dry ingredients include e.g., sugars and cereal grains. The major dry ingredients also include the high protein content sources including the myceliated high protein food product of the invention. The flavoring ingredients, such as cocoa or coconut, can be added with the minor dry ingredients or with the major dry ingredients. All mixing can be in the same mixer or blender. Suitable mixing and blending equipment include conventional vertical and horizontal type mixers and blenders.

The mixed ingredients can be transferred via conveyor belts and hoppers, for example, to a conventional bar extruder, having opposing rollers which force the mixture through a die to form the extrudate or core. The extrusion is performed at about room temperature. No cooking or heating during or after extrusion is necessary nor desirable. The preferred extruded shape is a rectangular bar, but other shaped bars, known in the snack bar art, such as cylindrical, and semicylindrical shaped bars can be made using appropriate extruder dies.

In accordance with the present invention, the granola cereals and bar products, the dry ingredients can include a food particulate. A food particulate may include, without limitation, any edible food particulate. Such particulates can include flours, meals, cereal grains, cereal flakes, crisped rice, puffed rice, oats, crisped oats, granola, wheat cereals, protein nuggets, textured soy flour, textured soy protein concentrate, texturized protein ingredients such as those disclosed herein, flavored nuggets, cookie pieces, cracker pieces, pretzel pieces, crisps, soy grits, nuts, fruit pieces, vegetable pieces, corn cereals, seeds, popcorn, yogurt pieces, and combinations of any thereof.

For example, for grain-based bars, an appropriate amount of myceliated high protein food product includes from between about 20% to about 33.3% (20 g) myceliated high protein food product per 60 g serving (for example, 15 g protein in a high protein bar). Where the bar contains a fruit and/or vegetable, an appropriate amount of myceliated high protein food product includes can include about 20% (8 g) myceliated high protein food product per 45 g serving (adding 6 g to a total of 8 g in a high protein type bar.)

After extrusion, the product may be dried. The final product will have a moisture content of from about 1% to about 8%, depending on the desired characteristics of the finished product.

In one embodiment, an extruded nutritional protein bars may include 21.33 g/60 g of myceliated high protein food product of the present invention, with the balance including carbohydrate, nuts, oils, with proportions determined by conventional processes known in the art.

Food compositions of the present invention also include smoothies and smoothie bases, and juices, and soups and soup bases, fats and oils. For example, salad dressings can include about 8 g myceliated high protein food product of the invention per 30 g serving; a fruit juice, fruit flavored drink, fruit nectar may include about 1% by weight of myceliated high protein product of the invention. A vegetable juice such as a tomato juice can include between about 2.5% to about 20% (8 g) myceliated high protein food product of the invention per 240 mL serving. A smoothie may contain between about 3.5% to 20% by weight or between 9 and 20 g of myceliated high protein product of the invention, for example about 40 g per 450 mL serving.

For a soup or soup base (mix), prepared soups, dry soup mixes, and condensed soups, a myceliated high protein food product may be added in an amount of between 0.96%-~3.3% by weight (8 g) per 242 g serving. For a confectionary, such as a chocolate dessert (peanut butter cup), a myceliated food product of the invention may include about 2.67 g per 40 g serving.

Reaction Flavors

The Maillard reaction is a chemical reaction between amino acids and reducing sugars that gives browned food its distinctive flavor. Seared steaks, pan-fried dumplings, cookies and other kinds of biscuits, breads, toasted marshmallows, and many other foods undergo this reaction. The reaction is a form of non-enzymatic browning which typically proceeds rapidly from around 140 to 165° C. (280 to 330° F.). Many recipes call for an oven temperature high enough to ensure that a Maillard reaction occurs. At higher temperatures, caramelization and subsequently pyrolysis become more pronounced. In a Maillard reaction, the reactive carbonyl group of the sugar reacts with the nucleophilic amino group of the amino acid and forms a complex mixture of poorly characterized molecules responsible for a range of aromas and flavors. This process is accelerated in an alkaline environment (e.g., lye applied to darken pretzels; see lye roll), as the amino groups (RNH3+→RNH2) are deprotonated, hence have an increased nucleophilicity. The type of the amino acid determines the resulting flavor. This reaction is the basis for many of the flavoring industry's recipes. At high temperatures, a potential carcinogen called acrylamide can be formed.

The Strecker degradation (SD) plays several roles in the formation of flavor compounds in processed foods. Primarily, it is the major pathway for conversion of amino acids into structurally related aldehydes of significant flavor value. Also, the SD provides a relatively low energy route for mobilizing amino acids' nitrogen and sulfur to form ammonia, hydrogen sulfide and many flavor-significant S/N/O-containing heterocyclic compounds. And finally, the SD provides a reduction mechanism for conversion of dicarbonyls into acyloins thereby opening the door to still more diverse flavor compound formation.

In one embodiment, the present invention includes a method to prepare a reaction flavor composition. In this embodiment, the edible material comprises providing at least one reaction flavor component capable of facilitating Maillard and/or Strecker reactions. In another step, the method includes mixing the myceliated high protein food product and the reaction flavor component. In yet another step, the method includes processing the mixture to form the reaction flavor composition.

The present invention, in one embodiment, is directed to a reaction flavor. A "reaction flavor" is an art-recognized term that describes a flavor composition that is capable of providing, modifying or improving the flavor of foods and beverages. A "reaction flavor" is one that occurs by way of chemical reactions upon addition of sugars, amino acids and heat, such as Maillard reactions and Strecker reactions. The Maillard reaction is a chemical reaction between amino acids and reducing sugars that gives browned food its distinctive flavor. Seared steaks, pan-fried dumplings, cookies and other kinds of biscuits, breads, toasted marshmallows, and many other foods undergo this reaction. The reaction is a form of non-enzymatic browning which typically proceeds rapidly from around 140 to 165° C. (280 to 330° F.). Many recipes call for an oven temperature high enough to ensure that a Maillard reaction occurs. At higher temperatures, caramelization and subsequently pyrolysis become more pronounced. In a Maillard reaction, the reactive carbonyl group of the sugar reacts with the nucleophilic amino group of the amino acid and forms a complex mixture of poorly characterized molecules responsible for a range of aromas and flavors. This process is accelerated in an alkaline environment (e.g., lye applied to darken pretzels; see lye roll), as the amino groups ($RNH_3+ \rightarrow RNH_2$) are deprotonated, hence have an increased nucleophilicity. The type of the amino acid determines the resulting flavor. This reaction is the basis for many of the flavoring industry's recipes. At high temperatures, a potential carcinogen called acrylamide can be formed.

A Maillard reaction relies mainly on sugars and amino acids but it can also contain other ingredients including: autolysed yeast extracts (AYE), hydrolysed vegetable proteins (HVP), gelatin (protein source), vegetable extracts (i.e. onion powder), enzyme treated proteins, meat fats or extracts and acids or bases to adjust the pH of the reaction. The reaction is aqueous with an adjusted pH at specific temperatures (typically 100° C.) for a specified amount of time (typically 15 mins) to produce a variety of flavors. Typical flavors yielded are chicken, pork, beef, caramel, and chocolate. However, a wide variety of nuances and intensities can be achieved by adjusting the ingredients, the temperature and/or the pH of the reaction. The main advantage of the reaction flavor is that it can produce characteristic meat, burnt, roasted, caramellic, or chocolate profiles desired by the food industry, which are not typically achievable by using compounding of flavor ingredients.

Both mono as well as disaccharides can take part in the Maillard reaction. Generally speaking aldoses are more reactive than ketoses and pentoses more than hexoses or disaccharides, and so whereas the type of sugar strongly influences the amount of flavoring compounds generated, the amino acid involved in the reaction largely determines the nature of the flavor formed. For example, the inclusion of pure methionine in Maillard reaction systems often leads to vegetable or stewed notes, pure cysteine leads to meat-like flavors, pure proline, hydroxy proline and leucine to bakery aromas (R. F. Hurrell, Food Flavours, Part A: Introduction, Elsevier Scientific Publishing Company, Eds.: I. D. Morton and A. J. Macleod). Since these results have been obtained using pure amino acids rather than mixtures of several amino acids, as occur in food ingredients, it is evident that the outcome represents only a gross simplification of the natural situation. Likewise, the sugars that naturally occur in food will have an impact, and further complicate and affect the development of taste and aroma.

The Strecker degradation reaction is instrumental in the creation of the brown pigment as well as a myriad of volatile aromatics. It falls under the umbrella of, and requires compounds created by, the Maillard Reactions. Strecker degradation produces Strecker aldehydes and 2-aminocarbonyl compounds, both are critical intermediates in the generation of aromas during Maillard reaction, however, they can also be formed independently of the pathways established for Strecker degradation. Strecker aldehyde can be formed directly either from free amino acids or from Amadori products. Several pathways have been proposed in the literature for the mechanism of this transformation. On the other hand, Amadori or Heyns rearrangements of ammonia with reducing sugars can also generate 2-aminocarbonyl compounds without the formation of Strecker aldehyde. In addition, isomerization of the imine bond of the Schiff base formed between a reducing sugar and an amino acid, can initiate a transamination reaction and convert the amino acid into the corresponding α-keto acid and the sugar into its α-amino alcohol derivative. The reverse of this reaction has been documented to produce Amadori products. The α-keto acids can either decarboxylate to produce Strecker aldehydes or undergo Strecker degradation (as a α-dicarbonyl compound) with amino acids to also produce Strecker aldehydes. Key intermediates include α-dicarbonyl, α-hydroxycarbonyl, 2-amino carbonyls and 2-(amino acid)-carbonyl compounds during the Maillard reaction.

A reaction flavor, in an embodiment, will consist of a complex multi-component blend of both volatile and non-volatile reaction products, as well as any unreacted starting materials. Important reaction parameters can include precursor ingredient chemistry, reaction time and temperature, moisture, pressure, pH and the like. An important process parameter is viscosity control which will affect stirring, blending, pumping and the like, and therefore in many cases, it is conventional to form reaction flavors in aqueous slurries. Using conventional techniques, after cooking a slurry to create a reaction flavor, the slurry is dehydrated in a second step by spray drying or vacuum oven drying. Other methods known in the art include microwave processing, such as, for example, as disclosed in WO 2018/083224, published 11 May 2018, which is incorporated herein by reference in its entirety.

In one embodiment of the invention, the precursor material for the reaction flavor is a myceliated high-protein food product as disclosed herein and as made by processes disclosed herein. To the myceliated high protein food product as disclosed herein, a number of precursor compounds can be added, as known in the art, which can be varied in a manner known by a skilled flavorist, depending on the particular reaction flavor that is desired to create. Precursor compounds that can be added to the myceliated high protein food product include amino acids/amine sources, reducing sugars, as well as lipids or fats, spices and additional protein sources, such as hydrolyzed vegetable proteins (HVPs) or yeast autolysates.

In addition to these materials, the slurry can contain other materials that can modify taste or flavor, as known in the art, including sulfur sources, meat powers, powdered broths or stocks, and others.

In addition to the myceliated high protein food product as disclosed herein, additional amino acid/amine sources may be added, such as, for example, cysteine, methionine, alanine, glycine, lysine, arginine, histidine, tryptophan, proline, valine, glutamic acid, glutamine, aspartic acid, glutathione, other sulfur-containing peptides, HVP (groundnut, soybean wheat/maize gluten), other hydrolyzed proteins (e.g., from milk, egg, fish, blood, liver, bone, collagen), yeast extract, autolyzed yeast, meat extract, taurine and pyrrolidone carboxylic acid.

Reducing sugars are those that either have an aldehyde group or are capable of forming one in solution. The aldehyde group allows the sugar to act as a reducing agent in the Maillard reaction. Cyclic hemiacetal forms of aldoses can open to provide an aldehyde and certain ketoses can undergo tautomerization to become aldoses. Examples of reducing sugars include glucose, fructose, xylose, glyceraldehyde, galactose, lactose, arabinose, maltose, glucose polymers such as starch, hydrolyzed starch, and starch-derivatives such as glucose syrup, maltodextrin, and dextrin. Reaction flavor components can include glucose, ribose, fructose, date syrup, high fructose corn syrup, malted barley, agave syrup, tapioca syrup, and brown rice syrup, calcium carbonate, ascorbic acid, sodium ascorbate, calcium ascorbate, and/or potassium ascorbate, and combinations thereof.

Sulfur sources can include hydrogen sulfide, cysteine, cystine, methionine, glutathione, thiamine, inorganic sulfides, organic thiols and sulfides, 2-mercaptoethanol derivatives, vegetable extracts, fermented vegetable juices, yeast extract, autolyzed yeast, egg protein and meat extract.

The ratio between an amino acid and reducing sugar can vary within wide limits, as known in the art. In one embodiment, a typical ratio of amino acid to carbohydrate is 1:5 but this can vary significantly depending on the effect to be achieved. In an embodiment, the reaction flavor will be the product of a slurry containing up to 30 wt % water, up to 70% wt % of protein, 6 wt % of reducing sugar, up to 4 wt % lipids, up to 20 wt % carrier.

The pH of the slurry can be adjusted in the range of 0.5 to 8, more particularly 4 to 8. Any food grade acids or bases can be used, for example, lactic acid, phosphoric acid, acetic acid, citric acid, malic acid, tartaric acid, oxalic acid, tannic acid, and combinations thereof and examples of bases include sodium hydroxide, sodium carbonate, potassium bicarbonate, and sodium acetate.

The reaction flavor solid compositions of the present invention may represent a complete flavor composition that may be blended with a food or beverage to impart flavor thereto, or modify or improve the flavor thereof. Alternatively, the reaction flavor solid composition may form only a part of a complete flavor composition, and the reaction flavor solid composition can be mixed with other flavor ingredients to form the complete flavor composition.

A skilled flavorist will be able to mix a reaction flavor solid composition of the present invention with other known ingredients employed in flavor compositions to develop a wide variety of complete flavor compositions to satisfy the requirements of the food and beverage industry. Those other known ingredients useful in complete flavor compositions may be added to the slurry before the formation of the reaction flavor solid composition, or they may be blended with a reaction flavor solid composition after it is formed, or both.

A complete flavor composition may comprise a reaction flavor solid composition as described herein; aroma volatiles and other flavor ingredients generally known in the art; and other synergists or enhancers, such as fats or fatty acids, or their sources, herbs, spices and the like; pH regulators; inorganic salts; taste masking agents, vitamins; dyes; colorants; pigments, and the like.

Other ingredients include aldehyde and ketone sources, including acetaldehyde, propanal, butanal, methylpropanal, C3 to C5 alkanals, HVP, alpha diketones and sources thereof, including butanedione, pentane-2,3-dione, pyruvaldehyde, pyruvic acid, glyceraldehyde, glyoxal, dihydroxyacetone, alpha-ketobutyric acid, heptane-3,4-dione-2,5-diacetate, HMFone, HDFone, and related derivatives, ascorbic acid, 5-ketogluconic acid, cyclotene, maltol, lactic acid, glycolic acid, malic acid, tartaric acid, and protein hydrolysates.

Examples of flavor enhancers and their sources include MSG, IMP, GMP, yeast extract, autolyzed yeast, HVP, 2-furfuryl-thioinosine-5'-phosphate, 2-allyloxyinosine-5'-phosphate, 2-(lower alkoxy) inosine-5'-phosphate, 2-benzyl-thioinosine-5'-phosphate, 4-glucosylgluconic acid, and cyclotene.

Examples of fats include fats of beef, chicken, coconut, other triglycerides, fatty acids, and their esters. Examples of inorganic salts include chlorides and phosphates.

Depending upon the flavor profile that a skilled flavorist is trying to achieve, a complete flavor composition might additionally contain one or more of the following ingredients: acetaldehyde (apple), dimethyl sulfide, ethyl acetate, ethyl propionate, methyl butyrate, and ethyl butyrate; flavor oils containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in the flavor oils include: benzaldehyde (cherry, almond); cinnamic aldehyde (cinnamon); citral, i.e., alpha citral (lemon, lime); neral, i.e., beta-citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-1 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof; spice oleoresins derived from allspice, basil, capsicum, cinnamon, cloves, cumin, dill, garlic, marjoram, nutmeg, paprika, black pepper, rosemary, and turmeric, essential oils, anise oil, caraway oil, clove oil, eucalyptus oil, fennel oil, garlic oil, ginger oil, peppermint oil, onion oil, pepper oil, rosemary oil, spearmint oil, citrus oil, orange oil, lemon oil, bitter orange oil, tangerine oil, alliaceous flavours, garlic, leek, chive, and onion, botanical extracts, arnica flower extract, chamomile flower extract, hops extract, marigold extract, botanical flavour extracts, blackberry, chicory root, cocoa, coffee, kola, licorice root, rose hips, sarsaparilla root, sassafras bark, tamarind and vanilla extracts, protein hydrolysates, hydrolyzed vegetable proteins, meat protein hydrolyzates, milk protein hydrolyzates and compounded flavours both natural and artificial including those disclosed in S. Heath, Source Book of Flavors, Avi Publishing Co., Westport Connecticut, 1981, pages 149-277; valerian oil; 3,4-dimeth-oxyphenol; amyl acetate; amyl cinnamate, g-butyryl lactone; furfural; trimethyl pyrazine; phenyl acetic acid; isovaleraldehyde; ethyl maltol; ethyl vanillin; ethyl valerate; ethyl butyrate; cocoa extract; coffee extract; peppermint oil; spearmint oil; clove oil; anethol; cardamom oil; wintergreen oil; cinnamic aldehyde; ethyl-2-methyl valerate; g-hexenyl lactone; 2,4-decadienal; 2,4-heptadienal; methyl thiazole alcohol (4-methyl-5-p-hydroxyethyl thiazole); 2-methyl butanethiol; 4-mercapto-2-butanone; 3-mercapto-2-pentanone; 1-mercapto-2-propane; benzaldehyde; furfural; furfuryl alcohol; 2-mercapto propionic acid; alkyl pyrazine; methyl pyrazine; 2-ethyl-3-methyl pyrazine; tetramethyl pyrazine; polysulfides; dipropyl disulfide; methyl benzyl disulfide; alkyl thiophene; 2,3-dimethyl thiophene; 5-methyl furfural; acetyl furan; 2,4-decadienal; guiacol; phenyl acetaldehyde; b-decalactone; D-limonene; acetoin; amyl acetate; maltol; ethyl butyrate; levulinic acid; piperonal; ethyl acetate; n-octanal; n-pentanal; n-hexanal; diacetyl; monosodium glutamate; monopotassium glutamate; sulfur-containing amino acids, e.g., cysteine; hydrolyzed vegetable protein; 2-methylfuran-3-thiol; 2-methyldihydrofuran-3-thiol; 2,5-dimethylfuran-3-thiol; hydrolyzed fish protein; tetramethyl pyrazine; propylpropenyl disulfide; propylpropenyl trisulfide; diallyl disulfide; diallyl trisulfide; dipropenyl disulfide; dipropenyl trisulfide; 4-methyl-2-[(methylthio)-ethyl]-1,3-dithiolane; 4,5-dimethyl-2-(methylthiomethyl)-1,3-dithiolane; and 4-methyl-2-(methylthiomethyl)-1,3-dithiolane.

Complete flavor compositions may contain taste masking agents. Taste masking agents are substances for masking one or more unpleasant taste sensations, in particular a bitter, astringent and/or metallic taste sensation or aftertaste, which substances can be a constituent of the products according to the invention. Examples include dihydrochalcones, nucleotides, sodium salts, hydroxyflavanones and the like.

Complete flavor compositions may contain taste sensates. Taste sensates include hot tasting, salivation-inducing substances, substances causing a warm or tingling feeling, and cooling active ingredients. Examples of hot tasting and/or salivation-inducing substances and/or substances which cause a feeling of warmth and/or a tingling feeling on the skin or on the mucous membranes are: capsaicin, dihydrocapsaicin, gingerol, paradol, shogaol, piperine, carboxylic acid-N-vanillylamides, in particular nonanoic acid-N-vanillylamide, pellitorine or spilanthol, 2-nonanoic acid amides, in particular 2-nonanoic acid-N-isobutylamide, 2-nonanoic acid-N-4-hydroxy-3-methoxyphenylamide, alkyl ethers of 4-hydroxy-3-methoxybenzyl alcohol, in particular 4-hydroxy-3-methoxybenzyl-n-butylether, alkyl ethers of 4-acyloxy-3-methoxybenzyl alcohol, in particular 4-acetyloxy-3-methoxybenzyl-n-butylether and 4-acetyloxy-3-methoxybenzyl-n-hexylether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylene dioxybenzyl alcohol, (4-hydroxy-3-methoxyphenyl)acetic acid amides, in particular (4-hydroxy-3-methoxyphenyl) acetic acid-N-n-octylamide, vanillomandelic acid alkylamides, ferulic acid-phenethylamides, nicotinaldehyde, methylnicotinate, propylnicotinate, 2-butoxyethylnicotinate, benzylnicotinate, 1-acetoxychavicol, polygodial and isodrimeninol. Hot tasting natural extracts and/or natural extracts which cause a feeling of warmth and/or a tingling feeling on the skin or on the mucous membranes and which can be a constituent of a complete flavor composition are: extracts of paprika, extracts of pepper (for example capsicum extract), extracts of chili pepper, extracts of ginger roots, and the like.

As stated hereinabove, any one or a combination of these ingredients may be added to the slurry during reaction flavor formation, or they may be blended with the reaction flavor solid composition, once the latter is formed in accordance with a method according to the invention.

In addition to the aforementioned ingredients, a complete flavor composition may contain carrier materials. Carrier materials are employed, particularly when the reaction complete flavor composition is presented in the form of a powder, as flow aids, or extenders, or to provide physical stability to the powder by modifying the glass transition temperature (Tg) of the powder. Suitable carriers which may be included as a component of the reaction flavor solid composition as such, or as a component in a complete flavor compositions include but are not limited to sugars, sugar derivatives, modified starches, proteins, alcohols, celluloses, dextrins, gums, sugar polyols, peptides, acids, carbohydrates, hydrocolloids. Particular examples of suitable materials include sugars such as gum arabic, capsule, maltose, sucrose, glucose, lactose, levulose, trehalose, fructose, ribose, dextrose, isomalt, sorbitol, mannitol, xylitol, lactitol, maltitol, pentatol, arabinose, pentose, xylose, galactose; hydrogenated starch hydrolysates, inulin, oligosaccharides such as oligo fructose; maltodextrins or dextrins (i.e., soluble fiber); modified starch; sugar fruit gran; corn syrup solids; sugar white gran; hydrocolloids such as agar, gum acacia, modified gum acacia, sodium alginate, potassium alginate, ammonium alginate, calcium alginate or carrageenan; gums; polydextrose; celluloses such as sodium carboxymethylcellulose, enzymatically hydrolyzed carboxy methyl cellulose, methyl cellulose, hydroxypropyl cellulose and hydroxypropyl methyl cellulose; proteins such as gelatine, pea protein, soy and whey protein isolates and hydrolyzates, and sodium casemates; silicon dioxide; and derivatives and mixtures thereof.

Carriers may be employed in complete flavor compositions in amounts of 5 to 25 wt % based on the dry weight of the reaction flavor solid composition.

Within the scope of this invention are foods or beverages containing a reaction flavor solid composition of this invention, alone or as a part of a complete flavor composition.

A feature of the present invention is that the reaction flavor composition is a product that is formed externally of a food or beverage matrix. It is an article of manufacture that can impart to, or modify or improve the flavor of a food or beverage, either alone or as part of a complete flavor composition, by virtue of it being mixed with or applied to a food or a beverage. The reaction flavor solid composition is not formed in or on a food or beverage matrix during the cooking process for a food or beverage.

The method may further include a heat-treatment and/or concentrating step. Such treatments include, without limitation, heating the reaction flavor composition by heating by any method known in the art. Suitable heating means can be selected from conventional means and optionally include a reaction kettle, drum dryer, a flash dryer, a hot plate, an extruder/heater, a concentrator, and other such conventionally known techniques. The heat treatment can be carried out at normal pressures or under increased pressures. For example, a suitable range of heating temperature is 80 to 150° C., or 90 to 110° C. Suitable temperature ranges can be from 90 to 150° C., 100 to 150° C., 110 to 150° C., 120 to 150° C., 130 to 150° C., or 140 to 150° C.; for can be from 80 to 180° C., 100 to 180° C., 120 to 180° C., 120 to 180° C., 130 to 180° C., 140 to 180° C., 150 to 180° C., or 160 to 180° C. At highest temperature ranges, above 150° C. or more, unpleasant burnt tastes may appear. Before, during, or after the heating step, the reaction flavor composition may be concentrated (e.g., to dewater the material), by methods known in the art. In embodiments, the heating and concentration step may be carried out concurrently. In embodiments, the remaining moisture after the heating step may be 30% by weight or less, 25% by weight or less, 20% by weight or less, 15% by weight or less, or 10% by weight or less; or between 20 and 30% by weight, or between 10 and 20% by weight or less. In other embodiments, the volume of the umami taste material can be reduced about 50%, about 70%, about 80%, about 90% or about 95%.

Although the amount of a particular reaction flavor solid composition employed in a food or beverage will be dependent upon the intended application and effect that is desired to be achieved, generally, an amount of 0.1 to 1% by weight and preferably, about 0.1 to 0.5% by weight is appropriate to impart a desirable flavor and/or aroma to a food or beverage, or modify or improve the flavor and/or aroma of a food or beverage.

Examples of foods or beverages include baked products, snack foods, cereal products, alcoholic and non-alcoholic beverages, spice blends, ready-to-heat foods, ready-to-eat meals, dairy products, meat products, seasoning preparations, ketchup, sauces, dried vegetables, soups, bouillon, noodles, frozen entrees, gravy, and desserts. Reaction flavor solid compositions of the present invention can make a general improvement to the flavor of foods or beverages. The reaction flavor solid compositions may be added to a food or beverage by simple mixing with other ingredients in the final blending of a food or beverage, such as a convenience food.

Alternatively, the reaction flavor solid composition may be added to the outside of a food or beverage, for example, the process of dusting or spray coating a snack food. Still further, the reaction flavor solid composition may be added to a food or beverage during its formation, in a process which is sometimes referred to as internal flavoring.

The reaction flavor solid compositions of the present invention are well-suited for use, without limitation, in any edible product, such as those products disclosed herein.

In order to make the food compositions of the present invention, the method includes a step of providing a myceliated high-protein food product. Additionally, the food compositions of the present invention, in an embodiment, comprise a myceliated high-protein food product. The present inventors have previously disclosed a method to prepare a myceliated high-protein food product, which includes culturing a filamentous fungus in an aqueous media which has a high level of protein, for example at least 20% protein (w/w), on a dry weight basis, and the media contains at least 50 g/L protein. The fungi can include *Lentinula edodes*, *Agaricus* spp., *Pleurotus* spp., *Boletus* spp., or *Laetiporus* spp.; e.g., *Pleurotus ostreatus*, *Pleurotus eryngii*, *Lepista nuda*, *Hericium erinaceus*, *Lentinula edodes*, *Agaricus blazeii*, *Cordyceps sinensis*, *Laetiporus sulfureus* and combinations thereof. Compositions comprising a myceliated high-protein food product are also disclosed. See, e.g., U.S. Pat. No. 10,010,103, filed Apr. 14, 2017, U.S. Ser. No. 16/025,365, (filed Jul. 2, 2018), both entitled "Methods for the Production and use of Myceliated High-Protein Food Compositions,", U.S. Ser. No. 62/752,158 (filed 10-29-18), U.S. Ser. No. 62/796,438 (filed 1-24-19), related to aqueous-phase fermentation of protein materials, all of which are incorporated by reference herein in their entireties.

In one embodiment, the present invention includes a method step to prepare a myceliated high-protein food product. The method may optionally include the steps of providing an aqueous media comprising a high-protein material. The aqueous media may comprise, consist of, or consist essentially of at least 20% protein (w/w), on a dry weight basis, and is 50 g/L protein. The media may also comprise, consist of or consist essentially of optional additional excipients as identified herein below. The aqueous media may be inoculated with a fungal culture. The inoculated media may then be cultured to produce a myceliated high-protein food product, and the myceliated high-protein food product taste, flavor, and/or aroma may be modulated compared to the high-protein material in the absence of the culturing step.

The aqueous media may comprise, consist of, or consist essentially of a high-protein material. The high-protein material to include in the aqueous media can be obtained from a number of sources, including vegetarian sources (e.g., plant sources) as well as non-vegetarian sources, and can include a protein concentrate and/or isolate. Vegetarian sources include meal, protein concentrates and isolates prepared from a vegetarian source such as pea, rice, soy, cyanobacteria, grain, hemp, chia, chickpea, potato protein, algal protein and nettle protein or combinations of these. In embodiments, the vegetarian source is pea, rice, chickpea or a combination thereof. In embodiments, the vegetarian source is pea, chickpea or a combination thereof. In embodiments, the vegetarian source is rice, chickpea, or a combination thereof. Typically, a protein concentrate is made by removing the oil and most of the soluble sugars from a meal, such as soybean meal. Such a protein concentrate may still contain a significant portion of non-protein material, such as fiber. Typically, protein concentrations in such products are between 55-90%. The process for production of a protein isolate typically removes most of the non-protein material such as fiber and may contain up to about 90-99% protein. A typical protein isolate is typically subsequently dried and is available in a powdered form and may alternatively be called "protein powder."

Non-vegetarian sources for the high-protein material may also be used in the present invention. Such non-vegetarian sources include whey, casein, egg, meat (beef, chicken, pork sources, for example), isolates, concentrates, broths, or powders.

In one embodiment, mixtures of any of the high-protein materials disclosed herein can be used to provide, for example, favorable qualities, such as a more complete (in terms of amino acid composition) high-protein material. In one embodiment, high-protein materials such as pea protein and rice protein can be combined. In one embodiment, the ratio of a mixture can be from 1:10 to 10:1 pea protein:rice protein (on a dry basis). In one embodiment, the ratios can optionally be 5:1 to 1:5, 2:1 to 1:2, or in one embodiment, 1:1. In other embodiments, the ratio can be 65:35.

The high-protein material itself can be about 20% protein, 30% protein, 40% protein, 45% protein, 50% protein, 55% protein, 60% protein, 65% protein, 70% protein, 75% protein, 80% protein, 85% protein, 90% protein, 95% protein, or 98% protein, or at least about 20% protein, at least about 30% protein, at least about 40% protein, at least about 45% protein, at least about 50% protein, at least about 55% protein, at least about 60% protein, at least about 65% protein, at least about 70% protein, at least about 75% protein, at least about 80% protein, at least about 85% protein, at least about 90% protein, at least about 95% protein, or at least about 98% protein.

This invention discloses the use of concentrated media, which provides, for example, an economically viable economic process for production of an acceptably tasting and/or flavored high-protein food product. In one embodiment of the invention the total media concentration is up to 150 g/L but can also be performed at lower levels, such as 5 g/L. Higher concentrations in media result in a thicker and/or more viscous media, and therefore are optionally processed by methods known in the art to avoid engineering issues during culturing or fermentation. To maximize economic benefits, a greater amount of high-protein material per L media is used. The amount is used is chosen to maximize the amount of high-protein material that is cultured, while minimizing technical difficulties in processing that may arise during culturing such as viscosity, foaming and the like.

The amount of total protein in the aqueous media may comprise, consist of, or consist essentially of at least 20 g, 25 g, 30 g, 35 g, 40 g, 45 g, 50 g, 55 g, 60 g, 65 g, 70 g, 75 g, 80 g, 85 g, 90 g, 95 g, or 100 g, or more, of protein per 100 g total dry weight w/w, or per total all components on a dry weight basis. Alternatively, the amount of protein comprises, consist of, or consist essentially of between 20 g to 90 g, between 30 g and 80 g, between 40 g and 70 g, between 50 g and 60 g, of protein per 100 g dry weight w/win the media.

In some embodiments, the total protein in aqueous media is about 45 g to about 100 g, or about 80-100 g of protein per 100 g dry weight w/w.

In another embodiment, the aqueous media comprises between about 1 g/L and 200 g/L, between about 5 g/L and 180 g/L, between about 20 g/L and 150 g/L, between about 25 g/L and about 140 g/L, between about 30 g/L and about 130 g/L, between about 35 g/L and about 120 g/L, between about 40 g/L and about 110 g/L, between about 45 g/L and about 105 g/L, between about 50 g/L and about 100 g/L, between about 55 g/L and about 90 g/L, or about 75 g/L protein; or between about 50 g/L-150 g/L, or about 75 g/L and about 120 g/L, or about 85 g/L and about 100 g/L. Alternatively, the aqueous media comprises at least about 10 g/L, at least about 15 g/L, at least about 20 g/L, at least about 25 g/L, at least about 30 g/L, at least about 35 g/L, at least about 40 g/L or at least about 45 g/L protein. In fermenters, in some embodiments the amount to use includes between about 1 g/L and 150 g/L, between about 10 g/L and 140 g/L, between about 20 g/L and 130 g/L, between about 30 g/L and about 120 g/L, between about 40 g/L and about 110 g/L, between about 50 g/L and about 100 g/L, between about 60 g/L and about 90 g/L, between about 70 g/L and about 80 g/L, or at least about 20 g/L, at least about 30 g/L, at least about 40 g/L, at least about 50 g/L, at least about 60 g/L, at least about 70 g/L, at least about 80 g/L, at least about 90 g/L, at least about 100 g/L, at least about 110 g/L, at least about 120 g/L, at least about 130 g/L or at least about 140 g/L.

In some embodiments, the aqueous media comprises between about 50 g/L and about 100 g/L, or about 80 g/L, about 85 g/L, about 90 g/L, about 95 g/L about 100 g/L, about 110 g/L, about 120 g/L, about 130 g/L, about 140 g/L, or about 150 g/L.

In some embodiments, the high-protein material, after preparing the aqueous media of the invention, is not completely dissolved in the aqueous media. Instead, the high-protein material may be partially dissolved, and/or partially suspended, and/or partially colloidal. However, even in the absence of complete dissolution of the high-protein material, positive changes may be affected during culturing of the high-protein material. In one embodiment, the high-protein material in the aqueous media is kept as homogenous as possible during culturing, such as by ensuring agitation and/or shaking.

In one embodiment, the aqueous media further comprises, consists of, or consists essentially of materials other than the high-protein material, e.g., excipients as defined herein and/or in particular embodiments. Excipients can comprise any other components known in the art to potentiate and/or support fungal growth, and can include, for example, nutrients, such as proteins/peptides, amino acids as known in the art and extracts, such as malt extracts, meat broths, peptones, yeast extracts and the like; energy sources known in the art, such as carbohydrates; essential metals and minerals as known in the art, which includes, for example, calcium, magnesium, iron, trace metals, phosphates, sulphates; buffering agents as known in the art, such as phosphates, acetates, and optionally pH indicators (phenol red, for example). Excipients may include carbohydrates and/or sources of carbohydrates added to media at 5-10 g/L. It is usual to add pH indicators to such formulations.

Excipients may also include peptones/proteins/peptides, as is known in the art. These are usually added as a mixture of protein hydrolysate (peptone) and meat infusion, however, as used in the art, these ingredients are typically included at levels that result in much lower levels of protein in the media than is disclosed herein. Many media have, for example, between 1% and 5% peptone content, and between 0.1 and 5% yeast extract and the like.

In one embodiment, excipients include for example, yeast extract, malt extract, maltodextrin, peptones, and salts such as diammonium phosphate and magnesium sulfate, as well as other defined and undefined components such as potato or carrot powder. In some embodiments, organic (as determined according to the specification put forth by the National Organic Program as penned by the USDA) forms of these components may be used.

In one embodiment, excipients comprise, consist of, or consist essentially of dry carrot powder, dry malt extract, diammonium phosphate, magnesium sulfate, and citric acid. In one embodiment, excipients comprise, consist of, or consist essentially of dry carrot powder between 0.1-10 g/L, dry malt extract between 0.1 and 20 g/L, diammonium phosphate between 0.1 and 10 g/L, and magnesium sulfate between 0.1 and 10 g/L. Excipients may also optionally comprise, consist of, or consist essentially of citric acid and an anti-foam component. The anti-foam component can any anti-foam component known in the art, such as a food-grade silicone anti-foam emulsion or an organic polymer anti-foam (such as a polypropylene-based polyether composition).

In another embodiment, the medium comprises, consists of or consists essentially of the high protein material as defined herein and an anti-foam component, without any other excipients present.

The method may also comprise the optional step of sterilizing the aqueous media prior to inoculation by methods known in the art, including steam sterilization and all other known methods to allow for sterile procedure to be followed throughout the inoculation and culturing steps to enable culturing and myceliation by pure fungal strains. Alternatively, the components of the media may be separately sterilized and the media may be prepared according to sterile procedure.

The method also includes inoculating the media with a fungal culture. The fungal culture may be prepared by culturing by any methods known in the art. In one embodiment, the methods to culture may be found in, e.g., PCT/US14/29989, filed Mar. 15, 2014, PCT/US14/29998, filed Mar. 15, 2014, all of which are incorporated by reference herein in their entireties.

The fungal cultures, prior to the inoculation step, may be propagated and maintained as is known in the art. In one embodiment, the fungi discussed herein can be kept on 2-3% (v/v) fruit puree with 3-4% agar (m/v). Such media is typically prepared in 21.6 L handled glass jars being filled with 1.4-1.5 L media. Such a container pours for 50-60 90 mm Petri plates. The media is first sterilized by methods known in the art, typically with an autoclave. Conventional *B. stearothermophilus* and thermocouple methods are used to verify sterilization parameters. Some strains, such as *L. sulfureus*, grow better when supplemented with 1% yellow cornmeal. Agar media can also be composed of high-protein material to sensitize the strain to the final culture. This technique may also be involved in strain selection of the organisms discussed herein. Agar media should be poured when it has cooled to the point where it can be touched by hand (~40-50° C.).

In one embodiment, maintaining and propagating fungi for use for inoculating the high-protein material as disclosed in the present invention may be carried out as follows. For example, a propagation scheme that can be used to continuously produce material according to the methods is discussed herein. Once inoculated with master culture and subsequently colonized, Petri plate cultures can be used at any point to propagate mycelium into prepared liquid media. As such, plates can be propagated at any point during log phase or stationary phase but are encouraged to be used within three months and in another embodiment within 2 years, though if properly handled by those skilled in the art can generally be stored for as long as 10 years at 4° C. and up to 6 years at room temperature.

In some embodiments, liquid cultures used to maintain and propagate fungi for use for inoculating the high-protein material as disclosed in the present invention include undefined agricultural media with optional supplements as a motif to prepare culture for the purposes of inoculating solid-state material or larger volumes of liquid. As such, liquid media are typically inoculated with agar, liquid and other forms of culture. Bioreactors provide the ability to monitor and control aeration, foam, temperature, and pH and other parameters of the culture and as such enables shorter myceliation times and the opportunity to make more concentrated media.

In one embodiment, the fungi for use for inoculating the high-protein material as disclosed in the present invention may be prepared as a submerged liquid culture and agitated on a shaker table, or may be prepared in a shaker flask, by methods known in the art and according to media recipes disclosed in the present invention. In one embodiment, the fungal component may be prepared from a glycerol stock, by a simple propagation motif of Petri plate culture to 0.5-–4 L Erlenmeyer shake flask to 50% glycerol stock. Petri plates can comprise agar in 10-35 g/L in addition to various media components. Conducted in sterile operation, chosen Petri plates growing anywhere from 1-~3,652 days can be propagated into 0.5-4 L Erlenmeyer flasks (or 250 to 1,000 mL Wheaton jars, or any suitable glassware) for incubation on a shaker table or stationary incubation. The smaller the container, the faster the shaker should be. In one embodiment, the shaking is anywhere from 40-160 RPM depending on container size and, with about a 1" swing radius.

Liquid-state fermentation agitation and swirling techniques as known in the art are also employed which include mechanical shearing using magnetic stir bars, stainless steel impellers, injection of sterile high-pressure air, the use of shaker tables and other methods such as lighting regimen, batch feeding or chemostatic culturing, as known in the art.

In one embodiment, culturing step is carried out in a bioreactor which is ideally constructed with a torispherical dome, cylindrical body, and spherical cap base, jacketed about the body, equipped with a magnetic drive mixer, and ports to provide access for equipment comprising DO, pH, temperature, level and conductivity meters as is known in the art. Any vessel capable of executing the methods of the present invention may be used. In another embodiment the set-up provides 0.1-5.0 ACH. Other engineering schemes known to those skilled in the art may also be used.

The reactor can be outfitted to be filled with sterile water. In one embodiment the entire media is sterilized in situ while in another embodiment concentrated media is sterilized and diluted into a vessel filled water that was filter and/or heat sterilized, or sufficiently treated so that it doesn't encourage contamination over the colonizing fungus. In another embodiment, high temperature high pressure sterilizations are fast enough to be not detrimental to the media. In one embodiment the entire media is sterilized in continuous mode by applying high temperature between 130° and 150° C. for a residence time of 1 to 15 minutes. Once prepared with a working volume of sterile media, the tank can be mildly agitated and inoculated. Either as a concentrate or whole media volume in situ, the media can be heat sterilized by steaming either the jacket, chamber or both while the media is optionally agitated. The medium may optionally be pasteurized instead.

In one embodiment, the reactor is used at a large volume, such as in 500,000-200,000 L working volume bioreactors. When preparing material at such volumes the culture must pass through a successive series of larger bioreactors, any bioreactor being inoculated at 0.5-15% of the working volume according to the parameters of the seed train. A typical process would pass a culture from master culture, to Petri plates, to flasks, to seed bioreactors to the final main bioreactor when scaling the method of the present invention. To reach large volumes, 3-4 seeds may be used. The media of the seed can be the same or different as the media in the main. In one embodiment, the fungal culture for the seed is a protein concentration as defined herein, to assist the fungal culture in adapting to high-protein media in preparation for the main fermentation. Such techniques are discussed somewhat in the examples below. In one embodiment, foaming is minimized by use of anti-foam on the order of 0.5 to 2.5 g/L of media, such as those known in the art, including insoluble oils, polydimethylsiloxanes and other silicones, certain alcohols, stearates and glycols. In one embodiment, lowering pH assists in culture growth, for example, for *L. edodes* pH may be adjusted by use of citric acid or by any other compound known in the art, but care must be taken to avoid a sour taste for the myceliated high-protein product. The pH may be adjusted to between about 4.5 and 5.5, for example, to assist in growth.

In one embodiment, during the myceliation step, for example, wherein the media comprises at least 50% (w/w) protein on a dry weight basis, and/or wherein the media comprises at least 50 g/L protein, the pH does not change during processing. "pH does not change during processing" is understood to mean that the pH does not change in any significant way, taking into account variations in measured pH which are due to instrument variations and/or error. For example, the pH will stay within about plus or minus 0.3 pH units, plus or minus 0.25 pH units, plus or minus 0.2 pH units, plus or minus 0.15 pH units, or plus or minus 0.1 pH units of a starting pH of the culture during the myceliation, e.g. processing step. Minor changes in pH are also contemplated during processing, particularly in media which do not contain an exogenous buffer such as diammonium phosphate. A minor change in pH can be defined as a pH change of plus or minus 0.5 pH units or less, plus or minus 0.4 pH units or less, plus or minus 0.3 pH units or less, plus or minus 0.25 pH units or less, plus or minus 0.2 pH units or less, plus or minus 0.15 pH units or less, or plus or minus 0.1 pH units or less of a starting pH.

In an exemplification of the preparation of *L. edodes* as the fungal component for use for inoculating an aqueous media to prepare the myceliated high-protein food product, 1:1 mixture of pea protein and rice protein at 40% protein (8 g per 20 g total plus excipients) media was prepared, and the increase in biomass concentration was correlated with a drop in pH. After shaking for 1 to 10 days, an aliquot (e.g. 10 to 500 mL) of the shake flask may be transferred in using sterile procedure into a sterile, prepared sealed container (such as a customized stainless steel can or appropriate conical tube), which can then adjusted with about 5-60%, sterile, room temperature (v/v) glycerol. The glycerol stocks can may be sealed with a water tight seal and can be held stored at −20° C. for storage. The freezer is ideally a constant temperature freezer. Glycerol stocks stored at 4° C. may also be used. Agar cultures can be used as inoculant for the methods of the present invention, as can any culture propagation technique known in the art.

It was found that not all fungi are capable of growing in media as described herein. Fungi useful for the present invention are from the higher order Basidio- and Ascomycetes. In some embodiments, fungi effective for use in the present invention include, but are not limited to, *Lentinula* spp., such as *L. edodes, Agaricus* spp., such as *A. blazei, A. bisporus, A. campestris, A. subrufescens, A. brasiliensis*, or *A. silvaticus; Pleurotus* spp., *Boletus* spp., or *Laetiporus* spp. In one embodiment, the fungi for the invention include fungi from optionally, liquid culture of species generally known as oyster, porcini, 'chicken of the woods' and shiitake mushrooms. These include *Pleurotus* (oyster) species such as *Pleurotus ostreatus, Pleurotus salmoneostramineus (Pleurotus djamor), Pleurotus eryngii*, or *Pleurotus citrinopileatus; Boletus* (porcini) species such as *Boletus edulis; Laetiporus* (chicken of the woods) species such as *Laetiporus sulfureus*, and many others such as *L. budonii, L. miniatus, L. flos-musae, L. discolor*; and *Lentinula* (shiitake) species such as *L. edodes*. Also included are *Lepista nuda, Hericium erinaceus, Agaricus blazeii*, and combinations thereof. In one embodiment, the fungi is *Lentinula edodes*.

In other embodiments, the filamentous fungus may comprise, consist of, or consist essentially of *Hericium erinaceus, Lentinula edodes, Cantharellus cibarius, Cordyceps sinensis, Ganoderma lucidum, Laetiporus sulphureus, Laetiporus cincinnatus, Morchella angusticeps, Morchella importuna, Grifola frondosa, Grifola curtisii, Pleurotus ostreatus, Pleurotus umbellatus, Volvariella volvacea, Pleurotus salmoneostramineus (Pleurotus djamor), Pleurotus eryngii, Pleurotus citrinopileatus, Cantherellus cibarius* (chanterelle), *Fumaria officianalis, Fistulina hepatica, Sparassis crispa, Inonotus obliquus, Cordyceps militaris, Cyclocybe aegerita, Flammulina velutipes, Morchella esculenta, Laetiporus cincinnatus, Morchella importuna, Hypsizygus tessellatus, Stropharia Rugoso-Annulata, Termitomyces albuminosus*, and/or combinations thereof.

Fungi may be obtained commercially, for example, from the Penn State Mushroom Culture Collection. Strains are typically received as "master culture" PDY slants in 50 mL test tubes and are stored at all, but for *A. blazeii*, stored at 4° C. until plated. For plating, small pieces of culture are typically transferred into sterile shake flasks (e.g. 250 mL) so as not to contaminate the flask filled with a sterilized media (liquid media recipes are discussed below). Inoculated flasks shake for approximately ten hours and aliquots of said flasks are then plated onto prepared Petri plates of a sterile agar media. One flask can be used to prepare dozens to potentially hundreds of Petri plate cultures. There are other methods of propagating master culture though the inventors find these methods as disclosed to be simple and efficient.

Determining when to end the culturing step and to harvest the myceliated high-protein food product, which according to the present invention, to result in a myceliated high-protein food product with acceptable taste, flavor and/or aroma profiles, can be determined in accordance with any one of a number of factors as defined herein, such as, for example, visual inspection of mycelia, microscope inspection of mycelia, pH changes, changes in dissolved oxygen content, changes in protein content, amount of biomass produced, and/or assessment of taste profile, flavor profile, or aroma profile. In one embodiment, harvest can be determined by tracking protein content during culturing and harvest before significant catabolism of protein occurs. The present inventors found that protein catabolism can initiate in bioreactors at 30-50 hours of culturing under conditions defined herein. In another embodiment, production of a certain amount of biomass may be the criteria used for harvest. For example, biomass may be measured by filtering, such through a filter of 10-1000 µm, and has a protein concentration between 0.1 and 25 g/L; or in one embodiment, about 0.2-0.4 g/L. In one embodiment, harvest can occur when the dissolved oxygen reaches about 10% to about 90% dissolved oxygen, or less than about 80% of the starting dissolved oxygen. Additionally, mycelial products may be measured as a proxy for mycelial growth, such as, total reducing sugars (usually a 40-95% reduction), β-glucan and/or chitin formation; harvest is indicated at 102-104 ppm. Other indicators include small molecule metabolite production depending on the strain (e.g. eritadenine on the order of 0.1-20 ppm for *L. edodes* or erinacine on the order of 0.1-1,000 ppm for *H. erinaceus*) or nitrogen utilization (monitoring through the use of any nitrogenous salts or protein, cultures may be stopped just as protein starts to get utilized or may continue to culture to enhance the presence of mycelial metabolites). In one embodiment, the total protein yield in the myceliated high-protein food product after the culturing step is about 75% to about 95%.

Harvest includes obtaining the myceliated high-protein food product which is the result of the myceliation step. After harvest, cultures can be processed according to a variety of methods. In one embodiment, the myceliated high-protein food product is pasteurized or sterilized. In one embodiment, the myceliated high-protein food product is dried according to methods as known in the art. Additionally, concentrates and isolates of the material may be prepared using variety of solvents or other processing techniques known in the art. In one embodiment the material is pasteurized or sterilized, dried and powdered by methods known in the art. Drying can be done in a desiccator, vacuum dryer, conical dryer, spray dryer, fluid bed or any method known in the art. Preferably, methods are chosen that yield a dried myeliated high-protein product (e.g., a powder) with the greatest digestibility and bioavailability. The dried myeliated high-protein product can be optionally blended, pestled milled or pulverized, or other methods as known in the art.

In many cases, the flavor, taste and/or aroma of high-protein materials as disclosed herein, such as protein concentrates or isolates from vegetarian or nonvegetarian sources (e.g. egg, whey, casein, beef, soy, rice, hemp, pea, chickpea, soy, cyanobacteria, and chia) may have flavors, which are often perceived as unpleasant, having pungent aromas and bitter or astringent tastes. These undesirable flavors and tastes are associated with their source(s) and/or their processing, and these flavors or tastes can be difficult or impossible to mask or disguise with other flavoring agents. The present invention, as explained in more detail below, works to modulate these tastes and/or flavors.

In one embodiment of the invention, flavors and/or tastes of the myceliated high-protein food product or products are modulated as compared to the high-protein material (starting material). In some embodiments, both the sterilization and myceliation contribute to the modulation of the resultant myceliated high-protein food products' taste.

In one embodiment, the aromas of the resultant myceliated high-protein food products prepared according to the invention are reduced and/or improved as compared to the high-protein material (starting material). In other words, undesired aromas are reduced and/or desired aromas are increased. In another embodiment, flavors and/or tastes may be reduced and/or improved. For example, desirable flavors and/or tastes may be increased or added to the high-protein material by the processes of the invention, resulting in myceliated high-protein food products that have added mushroom, meaty, umami, popcorn, buttery, and/or other flavors or tastes to the food product. The increase in desirable flavors and/or tastes may be rated as an increase of 1 or more out of a scale of 5 (1 being no taste, 5 being a very strong taste.)

Flavors and/or tastes of myceliated high-protein food products may also be improved by processes of the current invention. For example, deflavoring can be achieved, resulting in a milder flavor and/or with the reduction of, for example, bitter and/or astringent tastes and/or beany and/or weedy and/or grassy tastes. The decrease in undesirable flavors and/or tastes as disclosed herein may be rated as a decrease of 1 or more out of a scale of 5 (1 being no taste, 5 being a very strong taste.)

Culturing times and/or conditions can be adjusted to achieve the desired aroma, flavor and/or taste outcomes. For example, cultures grown for approximately 2-3 days can yield a deflavored product whereas cultures grown for longer may develop various aromas that can change/intensify as the culture grows. As compared to the control and/or high-protein material, and/or the pasteurized, dried and powdered medium not subjected to sterilization or myceliation, the resulting myceliated high-protein food product in some embodiments is less bitter and has a milder, less beany aroma.

In one embodiment of the present invention, the myceliated high-protein food products made by the methods of the invention have a complete amino acid profile (all amino acids in the required daily amount) because of the media from which it was made has such a profile. While amino acid and amino acid profile transformations are possible according to the methods of the present invention, many of the products made according to the methods of the present invention conserve the amino acid profile while at the same time, more often altering the molecular weight distribution of the proteome.

In one embodiment, when grown in a rice and pea protein concentrate medium the oyster fungi (*Pleurotus ostreatus*) can convey a strong savory aroma that leaves after a few seconds at which point a mushroom flavor is noticeable. In one embodiment, the strains convey a savory meaty aroma and/or umami, savory or meaty flavor and/or taste. *L. edodes* and *A. blazeii* in some embodiments are effective at deflavoring with shorter culturing times, such as 1.5-8 days, depending on whether the culture is in a shake flask or bioreactor. *L. edodes* is particularly good for the deflavoring of pea and rice protein concentrate mixtures.

The present invention discloses production of a food composition comprising the myceliated food product made by any of the methods of as disclosed herein, which is then used to mix with other edible components to provide the food compositions as disclosed herein. Alternatively, the invention comprises a food composition for human consumption, comprising a myceliated high-protein food product, myceliated high-protein food product, wherein the myceliated high-protein food product is at least 50% (w/w) protein on a dry weight basis, wherein the myceliated high-protein product is myceliated by an aqueous fungal culture, in a media comprising at least 50 g/L protein in liquid culture; and an edible material. A myceliated high protein food product of the present invention is also referred to herein as PURETASTE™ protein, PT, PTP, and the like.

The present invention also comprises a food composition comprising a mixture of a myceliated high-protein food product as defined herein and an edible material. The food composition can comprise, consist of, or consist essentially of at least 10%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%, protein.

"Myceliated" as used herein, means a high-protein material as defined herein having been cultured with live fungi as defined herein and achieved at least a 1%, at least 2%, at least 3%, at least 4%, at least a 5%, at least a 10%, at least a 20%, at least a 30%, at least a 40%, at least a 50%, at least a 60%, at least a 70%, at least a 80%, at least a 90%, at least a 100%, at least a 120%, at least a 140%, at least a 160%, at least a 180%, at least a 200%, at least a 250%, at least a 300%, at least a 400%, at least a 500% increase in biomass or more, to result in a myceliated high-protein food product. Alternatively, "myceliated" may refer to the distribution of a previously-grown biomass from a filamentous fungus as disclosed herein through the high-protein material.

In some embodiments, the high-protein material is a protein concentrate or a protein isolate, which may be obtained from vegetarian or nonvegetarian source as defined herein, including pea, rice, chickpea, or combinations thereof. In some embodiments, the myceliated high-protein food product can be myceliated by a fungal culture as defined herein. In some embodiments, the myceliated high-protein food product can have enhanced meaty, savory, umami, popcorn, and/or mushroom flavors, aromas and/or tastes as compared to the high-protein material. In other embodiments, the myceliated high-protein food product has decreased flavors, tastes and/or aromas (deflavoring) leading to a milder and/or an improved flavor, taste or aroma. In one embodiment reduced bitterness, astringency and/or beany, grassy or weedy tastes are observed.

The following examples further illustrate the invention but, of course, should not be construed as in any way limiting its scope.

Example 1

Eighteen (18) 1 L baffled DeLong Erlenmeyer flasks were filled with 0.400 L of a medium consisting of 25 g/L organic pea protein concentrate (labeled as 80% protein), 25 g/L organic rice protein concentrate (labeled as 80% protein), 4 g/L organic dry malt extract, 2 g/L diammonium phosphate, 1 g/L organic carrot powder and 0.4 g/L magnesium sulfate heptahydrate in RO water. The flasks were covered with a stainless steel cap and sterilized in an autoclave on a liquid cycle that held the flasks at 120-121° C. for 90 minutes. The flasks were carefully transferred to a clean HEPA laminar flowhood where they cooled for 18 hours. Sixteen (16) flasks were subsequently inoculated with 2 $cm^2$ pieces of mature Petri plate cultures of *P. ostreatus, P. eryngii, L. nuda, H. erinaceus, L. edodes, A. blazeii, L. sulfureus* and *B. edulis*, each strain done in duplicate from the same plate. All 18 flasks were placed on a shaker table at 150 rpm with a swing radius of 1" at room temperature. All samples showed reduced pea and reduced rice aroma and flavor, as well as less "beany" type aromas/flavors.

Example 2

Three (3) 4 L Erlenmeyer flasks were filled with 1.5 L of a medium consisting of 5 g/L pea protein concentrate (labeled as 80% protein), 5 g/L rice protein concentrate (labeled as 80% protein), 3 g/L malt extract and 1 g/L carrot powder. The flasks were wrapped with a sterilizable biowrap which was wrapped with autoclave tape 5-6 times (the taped biowrap should be easily taken off and put back on the flask without losing shape) and sterilized in an autoclave that held the flasks at 120–121° C. for 90 minutes. The flasks were carefully transferred to a clean HEPA laminar flowhood where they cooled for 18 hours. Each flask was subsequently inoculated with pieces of P1 Petri plate cultures of *L. edodes* and placed on a shaker table at 120 rpm at 26° C. After 7-15 days, the inventors noticed, by using a pH probe on 20 mL culture aliquots, that the pH of every culture had dropped nearly 2 points since inoculation. *L. edodes* is known to produce various organic acids on or close to the order of g/L and the expression of these acids are likely what dropped the pH in these cultures. A microscope check was done to ensure the presence of mycelium and the culture was plated on LB media to ascertain the extent of any bacterial contamination. While this culture could have been used as a food product with further processing (pasteurization and optionally drying), the inventors typically use such cultures as inoculant for bioreactor cultures of media prepared as disclosed according to the methods of the present invention.

Example 3

A 7 L bioreactor was filled with 4.5 L of a medium consisting of 5 g/L pea protein concentrate (labeled as 80% protein), 5 g/L rice protein concentrate (labeled as 80% protein), 3 g/L malt extract and 1 g/L carrot powder. Any open port on the bioreactor was wrapped with tinfoil and sterilized in an autoclave that held the bioreactor at 120-121° C. for 2 hours. The bioreactor was carefully transferred to a clean bench in a cleanroom, setup and cooled for 18 hours. The bioreactor was inoculated with 200-500 mL of inoculant as prepared in Example 2. The bioreactor was held at 26° C. A kick-in/kick-out anti-foam system was setup and it was estimated that ~1.5 g/L anti-foam was added during the process. At ~3-4 days the inventors observed the flask culture. A microscope check was done to ensure the presence of mycelium (mycelial pellets were visible by the naked eye) and the culture was plated on LB media to ascertain the extent of any bacterial contamination and none was observed. While this culture could have been used as a food product with further processing (pasteurization and optionally drying), the inventors typically use such cultures as inoculant for bioreactor cultures of media prepared as disclosed according to the methods of the present invention.

Example 4

A 250 L bioreactor was filled with 150 L of a medium consisting of 45 g/L pea protein concentrate (labeled as 80% protein), 45 g/L rice protein concentrate (labeled as 80% protein), 1 g/L carrot powder, 1.8 g/L diammonium phosphate, 0.7 g/L magnesium sulfate heptahydrate, 1 g/L anti-foam and 1.5 g/L citric acid and sterilized in place by methods known in the art, being held at 120-121° C. for 100 minutes. The bioreactor was inoculated with 5 L of inoculant from two bioreactors as prepared in Example 3. The bioreactor was held at 26° C. The culture was harvested in 4 days upon successful visible (mycelial pellets) and microscope checks. The culture was plated on LB media to ascertain the extent of any bacterial contamination and none was observed. The culture was then pasteurized at 82° C. for 30 minutes with a ramp up time of 30 minutes and a cool down time of 45 minutes to 17° C. The culture was finally spray dried and tasted. The final product was noted to have a mild aroma with no perceptible taste at concentrations up to 10%. The product was ~75% protein on a dry weight basis.

Example 5

A 250 L bioreactor was filled with 150 L of a medium consisting of 45 g/L pea protein concentrate (labeled as 80% protein), 45 g/L rice protein concentrate (labeled as 80% protein), 1 g/L carrot powder, 1.8 g/L diammonium phosphate, 0.7 g/L magnesium sulfate heptahydrate, 1 g/L anti-foam and 1.5 g/L citric acid and sterilized in place by methods known in the art, being held at 120-121° C. for 100 minutes. The bioreactor was inoculated with 5 L of inoculant from two bioreactors as prepared in Example 3. The bioreactor was held at 26° C. The culture was harvested in 2 days upon successful visible (mycelial pellets) and microscope checks. The culture was plated on LB media to ascertain the extent of any bacterial contamination and none was observed. The culture was then pasteurized at 82° C. for 30 minutes with a ramp up time of 30 minutes and a cool down time of 90 minutes to 10° C. The culture was finally concentrated to 20% solids, spray dried and tasted. The final product was noted to have a mild aroma with no perceptible taste at concentrations up to 10%. The product was ~75% protein on a dry weight basis.

The amount of lactic acid in the final product (Product Batch 1 and 2 are from to different fermentation runs) were as follows, as shown in Table 1:

TABLE 1

| Product Batch | Lactic Acid (g/L) |
|---|---|
| 1 | 0.13 |
| 2 | 0.14 |

Example 6

Eight (8) 1 L baffled DeLong Erlenmeyer flasks were filled with 0.4 L of media consisting of 45 g/L pea protein concentrate (labeled as 80% protein), 45 g/L rice protein concentrate (labeled as 80% protein), 1 g/L carrot powder, 1 g/L malt extract, 1.8 g/L diammonium phosphate and 0.7 g/L magnesium sulfate heptahydrate and sterilized in an autoclave being held at 120–121° C. for 90 minutes. The flasks were then carefully placed into a laminar flowhood and cooled for 18 hours. Each flask was inoculated with 240 mL of culture as prepared Example 2 except the strains used were G. lucidum, C. sinensis, I. obliquus and H. erinaceus, with two flasks per species. The flasks were shaken at 26° C. at 120 RPM for 8-15 days, at which point they were pasteurized as according to the parameters discussed in Example 5, desiccated, pestled and tasted. The G. lucidum product contained a typical 'reishi' aroma, which most of the tasters found pleasant. The other samples were deemed pleasant as well but had more typical mushroom aromas.

As compared to the control, the pasteurized, dried and powdered medium not subjected to sterilization or myceliation, the resulting myceliated food products was thought to be much less bitter and to have had a more mild, less beany aroma that was more cereal in character than beany by 5 tasters. The sterilized but not myceliated product was thought to have less bitterness than the non-sterilized control but still had a strong beany aroma. The preference was for the myceliated food product.

Example 7

Fermentation Operation in 4,000 L Bioreactor using Continuous Sterilizer

A 4,000 L bioreactor was filled with 2,500 L of a sterilized medium similar to Example 4, consisting of 45 g/L pea protein concentrate (labeled as 80% protein), 45 g/L rice protein concentrate (labeled as 80% protein), 3.6 g/l maltodextrin, 1.8 g/L carrot powder, 1.8 g/L diammonium phosphate, 0.7 g/L magnesium sulfate heptahydrate, 1.5 g/L anti-foam and 0.6 g/L citric acid. Seed reactor was also prepared in 200 L bioreactor with medium volume of 100 L with the following medium components: pea protein 5 g/l, rice protein 5 g/l, maltodextrin 3.0 g/l, carrot powder 1 g/l, malt extract 3 g/l and 1.25 g/l of anti-foam. The medium was inoculated with flask process developed the same way as shown in Example 2. The 200 L bioreactor was harvested 40 to 70 hours post-inoculation. The flasks were harvested 11 days post-inoculation. The organism was Lentinula edodes sourced from the Penn State mushroom culture collection.

Once the main fermenter was cooled it was inoculated with the 100 L inoculum from the 200 L fermenter. Fermenter was held at 26° C. The culture in the 4,000 L vessel was harvested at 48 hours post-inoculation upon successful visible (mycelial pellets) and microscope checks. Material was pasteurized in the bioreactor at 65° C. for 60 minutes. Fermenter was then cooled down and material was harvested in sanitized 55 gallon drums and sent to spray drying facility.

Example 8

Sensory Data

Eight protein powders were tested: (a) raw material (3.2 pea); (b) raw material (pea); (c) raw material (rice); (d) raw material (rice); (e) myceliated material 3; (f) myceliated material 4; (g) myceliated material 4.2; and (h) myceliated material 3.2. Each protein powder was tested at 7% in water. Trained descriptive panelists used a consensus descriptive analysis technique to develop the language, ballot and rate profiles of the protein powders. The aroma language was as follows:

The raw pea product prior to myceliation has a pea aroma with no rice or mushroom aroma. The rice samples prior to myceliation have rice aroma with no pea or mushroom aroma. After myceliation, these samples have mushroom aroma and no pea or rice aroma, respectively. There is also increased umami flavor in the myceliated samples.

Example 9

Eight (8) 1 L baffled DeLong Erlenmeyer flasks were filled with 0.500 L of the following 8 different media, after the manner of Example 1, see Table 2:

TABLE 2

| Component | Medium 1 | Medium 2 | Medium 3 | Medium 4 | Medium 5 | Medium 6 | Medium 7 | Medium 8 |
|---|---|---|---|---|---|---|---|---|
| Pea protein 1 (g/L) | 54 | 54 | 49.5 | 54 | 54 | 54 | 0 | 54 |
| Chickpea powder (g/L) | 36 | 36 | 22.5 | 36 | 36 | 36 | 36 | 36 |
| Rice protein (g/L) | 0 | 0 | 18 | 0 | 0 | 0 | 0 | 0 |
| Magnesium sulfate (g/L) | 0.72 | 0.72 | 0.72 | 0.72 | 0.72 | 0.72 | 0.72 | 0.72 |
| Diammonium phosphate (g/L) | 1.8 | 1.8 | 1.8 | 1.8 | 1.8 | 1.8 | 1.8 | 1.8 |
| Citric acid (g/L) | 1.5 | 1.5 | 1.5 | 1.5 | 0.6 | 0.9 | 1.5 | 1.5 |
| Carrot powder (g/L) | 1.8 | 1.8 | 1.8 | 1.8 | 1.8 | 1.8 | 0 | 1.8 |
| Anti-foam 1 (g/L) (organic polymer based) | 1.25 | 0 | 1.25 | 1.25 | 1.25 | 1.25 | 1.25 | 1.25 |
| Pea protein 2 (g/L) | 0 | 0.1 | 0 | 0 | 0 | 0 | 54 | 0 |
| Anti-foam 2 (g/L) (silicone based) | 0 | 0.1 | 0 | 0 | 0 | 0 | 0 | 0 |
| Vegetable juice (mL/L) | 0 | 0 | 0 | 0 | 0 | 0 | 5 | 0 |

The flasks were covered with a stainless-steel cap and steam sterilized. The flasks were carefully transferred to a clean HEPA laminar flow hood where they cooled for 4 hours and each were inoculated with 5% of 10-day old submerged *Lentinula edodes*. All 8 flasks were placed on a shaker table at 150 rpm with a swing radius of 1" at room temperature and allowed to incubate for 3 days. Plating aliquots of each sample on LB and petri film showed no contamination in any flask. The pH changes during processing is essentially the same (within the margin of error of the pH meter).

Top performing recipes in sensory from these 8 media were media 5 and 7. Bitterness and sourness were evaluated and these two media showed the best results, although all media exhibited reduced undesirable flavors and reduced aromas, such as reduced beany aroma, pea aroma, or rice aroma and reduced beany taste, pea taste, rice taste, and bitter taste. The sensory evaluation included 15 tasters, all tasting double-blind, randomized samples and providing a descriptive analysis. These recipes were further evaluated for strain screening work as described in Example 10.

Example 10

Eight (8) 1 L baffled DeLong Erlenmeyer flasks were filled with 0.500 L of medium consisting of the 2 best medium as described in example 11 (4 flasks for each medium). These two media were inoculated with four different species: *Lentinula edodes, Boletus edulis, Pleurotus salmoneostramineus* and *Morchella esculenta*. See Table 3.

TABLE 3

| Component | Medium 1 | Medium 2 |
| --- | --- | --- |
| Pea protein 1 (g/L) | 54 | 0 |
| Chickpea powder (g/L) | 36 | 36 |
| Magnesium sulfate (g/L) | 0.72 | 0.72 |
| Diammonium phosphate (g/L) | 1.8 | 1.8 |
| Citric Acid (g/L) | 0.6 | 1.5 |
| Carrot powder (g/L) | 1.8 | 1.8 |
| Pea protein 2 (g/L) | 0 | 54 |
| Anti-foam 2 (g/L) | 0.1 | 0.1 |

The flasks were covered with a stainless-steel cap and sterilized in an autoclave. The flasks were carefully transferred to a clean HEPA laminar flow hood where they cooled for 4 hours and inoculated with 5% of 10-day old submerged aliquots of each species. All 8 flasks were placed on a shaker table at 150 rpm with a swing radius of 1" at room temperature and incubated for 3 days at which point pH was measured and is essentially the same.

Plating aliquots of each sample on petri film showed no contamination in any flask. Bitterness and sourness were evaluated and these two media showed the best results, although all media exhibited such as reduced beany aroma, pea aroma, or rice aroma and reduced beany taste, pea taste, rice taste, and bitter taste. The results that were obtained showed that *Boletus edulis* performed better than other species for lower sourness and bitterness. *M. esculenta* did not perform well.

Example 11

A 7 L bioreactor was filled with 4.5 L of a medium consisting of the medium as described in following table (see Table 4):

TABLE 4

| Component | Medium 1 | Medium 2 | Medium 3 |
| --- | --- | --- | --- |
| Pea protein 1 (g/L) | 45 | 45 | 58.5 |
| Rice Protein (g/L) | 45 | 45 | 31.5 |
| Anti-foam 2 (g/L) | 1.25 | 1.25 | 1.25 |

In this experiment, excipients other than an anti-foam were omitted from the fermentation medium, and only rice protein, pea protein, and anti-foam were used as the medium. In previous examples, excipients such as magnesium sulfate, diammonium phosphate (which functions at least in part as a buffer), citric acid, carrot powder, were used and were omitted here. It was theorized that omission of these excipients will encourage the culture to convert protein metabolically and not proliferate. Open ports on the bioreactor were wrapped in foil and the vessel was subsequently sterilized in an autoclave. The bioreactors were carefully transferred to a clean bench in a cleanroom, setup and cooled for 4-6 hours. The bioreactor was inoculated with 5%, 10% and 7.5% of inoculant of *L. edodes* from a 12-day old flask. Fermentation for these batches was completed in 44 hours, 24 hours and 30 hours respectively for medium 1, medium 2 and medium 3. A microscope check was done to ensure the presence of mycelium (mycelial pellets were visible by the naked eye) and the culture was plated on LB media to ascertain the extent of any bacterial contamination and none was observed. These cultures were pasteurized for 60 minutes at 65° C.

Microscopic examination of these different inoculum and protein samples was done and it suggested growth even for medium 1 at 24 hours fermentation.

Bitterness and sourness were evaluated and all media exhibited reduced beany aroma, pea aroma, or rice aroma and reduced beany taste, pea taste, rice taste, and bitter taste.

Example 12

Vegan Protein Bites

The following materials are mixed and formed into a bar: PURETASTE protein (70% protein/100 g product; mixture of 65% pea protein and 35% rice protein, made by processes of the invention at Example 11) at 11.4 g; tapioca syrup, 21 g; sugar, granulated white; 3.6 g; honey, clover, 3.6 g; canola oil, 3 g; almond flour (6 g protein/28 g flour), 9 g; peanut butter (8 g protein/32 g), 3 g; vanilla extract, 0.6 g, and flavoring (Pomegranate), 0.09 g. PURETASTE is used at 20.8%. Using PURETASTE, beany and bitter off-flavors do not occur in the bar and the bar has good appearance, flavor, and mouth-feel.

Yogurt

The following materials are mixed: almond milk, 68.7%; cashew milk, 21.9%; coconut cream, 3.35%; PURETASTE (70% protein/100 g product; mixture of 65% pea protein and 35% rice protein), 4.75%; dextrose, 1.15%; locust bean gum, 0.05%; pectin, 0.05%; and cultures, 0.02%; and yogurt is produced using conventional processes. Using PURETASTE, beany and bitter off-flavors do not occur in the ice cream, and the bar has good appearance, flavor, and mouth-feel.

Ice Cream

The following materials are mixed: water, 45.475%; coconut cream (43.7% fat), 32.015%; sugar, 17%; PURETASTE (70% protein/100 g product; mixture of 65% pea protein and 35% rice protein), 4.5%; TIC GUMS Natural IC CL, 0.6%; sunflower lecithin, 0.2% and sea salt, 0.21%.

When tasted, the ice cream provided complete protein dairy alternative dessert that contains no vegetable off-notes from the protein source.

Example 13

Summary of Crisps and Scoops:

PureTaste® protein (PTP) (made as described in Example 11) were processed to form extruded crisps ranging in protein content with varying degrees of expansion, color and texture.

Compared to extruded soy crisps which had beany/chalky notes, PureTaste® protein crisps flavor ranged from light malted, toasted, grainy notes to very light earthy notes at elevated levels of PureTaste® protein. High-protein (62% Protein) PureTaste® protein extruded scoops produced were tan in color, toasted brown notes, latent slight earthy notes.

PureTaste® Crisps (PT Crisps)

Trials were conducted with Wenger X57 Twin Screw Extruder. 4 trials were conducted for production of PTP crisps as shown below:

Crisp: Control (Soy Protein Isolate 84.25%+Tapioca Starch 15%+Calcium carbonate 0.75%), protein content 76%. Density was 325 g/L, color was off-white, texture was crispy/crunchy, flavor was light soy notes.

Crisp: PTP (84.25%)+15% Tapioca Starch+0.75% Calcium Carbonate (protein content 63%). Density is 269 g/L, color is tan, texture was crispy/crunchy, flavor was toasted brown notes. PTP=PURETASTE protein, as made in Example 11.

Crisp: PTP (90%)+10% Tapioca Starch (protein content 68%). Density was 222 g/L, color was tan, texture was crispy/crunchy, flavor was toasted.

Crisp: PTP (85%)+5% Tapioca Starch+10% pea protein isolate (protein content 72%). Density was 261 g/L, color was dark tan, texture was crispy/crunchy, flavor was toasted.

Crisp: PTP (90%)+5% pea protein isolate+5% pea starch (protein content 72%). Density was 211 g/L, color was dark tan, texture was crispy/crunchy, flavor was toasted.

Crisp: PTP (70%)+30% Tapioca Starch. Protein content was 75%. Density was 262 g/L, color was dark tan, texture was crispy/crunchy, flavor was toasted.

Scoop: PTP (79.25%)+20% Tapioca Starch. Protein content was 60%. Density was 109 g/L, color was brown, texture was light, crunchy, flavor was toasted.

Scoop: PTP (85%)+5% Tapioca Starch+10% pea protein isolate. Protein content was 72%. There was only limited expansion, color was brown, texture was harder, crunchy, flavor was toasted.

Processing Conditions:

A. Raw material information. Dry recipe density 490-530 kg/m³; dry recipe rate 140-160 kg/hr; feeder speed 30-45 rpm; live bin weight 20-25 kg.

Preconditioner information. Small side speed 750-800 rpm; large side speed, 100-150 rpm; mixing intensity 70-90%; cylinder steam 0.05-0.2 kg/hr; cylinder water 40-50 kg/hr; cylinder discharge temp, 25-35° C.

Extruder information. Extruder speed, 300-500 rpm. The zone 1 temp was 50-70° C. (SP) and 50-70° C. (PV), zone 2 temp was 90-110° C. (SP) and 90-110° C. (PV); zone 3 temp was 110-130° C. (SP) and 110-130° C. (PV); zone 4 temp was 110-130° C. (SP) and 110-130° C. (PV); zone 5 temp was 80-100° C. (SP). The die pressure was 1500-2500 kPA.

Dryer information: zone 1 temperature 140-160° C.; zone 2 temperature, 60-85° C., zone 3 temperature, 70-90° C.; retention time, Pass 1, 8-15 minutes; Retention time, Pass 2, 8-15 minutes, exhaust 1 temperature 110-130° C.; exhaust 2 temperature 70-85° C.

Final product information. Extruder discharge density 200-270 kg/m³; moisture content 3%.

Results: Successfully produced PTP crisps & scoops with lighter density than control, varying in color content, malted, toasted notes with very light latent after notes. PTP Crisps ranged in protein content. Scoops protein content was about 62%. At 72% protein level the scoops had limited expansion.

Example 14

Summary of Texturized Protein

PureTaste® protein (PT) in combination with starch, wheat gluten, pea protein and mineral salts can be processed to produce texturized vegetable protein with final protein content ranging from 60% to 77%, with varying degrees of expansion volume, color and flavor. Flavor was acceptable with malted, grainy and latent bitter notes. Successfully produced texturized PT protein with good to medium hydration capability, soft and harder texture.

Using Wenger X57 Twin Screw extruder; PureTaste Protein used was a 65% pea protein concentrate, 35% rice protein concentrate blend. (PT) in combination with starch, wheat gluten, pea protein and mineral salts can be processed to produce texturized vegetable protein with final protein content ranging from 60% to 77%, with varying degrees of expansion volume, color and flavor. Flavor was acceptable with malted, grainy and latent bitter notes. The texturized PT protein had good to medium hydration capability, soft and harder texture. Procedure used a modified extruder setting, with the addition of a 10-inch spacer or a 12-inch spacer with a Teflon nozzle (Venturi system) additional barrel coated on the inside with Teflon, followed by a narrow exit through a Teflon coated die. This set up provided successful texturization.

Test 1. Fine flours of PureTaste® protein, 60%, vital wheat gluten 20%, tapioca starch 20%, were mixed with water to result in 25 to 30% water content. Density was 200 kg/m³. After extrusion, the texturized pieces were in chunk form. The extruded material was a white/tan color and was crunchy when dried. When rehydrated, the extruded material had acceptable chewable characteristics, and was softer (not as chewable) compared to a control prepared with soy and had a clean, non-beany flavor and aroma.

Test 2: Fine flours of pea protein, 100%. Density was 98 kg/m³. After extrusion, the texturized pieces were in chunk form. The extruded material was a medium tan color and was crunchy when dried. When rehydrated, the extruded material was as chewy compared to a control prepared with soy and had a light pea flavor.

Test 3: Fine flours of pea protein isolate, 100%. Density was 141 kg/m³. After extrusion, the texturized pieces were in chunk form. The extruded material was a medium tan color and was crunchy when dried. When rehydrated, the extruded material was as chewy compared to a control prepared with soy and had a light pea flavor.

Test 4: Fine flours of pea flour, 100%. Density was 113 kg/m³. After extrusion, the texturized pieces were in chunk form. The extruded material was a medium tan color and was crunchy when dried. When rehydrated, the extruded material was as chewy compared to a control prepared with soy and had a light pea flavor.

Test 5: Fine flours of PureTaste® protein, 100%. Density was heavy. After extrusion, the texturized pieces were in crumble form. The extruded material was a medium tan color and had a clean flavor.

Test 6, Fine flours of PureTaste® protein, 50% and pea protein isolate 50% were mixed with water to result in 30% water content. Density was 280 kg/m³. Following extrusion, the texturized pieces were in shreds form. The extruded material was a light to medium tan color and was crunchy when dried. When rehydrated, the extruded material had acceptable chewable characteristics, and was softer (not as firm) compared to a control prepared with soy and has a clean, non-beany flavor and aroma.

Test 7. PureTaste® protein 50%, vital wheat gluten 50%, results in density of 313 kg/m³, protein content of 75%, consistency of chunks. When rehydrated, the extruded material had acceptable chewable characteristics, and was almost identical in chewiness and firmness compared to a control prepared with soy (but softer) and has a clean, non-beany flavor and aroma.

Test 8. PureTaste® protein 50%, vital wheat gluten 40%, tapioca starch 10%, results in density of 204 kg/m³, protein content of 68%, consistency of chunks. When rehydrated, the extruded material had acceptable chewable characteristics, and was almost identical in chewiness and firmness compared to a control prepared with soy (but softer) and has a clean, non-beany flavor and aroma.

Test 9. PureTaste® protein 60%, vital wheat gluten 20%, tapioca starch 20%, results in density of 177 kg/m³, protein content of 60%, consistency of chunks. When rehydrated, the extruded material had acceptable chewable characteristics, and was almost identical in chewiness and firmness compared to a control prepared with soy (but softer) and has a clean, non-beany flavor and aroma.

Test 10. PureTaste® protein 50%, vital wheat gluten 35%, tapioca starch 15%, results in density of 179 kg/m³, protein content of 64%, consistency of chunks. When rehydrated, the extruded material had acceptable chewable characteristics, and was almost identical in chewiness and firmness compared to a control prepared with soy (but softer) and has a clean, non-beany flavor and aroma.

Test 11. PureTaste® protein 25%, pea protein isolate, results in density of 132 kg/m³, protein content of 79%, consistency of chunks. When rehydrated, the extruded material had acceptable chewable characteristics, and was almost identical in chewiness and firmness compared to a control prepared with soy (but softer) and has a clean, non-beany flavor and aroma.

Test 12. PureTaste® protein 50%, pea protein 20%, vital wheat gluten 20%, pea starch 8.5% (along with 1% calcium chloride, 0.2% sodium metabisulfite and 0.3% trisodium phosphate) had a density of 215 kg/m³ and a protein content of 69%. When rehydrated, the extruded material had acceptable chewable characteristics, and was almost identical in chewiness and firmness compared to a control prepared with soy (but softer) and has a clean, non-beany flavor and aroma.

Test 13. PureTaste® protein 60%, vital wheat gluten 20%, tapioca starch 20% had a density of 200 kg/m³, and a protein content of 60%. When rehydrated, the extruded material had acceptable chewable characteristics, and was almost identical in chewiness and firmness compared to a control prepared with soy (but softer) and has a clean, non-beany flavor and aroma.

Test 14. PureTaste® protein 25.75%, vital wheat gluten 33%, tapioca starch 5%, pea protein 15%, pea fiber 20%, with trisodium phosphate 0.5%, results in material that when rehydrated, the extruded material had acceptable chewable characteristics, and was almost identical in chewiness and firmness compared to a control prepared with soy (but softer) and had a clean, non-beany flavor and aroma.

Test 15. PureTaste® protein 32.92%, vital wheat gluten 16.46%, tapioca starch 19.75%, pea protein 29.62%, with trisodium phosphate 0.5%, results in material that when rehydrated, the extruded material had acceptable chewable characteristics, and was almost identical in chewiness and firmness compared to a control prepared with soy (but softer) and had a clean, non-beany flavor and aroma.

Processing Conditions:

A. Raw material information. Dry recipe density 550-600 kg/m³; dry recipe rate 90-110 kg/hr; feeder speed 20-25 rpm; live bin weight 20-35 kg.

Preconditioner information. Small side speed 150-800 rpm; large side speed, 100-130 rpm; mixing intensity 70-90%; cylinder steam 1.8-2.5 kg/hr; cylinder water 25-35 kg/hr; cylinder discharge temp, 40-50° C.

Extruder information. Extruder speed, 300-700 rpm; The zone 1 temp was 50-70° C. (SP) and 50-70° C. (PV), zone 2 temp was 90-110° C. (SP) and 90-110° C. (PV); zone 3 temp was 120-140° C. (SP) and 120-130° C. (PV); zone 4 temp was 125-135° C. (SP) and 115-135° C. (PV); zone 5 temp was 80-100° C. (SP). The die pressure was 2000-2300 kPA.

Dryer information: zone 1 temperature 120-130° C.; zone 2 temperature, 80-100° C., zone 3 temperature, 80-100° C.; retention time, Pass 1, 8-12 minutes; Retention time, Pass 2, 7-10 minutes, exhaust 1 temperature 100-130° C.; exhaust 2 temperature 80-100° C.

Results: Successfully Produced PTP Texturized Protein.

Other tests resulted in crumbles or chunks that disintegrated in water upon rehydration. This includes formulations (a) 50% PTP, 25% VWG, 5% pea fiber, 8.5% pea starch, 10% pea protein 55%, (along with 1% calcium chloride, 0.2% sodium metabisulfite and 0.3% trisodium phosphate); (b) 75% PTP, 10% tapioca starch, 13.5 pea protein 55%, (1% calcium chloride, 0.2% sodium metabisulfite and 0.3% trisodium phosphate); (c) 55% PTP, 20% VWG, 5% tapioca starch, 19.7% pea protein 55% protein with only trisodium phosphate; (d) 78.5% PTP, 10% tapioca starch, 10% pea protein 80%, (along with 1% calcium chloride, 0.2% sodium metabisulfite and 0.3% trisodium phosphate); (e) 60% PTP, 20% VWG, 8.5% pea starch, 10% pea protein 55% (along with 1% calcium chloride, 0.2% sodium metabisulfite and 0.3% trisodium phosphate); (f) 75% PTP, 10% VWG, 5% tapioca starch, 8.5% pea protein 55% (along with 1% calcium chloride, 0.2% sodium metabisulfite and 0.3% trisodium phosphate); (g) 60% PTP, 8.5% tapioca starch, 30% pea protein 80%, (along with 1% calcium chloride, 0.2% sodium metabisulfite and 0.3% trisodium phosphate); (h) 60% PTP, 30% VWG, 10% tapioca starch, no additional excipients; (i) 60% PTP, 20% tapioca starch, 20% AGT protein 56; no additional excipients (j) 60% PTP; 25% VWG, 15% pea protein 55%, no additional excipients.

Example 15

Texturized protein with pea fiber. 50-45-5. PureTaste® protein 50%, pea protein isolate 45%, pea fiber 5%, results in material that when rehydrated, the extruded material had acceptable chewable characteristics, and was almost identical in chewiness and firmness compared to a control prepared with soy (but softer) and had a clean, non-beany flavor and aroma. Product dimensions were length, 12.0-16.0 mm, width 5.0 to 6.0 mm, and thickness 3.0 to 5.0 mm, with granulation of 7/16" or 0.438" or 11.12 mm>10%; 3/4" or 0.25 in or 6.35 mm 30-50%; and 6 mesh or 0.132" or 3.35 mm 50% to 30% of total.

Texturized protein with pea fiber. 70-25-5. PureTaste® protein 70%, pea protein isolate 25%, pea fiber 5%, results in material that when rehydrated, the extruded material had acceptable chewable characteristics, and was almost identical in chewiness and firmness compared to a control prepared with soy (but softer) and had a clean, non-beany flavor and aroma. Product dimensions were length, 12.0-16.0 mm, width 5.0 to 6.0 mm, and thickness 3.0 to 5.0 mm, with granulation of 7/16" or 0.438" or 11.12 mm>10%; 3/4" or 0.25 in or 6.35 mm 30-50%; and 6 mesh or 0.132" or 3.35 mm 50% to 30% of total.

Processing Conditions:

A. Flour mix feed rate 13 lbs at 17 lbs/min; preconditioner, water addition in the range of 2.0 to 4.0 lbs/min; steam incorporation at 0.4 lb to 0.6 lbs/min; extruder; water addition ranged from 0.75 lbs to 1.0 lbs/min, extruder RPM is 350 to 400 rpm; extruder temperatures: zone 1, 155° F. to 165° F.; zone 2, 265° F. to 280° F.; zone 3, 285° F. to 295° F.; zone 4, 280° F. to 300° F.; pressures in the range of 800 to 1000 psi, dryer temperatures 250° F., 110° F.; product density 0.12 to 0.22 gm/cc; product moisture 5% to 7%.

Results: Successfully produced PTP texturized protein. Improved texturization with pea fiber achieved.

Properties of PureTaste™ Texturized Protein.

Compared with texturized protein using pea protein only. PureTaste™ texturized protein (both formulations with pea fiber), by sensory testing, have a harder bite, more spring, resists becoming a paste upon compression. The flavor is less pea and less earthy. PureTaste™ texturized protein, compared with soy texturized protein. PureTaste™ texturized protein (both formulations with pea fiber), by sensory testing, have more spring and the particle size is larger; increased savory flavor and less sweet flavor, and had similar water adsorption. See Table 5 and 6.

TABLE 5

| Attributes: | | | | | |
|---|---|---|---|---|---|
| Attribute | Definition | Soy | Pea | 50% PTP | 70% PTP |
| Springiness | The degree and rate to which the sample returns to its original shape. | 7 | 7 | 9 | 10.5 |
| Hardness | The force required to obtain deformation. | 5.5 | 6 | 7 | 9.5 |
| Cohesiveness | The amount of sample that deforms rather than shears/cuts. | 9.5 | 8 | 8 | 8 |
| Moisture Release (Juiciness) | The amount of moisture (juice/oil/water) perceived in the mouth. | 4.5 | 2 | 5 | 4 |
| Moisture of Mass | The innate moisture of a sample before it has been altered. | 5 | 5 | 4 | 4.5 |
| Density | The compactness of the sample cross section | 10 | 10 | 10 | 11 |
| Cohesiveness of Mass | The degree to which a chewed sample holds together in a mass. | 6 | 7 | 7 | 7.5 |

TABLE 5-continued

| Attributes: | | | | | |
|---|---|---|---|---|---|
| Attribute | Definition | Soy | Pea | 50% PTP | 70% PTP |
| Toothpack | The amount of product adhering to the teeth after mastication of the sample. | 5.5 | 6 | 4 | 5 |

Flavor attributes. Compared with soy texturized protein and pea texturized protein, the flavors of the formulations in this Example had an improvement over pea texturized protein in that both formulations lacked a beany flavor (less pea flavor) and had increased cereal and malty notes, and less metallic and chalky flavor notes. Bitterness for the PureTaste was reduced compared to pea texturized protein.

TABLE 6

| Texturized Protein Water Adsorption Study: | | | | |
|---|---|---|---|---|
| | Time to full hydration (min) | Weight at full hydration (g)* | Initial water required for hydration (ml) | Volume of water adsorbed (ml) | Ratio of water adsorbed to water input (vol. of adsorption/initial water) |
| Soy Texturized Protein | 10 | 72 | 85 | 55 | 0.65 |
| Pea Texturized Protein | 25 | 87 | 90 | 68 | 0.76 |
| PureTaste 725 | 25 | 59 | 100 | 42 | 0.42 |
| PureTaste 545 | 15 | 76 | 220 | 57 | 0.26 |

Example 16

Meat analog patty. Using the successful PT texturized protein materials made in Example 15, a meat analogue patty was made. The ingredients in wt percent were PureTaste texturized protein 10.42%, PureTaste Protein 6.01%, Pea Protein texturized protein 8.42%, Vital Wheat Gluten 7.62%, Methylcellulose 2.00%, Beef Flavor 2.20%, Grill Flavor, 2.61%, Chicken Flavor 1.80%, Beet Powder 0.70%, Unrefined Coconut Oil 2.00%, brown flavor 0.1%, water 56.11%. After grilling the patty, the tasters agreed that the patty had good flavor and texture.

Meat extender patty. Using the successful PT texturized protein materials made in Example 14, a meat extender patty was made. The ingredients in wt percent were PureTaste texturized protein 3.27%, PureTaste Protein 2.84%, Pea Protein texturized protein 2.98%, Vital Wheat Gluten 1.99%, Methylcellulose 0.71%, Beef Flavor 1.85%, Beet Powder 0.28%, water 11.08%, and ground beef 80:20 (protein:fat), 75%. After grilling the patty, the tasters agreed that the patty had good flavor and texture.

Meat extender patty. Using the successful PT texturized protein materials made in Example 14, to a beef mixture, PT texturized protein was added at amounts up to 2% and water was increased up to 7% over the control's 8.5%. Compared with control, the additional moisture was held in the product, indicating a cost savings obtained with PT texturized protein. Taste changes compared with a pure beef patty were very small.

Pork meatballs and pork sausage patty. PT was added as a meat extender to a pork meatball and pork sausage at 1.5%, 2.5%, and 5%. A control had soy added at 1.5%. The overall taste was enhanced relative to control with 5% being the best taste. PureTaste was able to hold increased amounts of water relative to control (with the product more juicy and lowering cost, with the product less dense and more desirable.) The control had 14% moisture and it was increased to 16% using PURETASTE protein.

Meatless meatballs. PT texturized protein (Example 15; 5-45-5 formulation) was added as the main ingredient to a vegetarian meatball (other than water for rehydration). The other ingredients included PureTaste™ protein powder, canola oil, coconut oil, contains less than 2% each of the following: rice, methylcellulose, natural flavors, beet powder, yeast extract, sea salt, modified food starch, garlic powder, onion powder, black pepper, beta carotene.

Meatless tacos. PT texturized protein (Example 15; 5-45-5 formulation) was added as the main ingredient to a vegetarian meatball (other than water for rehydration). The other ingredients included canola oil, vital wheat gluten, methylcellulose, coconut oil, natural flavors, spices (paprika, salt, chili pepper, oregano, corn starch, dried onion, dried garlic).

High fat meat analog. Ingredients: water for hydration, PT texturized protein (made per Example 14), coconut fat, coconut oil, flavors, methylcellulose, 2% or less of spices, beet powder, salt. 24 g protein per serving, 18 g fat per serving, 2 g carbohydrate per serving.

Beef frankfurter. Using the successful PT texturized protein materials made in Example 14, a beef frankfurter is made. The ingredients in wt percent were beef trim (10% fat) at 26%, pork trim fat at 20%, PureTaste texturized protein 4.0%, PureTaste Protein 5.0%, salt at 2.0%, phosphate 0.4%, sodium nitrate at 0.1% (140 ppm), sodium ascorbate at 0.4%, dextrose at 1.0%, corn syrup solids at 2.0%, sodium lactate at 3.0%, flavors and spices at 0.1%, and water 36%. Upon grilling the frankfurter, the tasters agree that the frankfurter has good flavor and texture.

Pork sausage. Using the PT texturized protein materials made in Example 14, a pork sausage is made. The ingredients in wt percent were pork 85% lean at 70%, PureTaste texturized protein 10.0%, PureTaste Protein 7.5%, water at 10%, and seasoning at 2.5%. Upon cooking the sausage, the tasters agree that the sausage has good flavor and texture.

Although the examples above show the use of twin-screw extruder, it should be understood that extrusion processes are very diverse and manufacturing of extruded compositions as disclosed herein containing product can be prepared via use of any acceptable model of type food processing extruder, both with single screw or with twin screw types.

Example 17

Non-dairy, beverage, bakery, and pasta. All materials made from PureTaste™ powder made as disclosed in Example 11.

Red lentil high protein, gluten free pasta. 20 g protein per serving. Ingredients: eggs, PureTaste™ powder, red lentil flour. Pasta mixture was hydrated and formed into pasta using art methods for making pasta.

Red lentil and garbanzo high protein, gluten free pasta. 20 g protein per serving. Ingredients: eggs, PureTaste™ powder, garbanzo bean flour, red lentil flour. Pasta mixture was hydrated and formed into pasta using art methods for making pasta.

Red lentil high protein, gluten free pasta. 15 g protein per serving. Ingredients: red lentil flour, eggs, PureTaste™ powder, olive oil. Pasta mixture was hydrated and formed into pasta using art methods for making pasta.

Semolina high protein pasta. 10 g protein per serving. Ingredients: Enriched durum flour (Durum wheat, iron, niacin, thiamine, riboflavin, folic acid), eggs, PureTaste™ powder, olive oil. Pasta mixture was hydrated and formed into pasta using art methods for making pasta.

Pancakes. 5 g protein per serving. Skim milk, enriched bleached wheat flour (flour, niacin, iron thiamine mononitrate, riboflavin, enzymes, folic acid), PureTaste™ powder, eggs, butter (sweet cream, natural flavoring), baking powder, sugar, vanilla extract, salt. Pancakes were made by art methods using the above ingredients.

Low salt crackers. 2 g protein per serving. Enriched bleached wheat flour (flour, niacin, iron, thiamine mononitrate, riboflavin, enzymes, folic acid), water, PureTaste™ protein, canola oil, sugar, baking powder, baking soda, salt. Crackers were made by art methods using the above ingredients.

Vegan protein muffins. 7 g protein per serving. Almond milk, enriched bleached wheat flour (flour, niacin, iron, thiamine mononitrate, riboflavin, enzymes, folic acid), sugar, PureTaste™ protein, canola oil, less than 2% of the following: baking powder, apple cider vinegar, cellulose and xanthan gums, vanilla extract, cinnamon, salt, nutmeg. Muffins were made by art methods using the above ingredients.

High protein muffins. 7 g protein per serving. Egg whites, cane sugar, flour (bleached wheat flour, malted barley flour, niacin, iron, thiamine mononitrate, riboflavin, enzymes, folic acid), dark chocolate morsels (unsweetened chocolate, cane sugar), eggs, PureTaste™ protein, canola oil, vanilla extract, vital wheat gluten, nonfat dry milk, baking powder, sunflower lecithin, salt, xanthan gum. Muffins were made by art methods using the above ingredients.

High protein donuts. 19 g protein per serving. Sugar, flour (bleached wheat flour, malted barley flour, niacin, iron, thiamine mononitrate, riboflavin, enzymes, folic acid), PureTaste™ protein powder, unsweetened almond milk (water, almonds), eggs, unsalted butter, vegetable oil, contains 2% or less of: vanilla extract, baking powder, salt, baking soda, nutmeg. Donuts were made by art methods using the above ingredients.

High protein bread. 10 g protein per serving. Bread flour (unbleached hard red wheat flour, malted barley flour), water, PureTaste™ protein, cane sugar, nonfat dry milk, salt, vegetable shortening (soybean oil, fully hydrogenated palm oil, palm oil, mono and diglycerides, TBHQ and citric acid), yeast (yeast, sorbitan monostearate, ascorbic acid), wheat gluten, cellulose gum, xanthan gum. Bread was made by art methods using the above ingredients.

Vegan gluten-free brownies. 10 g protein per serving. Almondmilk, PureTaste™ protein, sugar, applesauce, margarine (vegetable oil blend [palm, canola and olive oils], water, annatto extract, lactic acid, natural flavor, pea protein, sunflower lecithin), cocoa powder, gluten free powder (garbanzo bean flour, potato starch, tapioca flour, white sorghum flour, fava bean flour), chocolate morsels (sugar, chocolate, cocoa butter), peanut butter, less than 2% of the following: baking powder, cellulose and xanthan gums, vanilla extract, cinnamon. Brownies were made by art methods using the above ingredients.

Vegan drinkable yogurt. 6 g protein per serving. Water, oat base (water, rolled oats), PureTaste™ powder dextrose, sunflower lecithin, locust bean gum, pectin, live and active cultures. Mixture was treated by art methods to create a suspension/emulsion.

Chocolate "milk". PureTaste™ powder was added as the main ingredient to a chocolate "milk" (other than water for rehydration). The other ingredients included cane sugar, coconut oil, canola oil, cocoa (processed with alkali), natural flavors, gum acacia, gellan gum, sea salt, sunflower lecithin. Mixture was treated by art methods to create a suspension/emulsion.

Vanilla yogurt. PureTaste™ powder was added as the main ingredient (other than water for rehydration). The other ingredients included oat concentrate (water, rolled oats), cane sugar, coconut oil, dextrose, locust bean gum, pectin, vanilla, lemon juice concentrate, sunflower lecithin, live and active cultures. Mixture was treated by art methods to create a suspension/emulsion.

Strawberry yogurt. PureTaste™ powder was added as the main ingredient (other than water for rehydration). The other ingredients included oat concentrate (water, rolled oats), cane sugar, coconut oil, strawberries, dextrose, pectin, natural flavor, locust bean gum, fruit and vegetable juice (for color), lemon juice concentrate, sunflower lecithin, live and active cultures. Mixture was treated by art methods to create a suspension/emulsion.

Coconut yogurt. PureTaste™ powder was added as the main ingredient (other than water for rehydration). The other ingredients included oat concentrate (water, rolled oats), cane sugar, coconut oil, coconut cream, coconut, dextrose, pectin, locust bean gum, lemon juice concentrate, natural flavor, sunflower lecithin, live and active cultures. Mixture was treated by art methods to create a suspension/emulsion.

Vegan Greek yogurt. PureTaste™ powder was added as the main ingredient (other than water for rehydration). The other ingredients included oat concentrate (water, rolled oats), cane sugar, coconut oil, dextrose, locust bean gum, pectin, sunflower lecithin, live and active cultures. Mixture was treated by art methods to create a suspension/emulsion.

Vegan chocolate pudding. 5 g protein per serving. Coconut milk (water, coconut cream), can sugar, PureTaste™ powder, high fat cocoa, gum acacia, guar gum, locust bean gum, natural flavor, sea salt, sunflower lecithin. Mixture was treated by art methods to create a suspension/emulsion.

Protein Shake powder (chocolate). PureTaste™ powder, sugar, cocoa (processed with alkali), natural flavors, stabilizer blend (guar gum, gum acacia, xanthan gum), gum Arabic, sunflower oil, salt, sunflower lecithin, steviol glycosides.

Protein Shake powder (vanilla). PureTaste™ powder, sugar, natural flavors, stabilizer blend (guar gum, gum acacia, xanthan gum), gum Arabic, sunflower oil, salt, sunflower lecithin, steviol glycosides.

Nutritional shake (unsweetened and unflavored): water, PureTaste™ powder, canola oil, gum acacia, gellan gum, sunflower lecithin.

Whole "milk". PureTaste™ powder was added as the main ingredient to a whole "milk" (other than water for rehydration). The other ingredients included coconut oil, cane sugar, canola oil, gum acacia, gellan gum, sunflower lecithin. Mixture was treated by art methods to create a suspension/emulsion.

Vegan ice cream. 5 g protein per serving. Ingredients: coconut milk (water, coconut cream), cane sugar, PureTaste™ protein powder, gum acacia, guar gum, locust bean gum, natural flavor, sea salt, sunflower lecithin. Ice cream was made by methods known in the art.

Vegan chocolate ice cream. 6 g protein per serving. Ingredients: coconut milk (water, coconut cream), cane sugar, PureTaste™ protein powder, high fat cocoa, gum acacia, guar gum, locust bean gum, natural flavor, sea salt, sunflower lecithin. Ice cream was made by methods known in the art.

Example 18

Reaction flavor. To 165 g distilled deionized water in a glass beaker, 220 g (dry weight) material as prepared in Example 11 was added. To this mixture was added 55 g of a reducing carbohydrate source, caustic 6.5 g of 1 N HCl, under vigorous stirring to form a homogenous suspension. The free flowing slurry was then processed in in a closed, conventional, double-jacketed glass reactor (volume 1 L) equipped with an anchor stirrer and a temperature sensor. After establishing a suspension of the starting materials at 50° C., the slurry was heated to 115° C. within 70 minutes. After reaching 115° C., the slurry was kept at this temperature for 65 minutes (pressure buildup is observed, 1.5 bar). After the reaction, the batch was cooled down to 50° C. within 40 minutes. The resulting liquid was blended with an amount of carrier and spray dried on a Niro Minor type spray tower. This spray dried material was evaluated by trained panelists and was determined to have an intense and complex flavor reminiscent of flavors obtained by cooking techniques.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to produce a food composition, comprising the steps of:
   (a) providing a myceliated high-protein food product, comprising the steps of either:
   (i) providing an aqueous medium comprising a high-protein material, wherein the aqueous medium comprises at least 60 (w/w) protein on a dry weight basis, wherein the medium comprises at least 50 g/L protein and wherein the high protein material is from a plant source comprising soy; inoculating the medium with a fungal culture wherein the fungal culture comprises *Lentinula edodes, Agaricus* spp., *Pleurotus* spp., *Boletus* spp., or *Laetiporus* spp, and culturing the medium to produce a myceliated high-protein food product, wherein the myceliated high-protein food product has reduced bitterness flavor and reduced beany aromas compared to the high-protein material that is not myceliated;
   or,
   (ii) providing a myceliated high-protein food product, wherein the myceliated high-protein food product is at least 60% (w/w) protein on a dry weight basis, wherein the myceliated high protein food product is derived from a plant source, wherein the plant source comprises soy, wherein the myceliated high-protein product is myceliated by an aqueous fungal culture comprising *Lentinula edodes, Agaricus blazeii, Pleurotus* spp., *Boletus* spp., or *Laetiporus* spp., in a medium comprising at least 50 g/L protein in liquid culture;
   and wherein the myceliated high-protein food product has reduced bitterness flavor and reduced beany aroma compared to the high-protein material that is not myceliated;
   (b) providing an edible material; and
   (c) mixing the myceliated high protein food product ingredient and the edible material to form the food composition.

2. The method of claim 1, wherein the *Laetiporus* spp. is *Laetiporus sulfureus*, wherein the *Pleurotus* spp. comprises *Pleurotus ostreatus, Pleurotus salmoneostramineus (Pleurotus djamor), Pleurotus eryngii*, or *Pleurotus citrinopileatus*, and wherein *Boletus* spp. comprises *Boletus edulis* and wherein *Agaricus* spp. comprises *Agaricus blazeii, Agaricus bisporus, Agaricus campestris, Agaricus subrufescens, Agaricus brasiliensis* or *Agaricus silvaticus*.

3. The method of claim 1, wherein the high-protein material is at least 70% (w/w) protein on a dry weight basis and is a protein concentrate or protein isolate.

4. The method of claim 1, wherein the method comprises the culturing step (a)(i) and the culturing step is carried out until the dissolved oxygen in the media reaches between 80% and 90% of the starting dissolved oxygen and wherein the pH of the fungal culture has a change of less than 0.5 pH units during the processing step.

5. The method of claim 1, further comprising a cooking step and an extrusion step using an extruder.

6. The method of claim 1, wherein the edible material comprises a starch, a flour, a grain, a lipid, a colorant, a flavorant, an emulsifier, a sweetener, a vitamin, a mineral, a spice, a fiber, a protein, nutraceuticals, sterols, isoflavones, lignans, glucosamine, an herbal extract, xanthan, a gum, a hydrocolloid, a starch, a preservative, a legume product, a food particulate, or combinations thereof.

7. The method of claim 1, wherein the food composition is selected from the group consisting of dairy alternative products, ready to mix beverages and beverage bases; extruded and extruded/puffed products; sheeted baked goods; meat analogs and extenders; baked goods and baking mixes; granola; and soups/soup bases.

8. The method of claim 1, wherein the method additionally comprises
   (d) adding steam and/or water to the mixture;
   (e) extruding the mixture under heat and pressure to form a textured plant-based protein product, wherein the edible material comprises an additional high protein material, and wherein the myceliated high-protein food ingredient is present at between about 5% and 90% on a dry weight basis compared with the edible material.

9. The method of claim 8, wherein the method further comprises providing a starch or a fiber prior to the mixing step.

10. The method of claim 8, wherein the reduced flavor is a beany flavor or a bitterness flavor and the reduced aroma is a beany aroma.

11. The method of claim 8, wherein the mixture further comprises a starch, a flour, a grain, a lipid, a colorant, a flavorant, an emulsifier, a sweetener, a vitamin, a mineral, a spice, a fiber, an enzyme, a protein powder, nutraceuticals, sterols, isoflavones, lignans, glucosamine, an herbal extract, xanthan, a gum, a hydrocolloid, a preservative, a legume product, a food particulate, or combinations thereof.

12. The method of claim 1, wherein the method further comprises:
   (d) processing the food composition to form a reaction flavor composition, wherein the edible material is a reaction flavor ingredient capable of facilitating Maillard and/or Strecker reactions.

13. A food composition made by the method of claim 1, wherein the food composition is selected from the group consisting of reaction flavors, dairy alternative products, ready to mix beverages and beverage bases, extruded and extruded/puffed products, sheeted baked goods; texturized plant-based protein products, baked goods and baking mixes, granola, and soups/soup bases.

14. A food composition for human consumption, comprising a mixture of (a) a myceliated high-protein food product, wherein the myceliated high-protein food product is at least 60% (w/w) protein on a dry weight basis, wherein the myceliated high protein food product is derived from a plant source comprising soy, wherein the myceliated high protein product is myceliated by a fungal culture comprising *Lentinula edodes, Agaricus blazeii, Pleurotus* spp., *Boletus* spp., or *Laetiporus* spp. in a media comprising at least 50 g/L protein, and wherein the myceliated high protein food product has reduced bitterness flavor and reduced beany aroma compared with a non-myceliated food product; and (b) an edible material.

15. The food composition of claim 14, wherein the food composition is selected from the group consisting of reaction flavors, dairy alternative products, ready to mix beverages and beverage bases; extruded and extruded/puffed products; sheeted baked goods; texturized plant-based protein products; baked goods and baking mixes; granola; and soups/soup bases.

16. The food composition of claim 15, wherein the edible material is a starch, a flour, a grain, a lipid, a colorant, a flavorant, an emulsifier, a sweetener, a vitamin, a mineral, a spice, a fiber, a protein, nutraceuticals, sterols, isoflavones, lignans, glucosamine, an herbal extract, xanthan, a gum, a hydrocolloid, a starch, a preservative, a legume product, a food particulate, or combinations thereof.

17. The food composition of claim 15, wherein the food composition is an extruded or an extruded/puffed material.

18. The composition of claim 14 wherein the reduced flavor is a beany flavor or a bitterness flavor and the reduced aroma is a beany aroma.

19. A method to produce a textured plant-based meat analog or meat extender, comprising the steps of:
(a) providing a myceliated high-protein food product and at least one additional high-protein material,
wherein the myceliated high-protein food product is at least 60% (w/w) protein on a dry weight basis, wherein the myceliated high-protein food product is derived from a plant source, wherein the plant source comprises soy, wherein the myceliated high-protein product is myceliated by an aqueous fungal culture comprising *Lentinula edodes, Agaricus blazeii, Pleurotus* spp., *Boletus* spp., or *Laetiporus* spp., in a media comprising at least 50 g/L protein in liquid culture, and wherein the myceliated high-protein food product has reduced bitter flavor and reduced beany aroma compared with a non-myceliated food product; and wherein the least one additional high-protein material comprises at least 50% protein on a dry weight basis,
(b) mixing the myceliated high-protein food product and additional high-protein material, wherein the myceliated high-protein food product is present at between about 5% and 90% on a dry weight basis compared with the additional high-protein material;
(c) adding steam and/or water to the mixture;
(d) extruding the mixture under heat and pressure to form the textured plant-based meat analog or meat extender.

* * * * *